US008176004B2

(12) United States Patent
Malaney et al.

(10) Patent No.: US 8,176,004 B2
(45) Date of Patent: May 8, 2012

(54) SYSTEMS AND METHODS FOR INTELLIGENT PAPERLESS DOCUMENT MANAGEMENT

(75) Inventors: Sanjeev Malaney, La Jolla, CA (US); Parag Kulkarni, Pune (IN); Krishnwami Viswanathan, Pune (IN); Vikram Malaney, Mumbai (IN); Jeffrey Evans, San Diego, CA (US)

(73) Assignee: Capsilon Corporation, San Diego, CA (US)

( * ) Notice: Subject to any disclaimer, the term of this patent is extended or adjusted under 35 U.S.C. 154(b) by 469 days.

(21) Appl. No.: 11/952,050

(22) Filed: Dec. 6, 2007

(65) Prior Publication Data

US 2008/0147790 A1 Jun. 19, 2008

Related U.S. Application Data

(63) Continuation-in-part of application No. 11/552,495, filed on Oct. 24, 2006, now Pat. No. 7,747,495, which is a continuation-in-part of application No. PCT/US2006/041542, filed on Oct. 24, 2006.

(60) Provisional application No. 60/730,237, filed on Oct. 24, 2005.

(51) Int. Cl.
*G06F 17/00* (2006.01)

(52) U.S. Cl. ........ 707/608; 709/203; 709/219; 707/737; 707/741; 707/783

(58) Field of Classification Search ............... 707/2, 3, 707/10, 101, 104.1, E17.008, 999.002, 999.009, 707/999.107, 608, 737, 741, 783; 709/203, 709/218, 219; 705/4
See application file for complete search history.

(56) References Cited

U.S. PATENT DOCUMENTS

| | | | |
|---|---|---|---|
| 4,899,299 A | 2/1990 | MacPhail |
| 5,020,019 A | 5/1991 | Ogawa |
| 5,159,667 A | 10/1992 | Borrey et al. |
| 5,168,565 A | 12/1992 | Morita |
| 5,297,042 A | 3/1994 | Morita |
| 5,323,311 A | 6/1994 | Fukao et al. |
| 5,414,781 A | 5/1995 | Spitz et al. |
| 5,418,946 A | 5/1995 | Mori |
| 5,463,773 A | 10/1995 | Sakakibara et al. |
| 5,479,574 A | 12/1995 | Glier et al. |
| 5,574,802 A | 11/1996 | Ozaki |
| 5,579,519 A | 11/1996 | Pelletier |

(Continued)

FOREIGN PATENT DOCUMENTS

EP 0460995 A1 12/1991

(Continued)

OTHER PUBLICATIONS

PCT/US07/86673 Search Report dated Apr. 10, 2008.

(Continued)

*Primary Examiner* — Leslie Wong
(74) *Attorney, Agent, or Firm* — Wilson, Sonsini, Goodrich & Rosati

(57) ABSTRACT

Provided are systems and methods for Web-based intelligent paperless document management where users can collect, store, and share all document from various locations. The system requires security sign-up for the user account and it automatically classifies the incoming documents received by the inbox. The present invention automatically indexes and places documents in the repository which does not require user interaction, barcodes or separators. The system also provides the capability of prearranging access levels according to functions of multiple users.

29 Claims, 76 Drawing Sheets

U.S. PATENT DOCUMENTS

| | | | |
|---|---|---|---|
| 5,588,149 A | 12/1996 | Hirose | |
| 5,768,580 A | 6/1998 | Wical | |
| 5,812,995 A | 9/1998 | Sasaki et al. | |
| 5,819,295 A | 10/1998 | Nakagawa et al. | |
| 5,832,470 A | 11/1998 | Morita et al. | |
| 5,867,799 A | 2/1999 | Lang et al. | |
| 5,930,788 A | 7/1999 | Wical | |
| 5,940,821 A | 8/1999 | Wical | |
| 5,983,246 A | 11/1999 | Takano | |
| 5,991,709 A | 11/1999 | Schoen | |
| 5,999,893 A | 12/1999 | Lynch, Jr. et al. | |
| 6,055,540 A | 4/2000 | Snow et al. | |
| 6,061,675 A | 5/2000 | Wical | |
| 6,094,653 A | 7/2000 | Li et al. | |
| 6,101,515 A | 8/2000 | Wical et al. | |
| 6,125,362 A | 9/2000 | Elworthy | |
| 6,185,576 B1 | 2/2001 | McIntosh | |
| 6,243,723 B1 | 6/2001 | Ikeda et al. | |
| 6,266,656 B1 | 7/2001 | Ohno | |
| 6,442,555 B1 | 8/2002 | Shmueli et al. | |
| 6,460,034 B1 | 10/2002 | Wical | |
| 6,477,528 B1 | 11/2002 | Takayama | |
| 6,505,195 B1 | 1/2003 | Ikeda et al. | |
| 6,542,635 B1 | 4/2003 | Hu et al. | |
| 6,553,358 B1 | 4/2003 | Horvitz | |
| 6,553,365 B1 | 4/2003 | Summerlin et al. | |
| 6,556,982 B1 | 4/2003 | McGaffey et al. | |
| 6,556,987 B1 | 4/2003 | Brown et al. | |
| 6,625,312 B1 | 9/2003 | Nagarajan et al. | |
| 6,647,534 B1 | 11/2003 | Graham | |
| 6,701,305 B1 | 3/2004 | Holt et al. | |
| 6,718,333 B1 | 4/2004 | Matsuda | |
| 6,868,424 B2 * | 3/2005 | Jones et al. | 707/102 |
| 7,047,279 B1 * | 5/2006 | Beams et al. | 709/204 |
| 7,747,495 B2 * | 6/2010 | Malaney et al. | 705/35 |
| 2002/0052835 A1 | 5/2002 | Toscano | |
| 2002/0143704 A1 | 10/2002 | Nassiri | |
| 2003/0187756 A1 * | 10/2003 | Klivington et al. | 705/27 |
| 2004/0199460 A1 | 10/2004 | Barash | |
| 2005/0080721 A1 | 4/2005 | Kearney et al. | |
| 2005/0108001 A1 | 5/2005 | Aarskog | |
| 2005/0134935 A1 | 6/2005 | Schmidtler et al. | |
| 2005/0177389 A1 * | 8/2005 | Rakowicz et al. | 705/1 |
| 2005/0209955 A1 | 9/2005 | Underwood et al. | |
| 2005/0289182 A1 * | 12/2005 | Pandian et al. | 707/104.1 |
| 2006/0064434 A1 * | 3/2006 | Gilbert et al. | 707/104.1 |
| 2006/0080278 A1 * | 4/2006 | Neiditsch et al. | 707/1 |
| 2006/0168233 A1 * | 7/2006 | Alcorn et al. | 709/226 |
| 2007/0033078 A1 | 2/2007 | Mandalia et al. | |
| 2008/0086305 A1 * | 4/2008 | Lewis et al. | 704/235 |
| 2009/0249446 A1 * | 10/2009 | Jenkins et al. | 726/3 |

FOREIGN PATENT DOCUMENTS

| | | |
|---|---|---|
| EP | 0891593 A1 | 1/1999 |
| EP | 0891593 B1 | 3/2000 |
| EP | 1158424 A1 | 11/2001 |
| EP | 1199647 A2 | 4/2002 |
| EP | 1256886 A2 | 11/2002 |
| EP | 1256886 A3 | 11/2002 |
| EP | 1365329 A2 | 11/2003 |
| EP | 1365329 A3 | 11/2003 |
| EP | 1376420 A1 | 1/2004 |
| EP | 1378375 A1 | 1/2004 |
| EP | 1385329 A2 | 1/2004 |
| EP | 1385329 A3 | 1/2004 |
| EP | 1199647 A3 | 12/2005 |

OTHER PUBLICATIONS

PCT/US06/41542 Search Report dated Aug. 20, 2008.

* cited by examiner

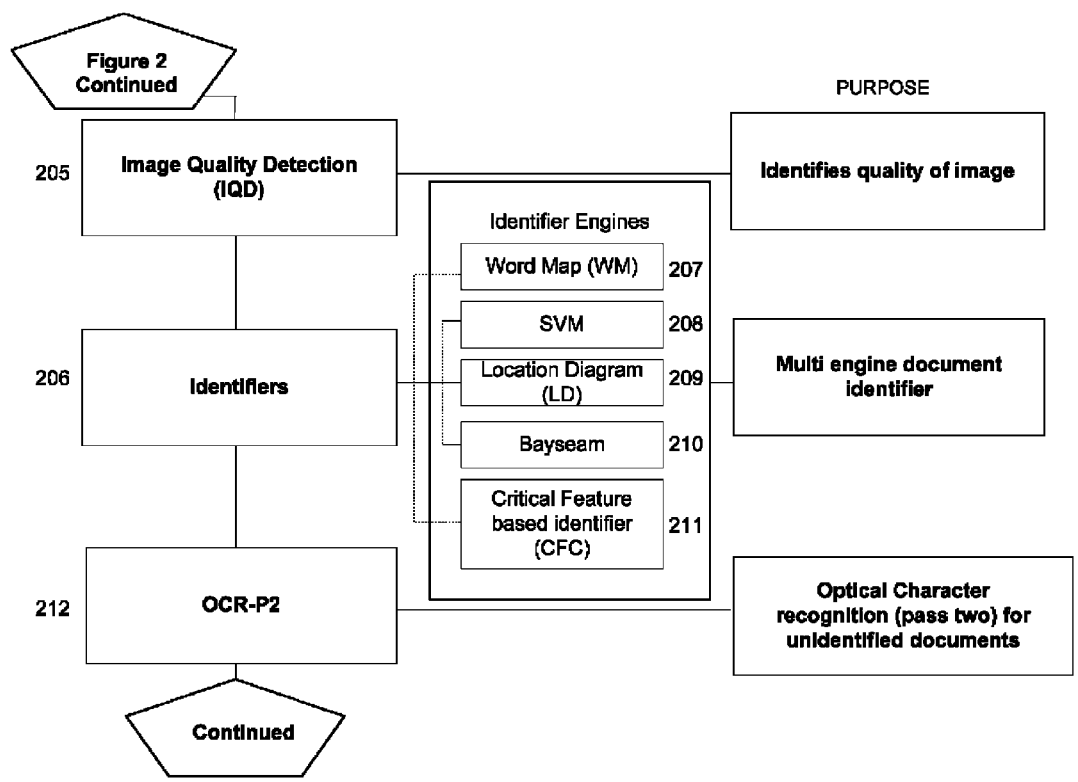

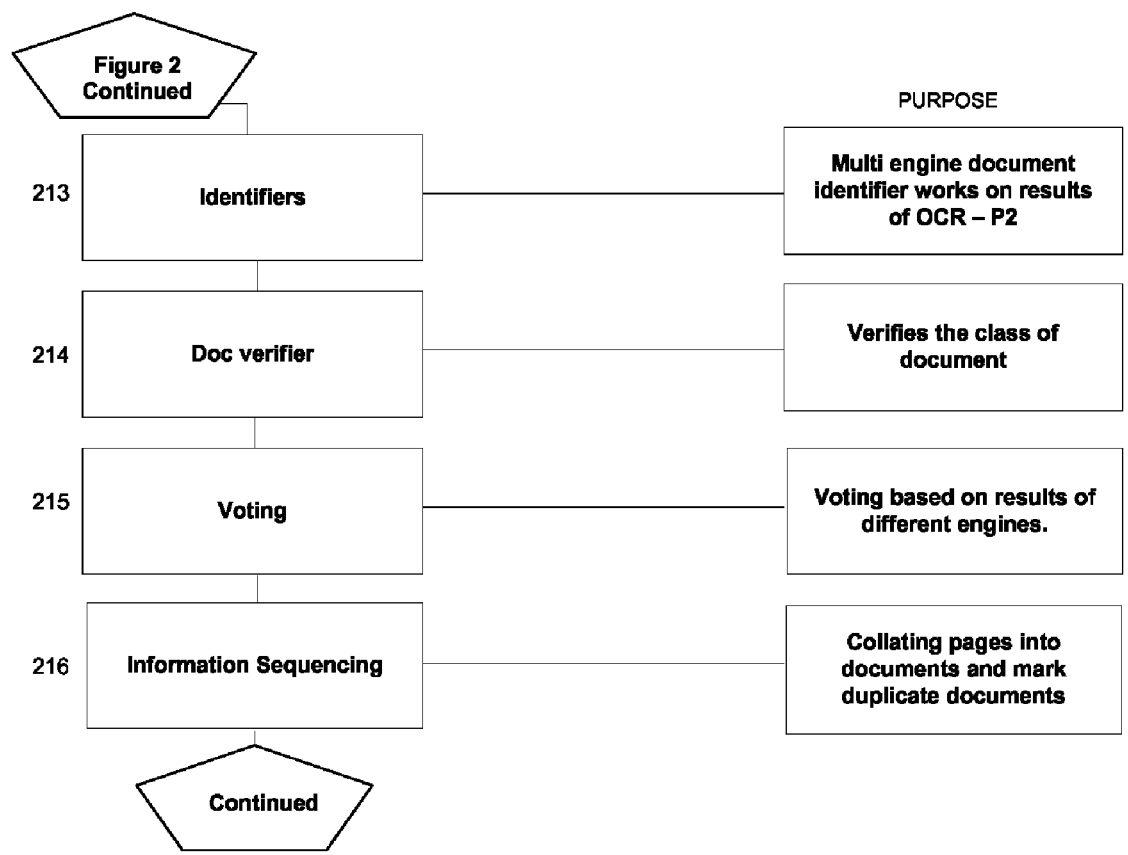

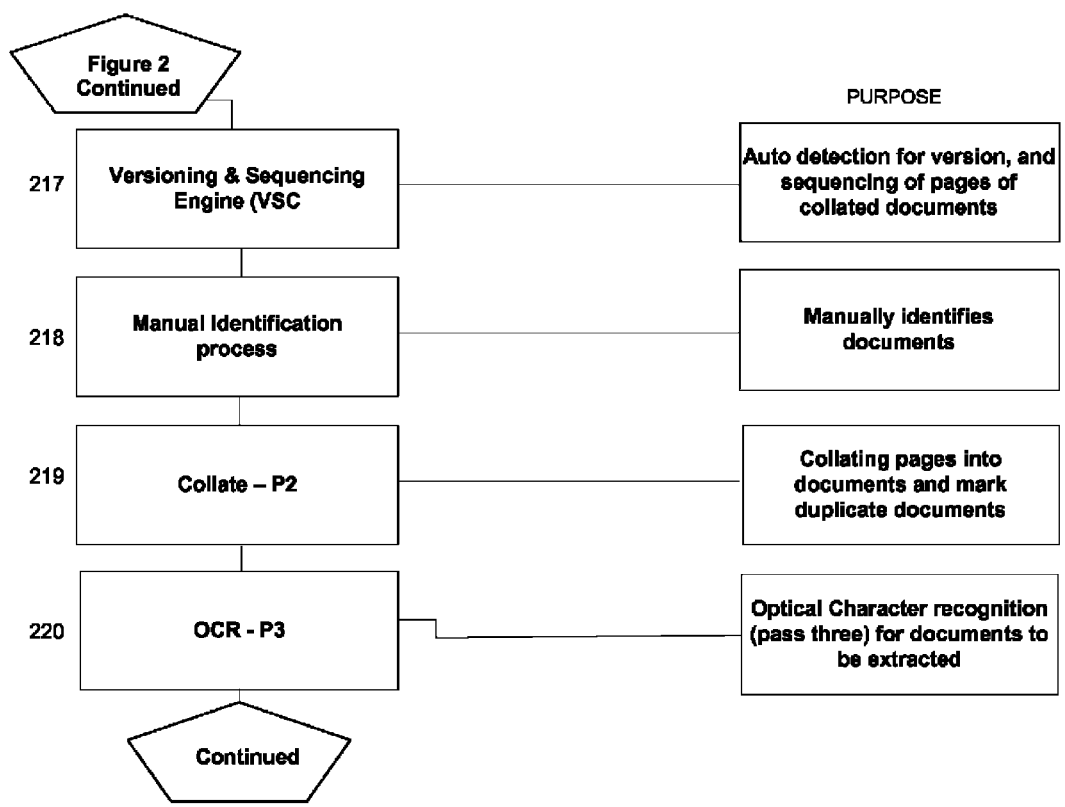

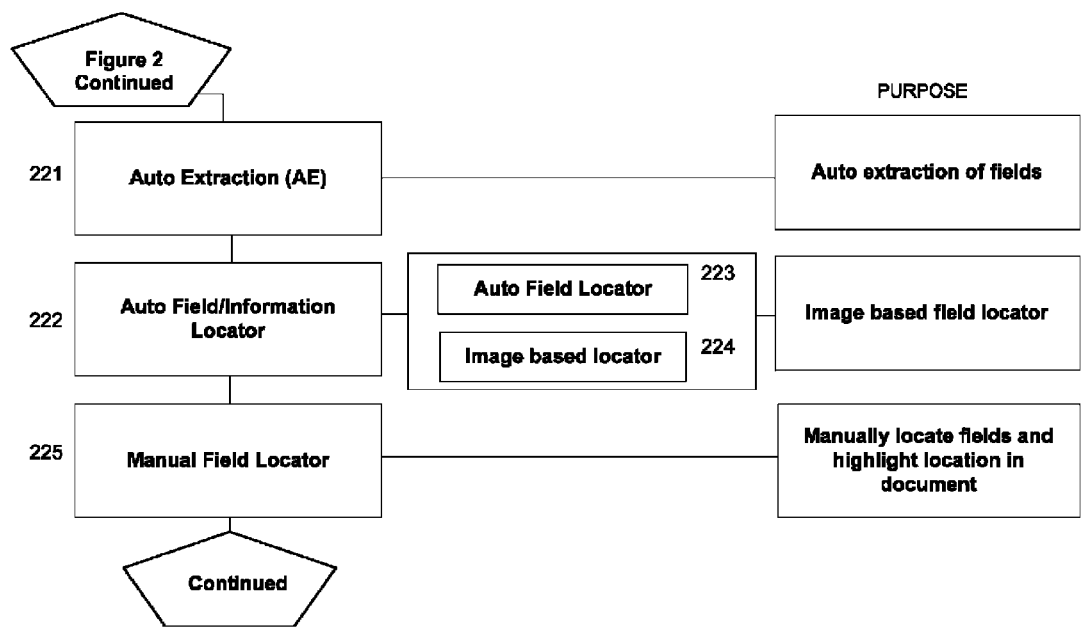

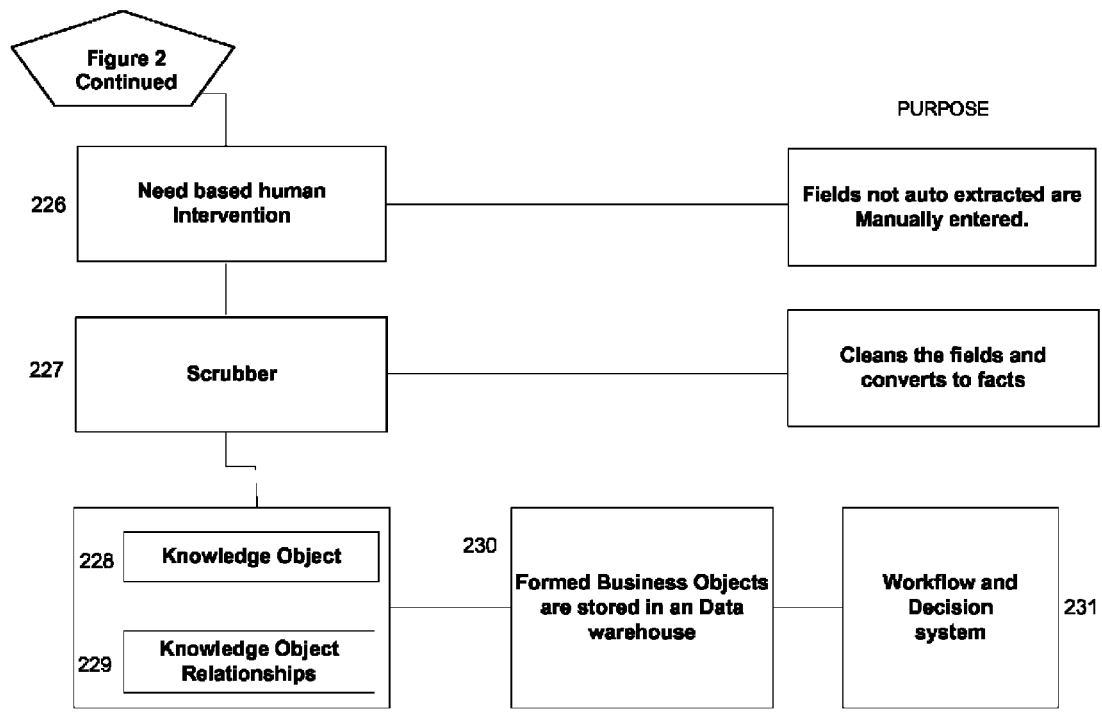

Learner

Dox Package Creation

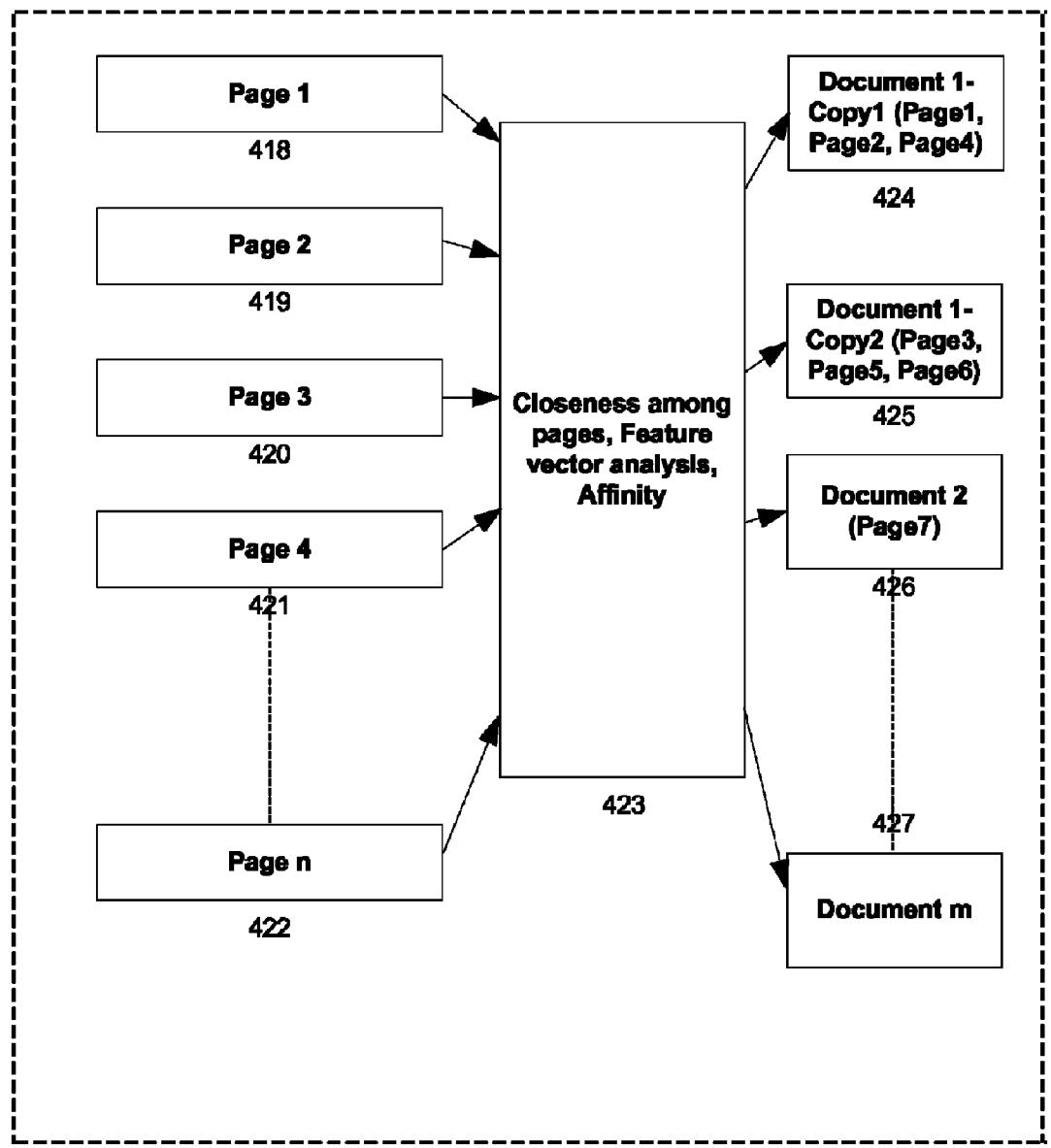

Transaction Data-Set
(Business Object)

Figure 5A

Capsilon (Extraction output)

| Field | Value |
|---|---|
| Borrower Birth Date | 04/14/1972 |
| Borrower Employer State | IL |
| CoBorrower SSN | 329-72-0256 |
| Property Street Address | 1710 9TH ST |
| Borrower Employer Postal Code | 60015 |
| Borrower Last Name | Singh |
| Property Structure Built Year | 1954 |
| Borrower SSN | 576-25-3320 |
| Borrower First Name | Nikhil |
| Property Postal Code | 92122 |
| Interviewers Employer Postal Code | 60440 |
| Borrower Employer City | WAUKEGAN |
| Liability Monthly Payment Amount | 2500 |
| Interviewers Employer Street Address | 425 Quadrangle Drive Ste 260 |
| Borrower Residence City | WAUKEGAN |
| Property Address | 1710 9TH ST ,WAUKEGAN SAN DIEGO ,CA,92122 |
| Borrower Current Income Monthly Total Amount | 4100 |
| CoBorrower Date Of Birth | 12/20/1964 |
| CoBorrower Full Name | ANN BURTON |
| Interviewer Name | D JOHNSON |
| Property State | CA |
| Borrower Employer Name | Aramark Management |
| Interviewers Employer City | Bolingbrook |
| Borrower Full Name | Nikhil Singh |
| Property City | WAUKEGAN |
| Borrower Residence State | IL |

Figure 5B

| Field | Value |
|---|---|
| Loan Amount | 250000 |
| Total Assets | 160000 |
| Borrower Residence Postal Code | 60085 |
| Interviewers Employer State | IL |
| Interviewers Employer Address | 425 Quadrangle Drive Ste 260 |
| Borrower Address | 1710 9TH ST ,WAUKEGAN,IL,60085 |
| Borrower Birth Date | 04/14/1972 |
| Borrower Employer State | IL |
| CoBorrower SSN | 329-72-0356 |
| Property Street Address | 1710 9TH ST |
| Borrower Employer Postal Code | 60515 |
| Borrower Last Name | Singh |
| Property Structure Built Year | 1954 |
| Borrower SSN | 578-25-3320 |
| Borrower First Name | Nikhil |
| Property Postal Code | 92122 |
| Interviewers Employer Postal Code | 60440 |
| Borrower Employer City | WAUKEGAN |
| Liability Monthly Payment Amount | 2500 |
| Interviewers Employer Street Address | 425 Quadrangle Drive Ste 260 |
| Borrower Residence City | WAUKEGAN |
| Property Address | 1710 9TH ST ,WAUKEGAN SAN DIEGO ,CA,92122 |
| Borrower Current Income Monthly Total Amount | 4100 |
| CoBorrower Date Of Birth | 12/20/1964 |

Network Deployment of Intelligent

Paperless Document Management (IPDM)

Exemplary Administration of Intelligent Paperless Document Management

Examplary Client Deployment of Intelligent Paperless Document Management

SYSTEMS AND METHODS FOR INTELLIGENT PAPERLESS DOCUMENT MANAGEMENT

INCORPORATION BY REFERENCE

This application is a continuation-in-part of U.S. patent application Ser. No. 11/552,495 filed on Oct. 24, 2006 now U.S. Pat. No. 7,747,495, which claims priority to the U.S. Provisional Application No. 60/730,237 filed Oct. 24, 2005. This application is a continuation-in-part of PCT Application No. PCT/US2006/041542 filed on Oct. 24, 2006, which claims priority to the U.S. Provisional Application No. 60/730,237 filed Oct. 24, 2005. All of the above applications are incorporated by reference herein in their entireties. All publications and patent applications mentioned in this specification are herein incorporated by reference to the same extent as if each individual publication or patent application was specifically and individually indicated to be incorporated by reference.

FIELD OF THE INVENTION

The field of invention is the process or method of doing business by processing paper documents, image files, and/or electronic documents; using a computer to store, retrieve, display, analyze, collate and capture information from the documents; optionally using a computer for making decisions based on this information; and exchanging the organized information between organizations electronically. The field of the invention also includes the method of performing such analysis, collation, and information capture as well as an apparatus for conducting such analysis, collation, and capture.

BACKGROUND OF THE INVENTION

Many industries still struggle their productivity and profitability by using traditional paper-based document management systems. Document collection and organization are often time-consuming and error-prone. With traditional paper-based systems or methods, files often get lost and forgotten during collection, and sending documents can be slow and inefficient. Although various imaging and workflow solutions have been developed for more cost effective answers, most document management systems today still lack sophistication and real-world usability, and sometimes cause even more paper to be generated.

Consider the US mortgage industry's current wholesale business model: mortgage brokers often enter key information into simple, desk-based loan origination systems (LOS) such as Calyx POINT® in order to avoid manual data reentry every time they need a document prepared. Still, papers need to be printed out and delivered to a wholesale Lender for review, along with supporting documents collected from their borrowers. So the mortgage brokers print, assemble, and sort paper documents and either feed them into a fax machine, scan them and upload them to a Lender Website, or delivered via overnight delivery, depending on the sophistication of the Wholesale Lender.

Often the documents created by the brokers' LOS are lengthy pdf or tiff files. After being transmitted by faxes, a human individual at the wholesale lenders' offices has to identify which document is which within the 100-plus page graphics file. If the brokers insert barcodes or separator sheets among various documents, this identification process can be easier. However, the use of barcodes and/or separation sheets simply moves the time-consuming step to the brokers' end and the whole process remain inefficient. Most of the time, multiple documents within a single fax or e-mail are a sort of graphic "blob" in which documents are not individually identified. The viewer has to scroll through the long graphic file to find a particular document, which is frustrating and impractical. Often a time-consuming workaround is necessary, in which an operator identifies the first page and the last page of a particular document, cut and paste pages for each document, name and save the document, then sends the document back into the system. Each document in the long graphic file has to be processed manually in the way, which can be time consuming and expensive.

The mortgage banking industry is faced with the daunting task of organizing, inputting and accessing a vast number and array of divergent types of documents and manually entering several hundred fields of information from a subset of these documents in order to make a loan to a borrower. Although many attempts have been made to streamline the process, most recently by the Mortgage Bankers Association (MBA) which established standards for representing information in a mortgage transaction, the problem of identifying and capturing information from paper documents, image files, native PDF files, and other electronic files in the loan origination process has yet to be solved in order to take advantage of these standards. In the United States alone, mortgage bankers are faced with the idiosyncratic documents from a minimum of fifty states where some mortgage documents differ from state to state and may have further individual variations within each state. In addition, once the loan is made to the borrower, there is a huge secondary market for mortgages, where existing mortgage loans are bundled and sold to large investment firms. These investment entities, in order to pursue a rational risk management policy presentable to their owners and/or shareholders, must organize and analyze these mortgage documents for asset risk and compliance with local, state and federal laws. Values necessary to compare and analyze these loans must be extracted from paper documents or images of the document, then tabulated, analyzed and the resultant data and documents made readily available in order for informed decision-making to occur. In January 2000, the MBA formed the Mortgage Industry Standards Maintenance Organization (MISMO). This group has driven the development of industry specifications that allow seamless data exchange using standard electronic mortgage documents called SMART Docs™. The SMART Doc XML specification is the foundation of the eMortgage efforts of lenders, vendors, and investors, as it provides for the electronic versions of key mortgage documents. This specification enables electronic mortgage loan package creation by providing a standard for creating and processing uniform electronic transactions for use in electronic mortgage commerce.

Nor is this dilemma restricted to the mortgage industry. In other industries, including the finance industry, the hospitality industry, the health care field and the insurance industry, there is a constant need to collate documents into logically related groups, and capture key information to enable information exchange. These documents must be further collated in order to identify and store multiple revisions of the same type of document, along with extracting data and inferred information from the documents, together with making the resultant transaction data and underlying documents available in an electronically accessible manner.

Unfortunately, the manual organization, collation of paper documents, and extraction of information is very time consuming and slows the process of making business decisions. Additionally, there is an increased possibility of error due to manual processing. Validation of these decisions is very difficult since the paper documents are stored separately from the electronic databases maintained by the processing organizations. Thus, there is a clear need for process automation and well organized and easily searchable electronic storage of the documents as well as extraction of relevant information contained within the documents.

In other methods or processes known in the art, automated document identification or classification methods fall into one of three categories: (1) they are either completely dependant on image based techniques for classification; (2) they use simple keyword search techniques, Bayesian and/or Support Vector Machine ("SVM") algorithms for text classification; or (3) they rely on document boundary detection methods using image and text based classification techniques. These methods are inadequate to deal with the wide variation in documents typically seen in the business environment and are not capable of separating multiple revisions of the same document type to enable information to be captured from the most current version of the document, hence limiting the utility of such systems.

Although it is known in the art to view paper documents by conversion into simpler electronic forms such as PDF files, these files, in general, do not allow extracting information beyond Optical Character Recognition (OCR). The OCR quality is highly dependant on image quality and the extraction is frequently of very poor quality. Finally, these methods or apparatuses do not offer a complete solution to the dilemma of analyzing and manipulating large paper document sets. Thus, the automated systems currently available generally have at least the following problems:

(1) such systems are limited to document boundary detection, document classification and text extraction and do not offer advanced document collation with separation of very similar documents, and domain-sensitive scrubbing of extracted information into usable data;
(2) techniques based on the current methods of out-of-context extraction and keyword-based classification cannot offer the consistent extraction of information from documents for automated decision making, or formation of Business Objects such as SMART Docs™ for information exchange between two organizations using industry standard taxonomy;
(3) similarity among documents may lead to misclassification when using pattern-based classification, especially in cases where the optical character recognition quality of the document is poor;
(4) extraction processes that handle structured data using a template-based matching generally fail even with a slight shifting of images, and those with rules-based templates can return false results if there are significant variations of the document;
(5) such systems cannot handle both structured and unstructured documents equally efficiently and reliably to serve an entire business process;
(6) such systems frequently are wed to the strengths and weaknesses of a particular algorithm and are thus not able to handle wide variations in analyzed documents with acceptable accuracy without manual rule creation;
(7) such systems cannot locate the information across the documents and variations;
(8) neither do such systems provide a complete solution to a business problem; and
(9) such systems do not have intelligent scrubbing of extracted information to enable the creation of electronic transaction sets such as MISMO SMART Doc™ XML files.

To analyze complicated documents, workers in several industries, for example, mortgage banking, currently analyze documents using a manual collation process; a manual stacking process; a wide variety of manual classification methods; and manual extraction methods, in particular a manual search and transcription. These methods suffer from the disadvantages of requiring substantial investment of human capital and not being automated sufficiently to handle bulk processing of documents and the information contained in those documents.

The number and kind of documents accompanying a mortgage loan are very specific to the mortgage loan industry, and as mentioned above, vary from state to state, and may vary in the jurisdictions within a particular state. However, the documents related to a given loan for the purchase of a property or properties in any jurisdiction may be assembled into electronic images by scanning (or direct entry, if already in an electronic form) before, during and after funding of the loan to form a partially, or preferably, complete document set, referred to herein as the "Dox Package." These documents originate from a number of sources, including banks and/or credit unions. Moreover, the order of these documents are assembled and filed depends very much on the individuals involved, their timeliness and their preferences, organization, or disorganization in sorting the various forms and other documents containing the required information. Further, even though some standardization of documents has occurred, such as Form 1003 published by FNMA, certain data essential for further analysis may still be found at disparate locations in idiosyncratic documents. For example, each bank and credit union formats an individual's bank statement in a different manner, yet the data from each format must be extracted for income verification. Additionally, depending on the stage of loan processing, not all of the documents may be present in a Dox Package at a given point in time.

As mentioned above, following the funding of the loan, loans are frequently bundled with many other similar loans and sold on the secondary market. At this stage, entire lots of mortgage-secured loans are bundled and sold with minimal quality control. In current usage in the secondary mortgage market, a randomly selected ten percent sample of mortgage documents (Dox Packages) are analyzed in detail (largely by manual means) and taken as representative for the lot. Obviously, if more loans, or substantially all the loans in a bundle, could be evaluated, better decisions could be made regarding the marketing of mortgage-backed loans on the secondary market. Hence, pricing of these loans in the market would be more efficient. Thus, there is a clear need for the automated analysis, collation of documents, and extraction of information in the mortgage loan industry, as well as other industries with no automated or standardized data input in place.

There is also a need for an Intelligent Document Paperless Management system that can reproduce the use of paper and stand up to the real world requirements necessary to catalyze a person, organization, or industry to "go paperless."

SUMMARY OF THE INVENTION

The systems and methods described have at least one of the following features: (a) receiving paper in any format typically used to transfer paper digitally between one human/system to another without requiring the sender to prepare or separate the Dox Packages with coded cover sheets or separator sheets; (b) using at least one auto-indexing as described herein to convert that raw feed into collated, named, indexed documents minimizing human interaction; (c) identifying and making available data points from those documents; (d)

vaulting the digital paper and data in a commercially secure fashion; (e) filing documents using contextually based references so that they can be located by those who need to work with them; (f) making available rich, usable interfaces displaying a digital, paperless workplace accessible by different devices and types of users across vast geographies; (g) reproducing paper-based workflows and enhance them by enabling collaboration amongst users and parallel tasking; (h) storing in searchable and flexible repositories that mirror the industries that use this paperless workplace, such as in digital "Mortgage Loan Folders" or industry comparables; (i) providing the user the ability to organize, group, tag, note, modify, define, view or search the documents and the repositories in a fashion that mirrors and enhances the real world storage and usage of paper; (l) providing the user the ability to assemble and deliver documents out of the system in an indexed or non-indexed format via any of the real world methods of delivering paper or digital paper between one human/system to another; (k) providing the ability for users to archive documents into long term storage within the system without limiting the accessibility to that digital paperwork and data; (l) providing the ability for the users to withdraw their documents from the paperless workplace in an indexed or non-indexed format; (m) providing the user and easy-to-use interface to control the administration of their paperless workspace, the users and their access to all levels of security; and (n) providing the system in a fashion where it can be setup and implemented quickly without sophisticated implementation strategies or sophisticated software installations.

In some embodiments, the systems and methods described have at least two of the features listed above. In some embodiments, the systems and methods described have at least three of the features listed above. In some embodiments, the systems and methods described have at least four of the features listed above. In some embodiments, the systems and methods described have at least five of the features listed above. In some embodiments, the systems and methods described have at least six of the features listed above. In some embodiments, the systems and methods described have at least seven of the features listed above.

The systems and methods described provide a Web-based solution which enables intelligent document paperless management and collaboration, eliminating inefficiency caused by paper documents. The systems and methods described herein provide Web-based paperless offices where users can collect, store, and share all documents from various locations. The systems and methods described herein can receive images of documents from any source, such as e-mail, fax, ftp upload or scanner/digital copier, then place them into electronic folders, where they can be viewed and acted upon exactly as they were in paper form. The imaged documents reside in a warehouse repository and an administrator allows permitted viewers' access to the documents based on their individual role in the process, using links via the Web. In some embodiments, the documents do not travel at all, but everyone needing access to them can have the documents at their fingertips.

The systems and methods described require minimal data reentry because of their data extraction (or data capture) capabilities. The systems and methods described herein do not require the use of barcodes and separator sheets for faxing in or identifying documents. In some embodiment, barcodes can be used for folder IDs. In such embodiments, the systems or methods described can forward incoming documents into folders designated by the folder IDs.

Similar to the paper-based world, the systems and methods described herein can provide hierarchical virtual storage such as virtual offices and virtual cabinets that can be flexibly setup to best represent an existing organization's file storage structure. These virtual (electronic) cabinets can be set up according to various factors to best fit for the user. For example, a mortgage broker can setup cabinets/offices by loan officer, loan type, workflow, or time of origination. Documents can be automatically indexed and placed into electronic folders within these electronic cabinets.

The systems and methods described herein have at least one of the following functions: (a) can perform automatic indexing and document classification as images are received, (b) can provide imaged documents residing within secure and easily accessed environment, and (c) can allow full collaboration among permitted stakeholders all along the value chain. In some embodiments, the systems and methods described are Web-based and have all three functions listed above.

For example, in a mortgage broker's paperless workplace, incoming documents are auto-classified and go directly to the appropriate electronic cabinet and mortgage loan folder, or to an inbox, without costly workarounds, and searchable files are no longer misplaced or misfiled. Built-in workflow features can be provided to track the loan's process from origination to closing. Files can be dragged and dropped to and from the next step's work queue and worked in parallel queues.

In one aspect are Web-based systems for intelligent paperless document management, comprising, (a) at least one user account and at least one inbox, wherein said user account requires security sign-up and said at least one inbox accepts incoming documents;

(b) at least one automatic indexing engine to automatically classify said incoming documents received by said inbox;

(c) a repository to store documents classified by said at least one automatic indexing engine; and (d) a online collaborative portal; said online collaborative portal allows access of multiple users to documents in said repository.

In some embodiments of the above aspect, said at least one automatic indexing engine does not require barcodes or separators. In some embodiments of the above aspect, said system does not provide the capability of prearranging access levels according to functions of said multiple users. In some embodiments of the above aspect, said system does not require the capability of prearranging access levels according to functions of said multiple users. In some embodiments of the above aspect, said system does not prohibit a user from modifying or deleting a document in said depository.

In some embodiments of the above aspect, said at least one automatic indexing engine excludes involvement of barcodes or separators for the purpose of indexing or classifying documents. In some embodiment, barcodes can be used for folder IDs. In such embodiments, said system can forward incoming documents into folders designated by the folder IDs. In some embodiments of the above aspect, said system excludes involvement of prearranging access levels according to functions of said multiple users. In some embodiments of the above aspect, said system provides a user with the capability to modify or delete a document in said depository.

In some embodiments, the system described further comprises at least one electronic cabinet. In some embodiments, the system described further comprises at least one electronic folder. In some embodiments, the system described further comprises a delivery center to allow custom delivery packages comprising different documents for multiple parties.

In some embodiments, the system described further comprises at least one business rule manager. In some embodiments of the systems comprising at least one business rule manager, said business rule manager uses at least one workflow rule.

In some embodiments, the system described further comprises at least one data extraction engine. In some embodiments of the systems comprising at least one data extraction engine, the systems have capability to output extracted data in a specified format. In some embodiments of such systems, the specified format is MISMO SMART Doc XML.

In some embodiments of the systems comprising at least one data extraction engine, wherein the systems have capability to flag for human intervention when inconsistent data is identified; said human intervention include sorting, modifying, and/or deleting documents.

In some embodiments of the systems described, the online collaborative portal allows simultaneous access from multiple users. In some embodiments of the systems allowing simultaneous access from multiple users, the system comprises at least two user accounts corresponding to each of at least two inboxes.

In some embodiments of the systems described, the inbox accepts incoming documents selected from the group consisting of e-mails, faxes, ftp uploads, scanners, digital copiers, and combinations thereof. In some embodiments, the system described further comprises a desktop tool for a user with a user account and inbox providing for uploading of documents to said user's inbox. In some embodiments, the system described can integrated with at least one desk-based system such as mortgage loan origination software (LOS), automatic underwriting systems (AUS), lender underwriting systems (LUS), automate mortgage compliance software, or other electronic loan software.

In another aspect are Web-based computerized methods for intelligent document management, comprising, (a) allowing at least one user to create at least one user account and at least one inbox, wherein at least one of said user account requires security sign-up and said at least one inbox accepts incoming documents;

(b) receiving documents;

(c) indexing documents received in step (b) with at least one automatic indexing engine;

(d) placing indexed documents into a repository to store documents classified by said at least one automatic indexing engine; and (e) providing said user to access documents in said repository using an online collaborative portal.

In some embodiments of the above aspect, said at least one automatic indexing engine does not require barcodes or separators. In some embodiments of the above aspect, said method does not provide the capability of prearranging access levels according to functions of said multiple users. In some embodiments of the above aspect, said method does not require the capability of prearranging access levels according to functions of said multiple users. In some embodiments of the above aspect, said method does not prohibit a user from modifying or deleting a document in said depository.

In some embodiments of the above aspect, said at least one automatic indexing engine excludes involvement of barcodes or separators for the purpose of indexing or classifying documents. In some embodiment, barcodes can be used for folder IDs. In such embodiments, said method can forward incoming documents into folders designated by the folder IDs. In some embodiments of the above aspect, said method excludes involvement of prearranging access levels according to functions of said multiple users. In some embodiments of the above aspect, said method provides a user with the capability to modify or delete a document in said depository.

In some embodiments, the method described further comprises the step of placing indexed documents into at least one electronic cabinet. In some embodiments, the method described further comprises the step of placing folders into at least one electronic cabinet. In some embodiments, the method described further comprises the step of placing indexed documents into at least one electronic folder. In some embodiments, the method described further comprises the step of delivering documents to at least one person using a delivery center to allow custom delivery packages comprising different documents for multiple parties.

In some embodiments, the method described further comprises the step of organizing documents using at least one business rule manager. In some embodiments of the methods comprising the step of organizing documents using at least one business rule manager, said business rule manager uses at least one workflow rule.

In some embodiments, the method described further comprises the step of extracting data using at least one data extraction engine. In some embodiments of the methods comprising the step of extracting data using at least one data extraction engine, the method described further comprises the step of outputting extracted data in a specified format. In some embodiments, the specified format is MISMO SMART Doc XML.

In some embodiments of the methods comprising the step of extracting data using at least one data extraction engine, the method described further comprises the step of flagging for human intervention when inconsistent data is identified; said human intervention include sorting, modifying, and/or deleting documents.

In some embodiments of the methods described, the online collaborative portal allows simultaneous access from multiple users. In some embodiments of the methods described, the inbox accepts incoming documents selected from the group consisting of e-mails, faxes, ftp uploads, scanners, digital copiers, and combinations thereof. In some embodiments, the method described further comprises the step of providing for a desktop tool for uploading documents. In some embodiments of the methods described, the online collaborative portal can integrated with at least one desk-based system such as mortgage loan origination software (LOS), automatic underwriting systems (AUS), lender underwriting systems (LUS), automate mortgage compliance software, or other electronic loan software.

BRIEF DESCRIPTION OF THE DRAWINGS

The novel features of the invention are set forth with particularity in the specification, drawings and figures and in the appended claims. A better understanding of the features and advantages of the present invention will be obtained by reference to the following detailed description that sets forth illustrative embodiments, in which the principles of the invention are utilized, and the accompanying drawings of which:

FIG. 4C depicts the process of document creation in one embodiment of the invention.

FIGS. 5A and 5B depict screen shots of output obtained through the use of the instant invention. That is, using a Dox Package analyzed by the method/apparatus as described herein, the exemplary data in the figure was available for analysis.

FIG. 24 shows that a folder can be created or designated for uploading documents via scan, print, or pdf upload.

Figure 55:
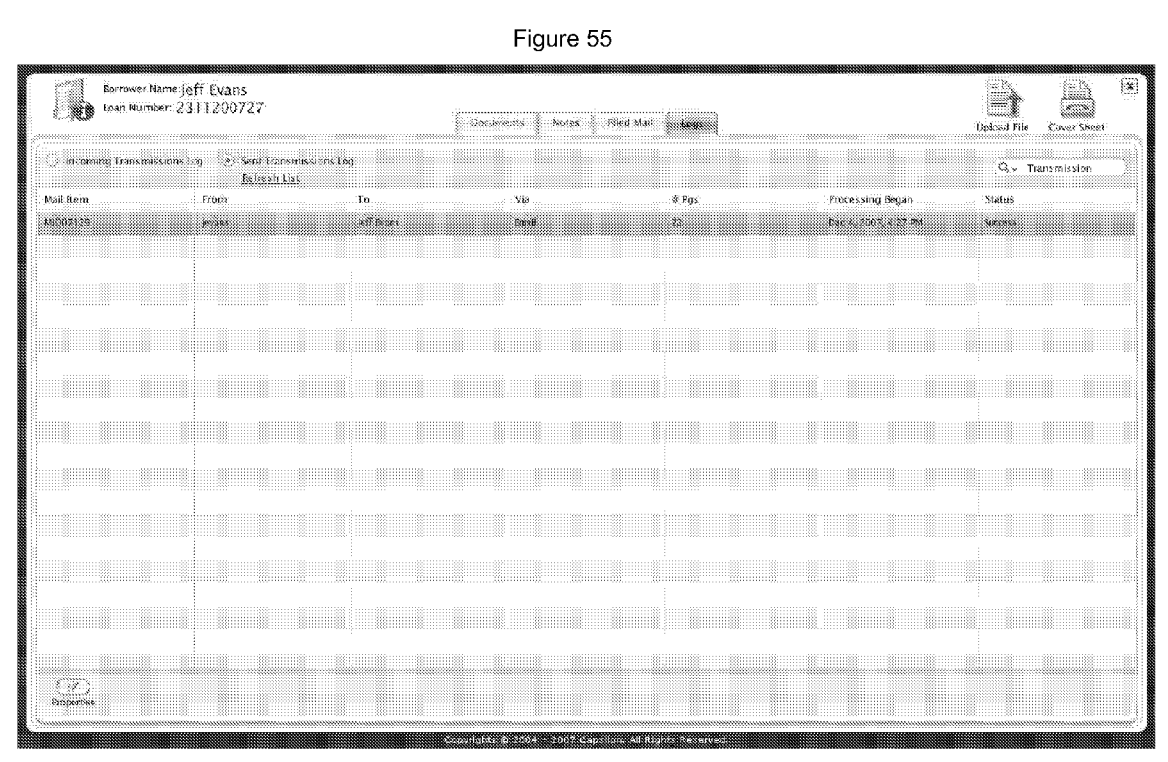

FIG. 55 shows the sent transmission log of the subject folder using loan katalyst.

Figure 58:
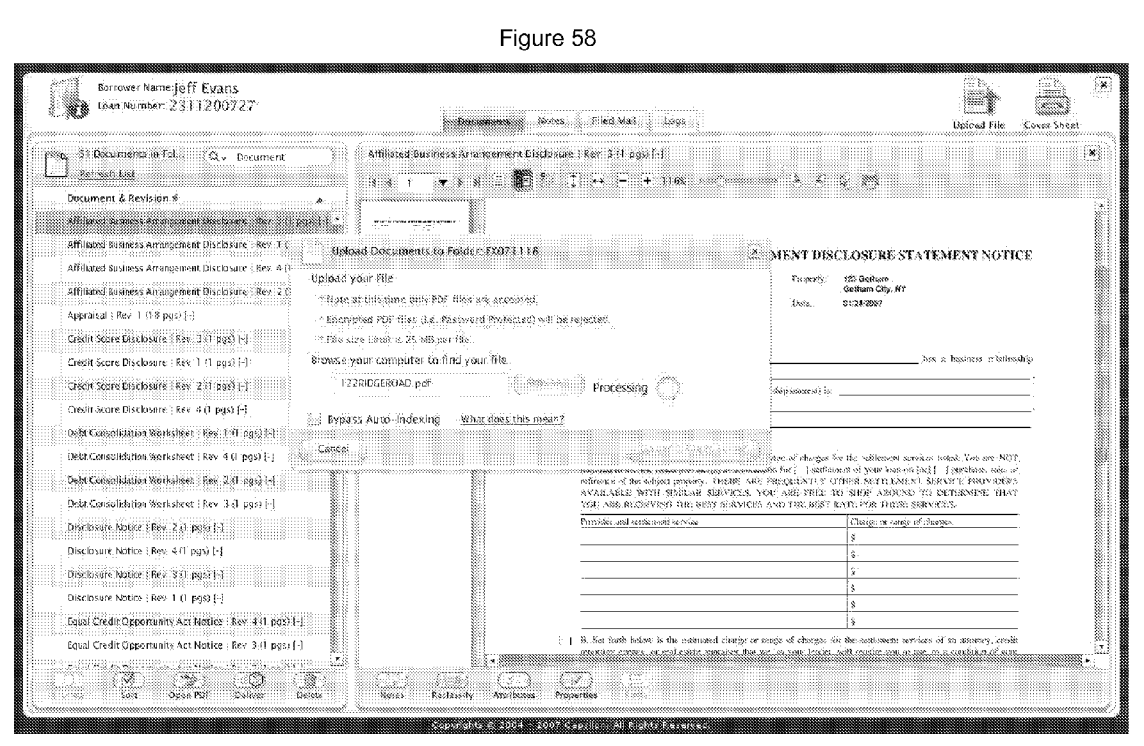

FIG. 58 shows that the user can choose to bypass auto-indexing and can monitor the process of uploading a document using loan katalyst.

Figure 63:
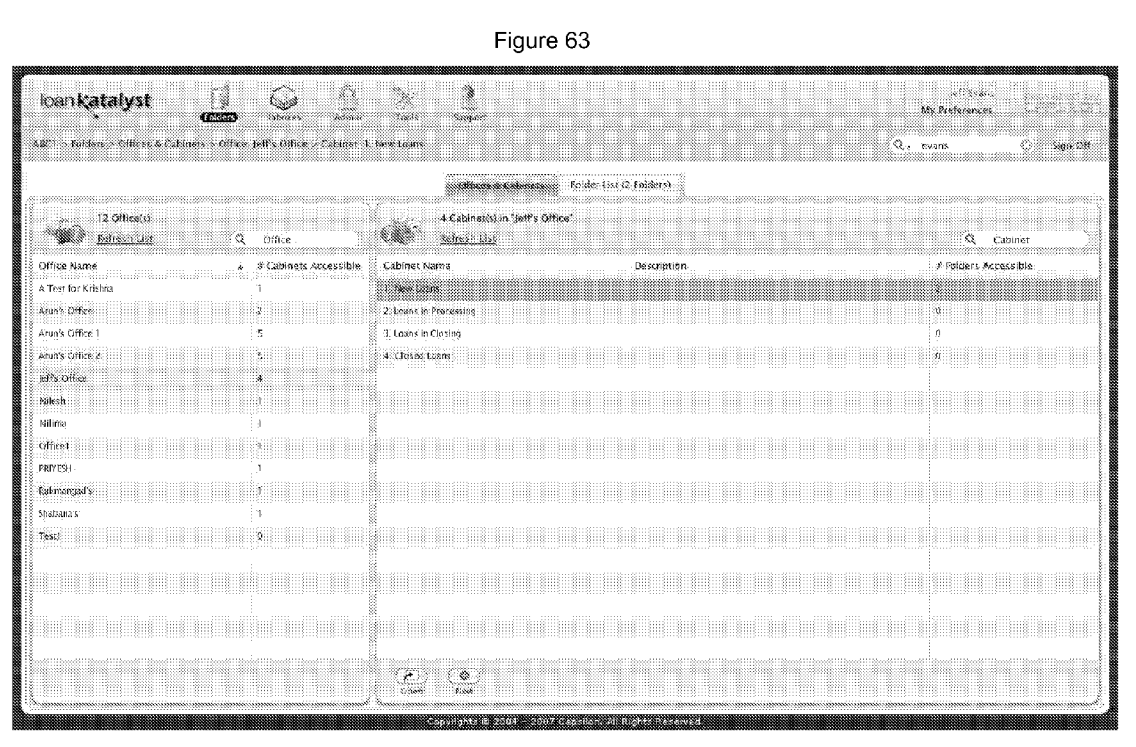

FIG. 63 shows that a particular user can access various offices and cabinets using load katalyst.

DETAILED DESCRIPTION OF THE INVENTION

Figure 1:
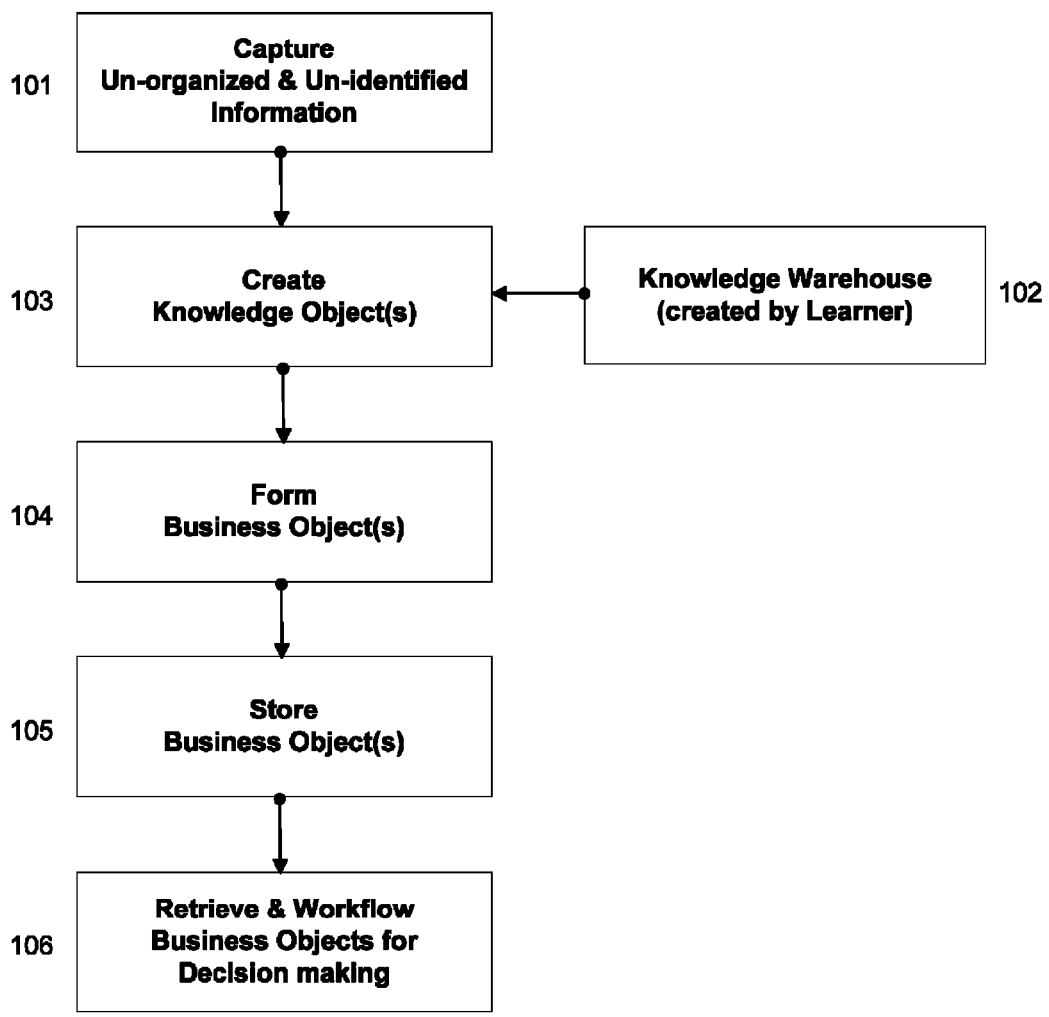
FIG. 1 depicts an overview of the business methods of the instant invention.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Workers in a variety of organizations and/or industries, such as the mortgage industry, especially the secondary market for the re-sale of mortgage loans, face the enormous problem of tracking a vast array of information presented to them in the form of paper documents arriving in a bewildering array of formats, and require that information transferred to an electronic form for rapid analysis and decision-making. Extracting exact data and/or information from idiosyncratic document sets with accuracy is essential for the data to be useful for decision-making.

As noted above, the MBA formed the Mortgage Industry Standards Maintenance Organization (MISMO) to address this problem. This group has driven the development of industry specifications that allow seamless data exchange using standard electronic mortgage documents called SMART Docs™. However, in order for the mortgage industry to fully utilize this standardization, every piece of software in the industry would have to be re-created to generate data to adhere to this standard. Hence, the industry requires a practical solution to enjoy the increased velocity and standardization that SMART Doc XML standards bring to the loan origination process using the current forms of data available such as paper images, and native PDF files. In a preferred embodiment, it is one of the objects of our invention to provide such a solution.

It is always difficult and time-consuming to determine the exact nature and identity of documents present in such a document set. For example, with reference to the mortgage industry, mortgage documents in some states, e.g., California, contain reports concerning the seismic environment of the subject property. In other states, such documentation might be rarely, if ever, be found in the package of documents associated with the sale of property, or the refinancing thereof (such a document package is referred to herein as the "Dox Package"). Further, without knowing the type of document or specific revision of the document being reviewed, up until now, it has been difficult or impossible to extract the required information from it by automated means. The exact documents provided in a Dox Package may prove insufficient because at a particular point in time, not all required pages of the documents may be available. Additionally, there may be a confusing variety or subvarieties for any given type of document, and further, essential information may be scattered across many or all the pages in the Dox Package. And for added complication, individual pages may arrive in a scrambled order in any given packet, and portions of the packet may arrive for analysis at different times. Obtaining accurate information in an organized form is the challenge solved by the instant invention. If a human were to enter the information into a computer, the process would be labor intensive and would be expected to take much longer. In preferred embodiments, a Dox Package may consist of at least two pages, at least three pages, at least five pages, at least ten pages, at least twenty pages, at least fifty pages, at least one hundred pages, or more. Further, as used herein, a Dox Package includes sets of documents in which all the information/data contained therein is not readily available in electronic or digital forms. Thus, a Dox Package may consist of a variety of documents some of which are electronic documents but some of which are paper copies only, or images, such as PDFs or TIFFs, of such paper documents.

The instant invention, in some embodiments, can extract the information from the heterogeneous set of documents that forms Dox Package and enter that information into a computer database much faster than, and in some embodiments, with minimal or no intervention from, a human operator; in some cases ten times as fast, twenty times as fast, thirty times as fast, forty times as fast, fifty times as fast, or more. Additionally, in one embodiment, the instant invention can extract and enter information from a Dox Package with human review of, at most, one page in ten, one page in twenty, one page in thirty, one page in forty, one page in fifty, one page in sixty, one page in seventy, one page in eighty, one page in ninety, one page in one hundred, or one page in over a hundred.

As used herein, a "Knowledge Object" is a matrix of the information and its association with reference to a particular business process. When a Knowledge Object is not specific to a process and/or a complete domain, it can be cluster of information. Knowledge Objects are intended to be useful and available for decision-making. The term "Knowledge Object," as used herein, refers to a set of facts preferably along with their relationship and association with other Knowledge Objects in a given Dox Package. Knowledge Object is a matrix of relevant information entities such as facts, image field coordinates, value type, intended to address and assist decision making in businesses.

As used herein, a "Business Object" is a collected and organized set of information extracted from a Dox Package intended for a business purpose and ready to use to illustrate relationships and/or the utility of Knowledge Objects. It gives a business-centered view of the extracted and organized knowledge for the decision-making process. An example of a Business Object is a MISMO standard SMART Doc As used herein, the term "Dox Package" refers to the pile, stack, or file of documents that is delivered, handed, and/or made available to the operator of the instant invention. In certain preferred embodiments, the Dox Package comprises mortgage documents and documents in support of a mortgage, or secondary financing thereof.

As used herein, "Taxonomy" refers list of document types (or document classes) expected in any Dox Package. Documents within the Dox Package or taxonomy may consist of multiple pages, but all pages are preferably logically related to the reference page (as defined below).

The term "escalation" as used herein refers to a subroutine within the method/apparatus in embodiments of the instant invention that when the method/apparatus finds a document and/or page it cannot assign or identify, it escalates the document and/or page out of the program, or automated document analysis, and displays the document to a human collaborator. In preferred embodiments, the page is displayed on a split screen with the "heading region" of the document page amplified at the top of the screen and the entirety of the document shown in the bottom of the split screen. The instant inventors have determined that the identity of most documents can be determined by clues obtainable in the header region.

As used herein, the term "buckets" is a location to store related pages during the processing involved in preferred embodiments of the instant invention. Buckets may later be correlated and classified to the operative taxonomy so that a given bucket becomes a document within the taxonomy system.

The term "forensic page analysis" as used herein refers to a detailed extraction and mapping of the image that forms a sheet or an image of a sheet wherein this mapping is used to identify the page and/or sheet. Forensic page analysis generates a Location Diagram and Feature Vectors.

As used herein, the term "reference page" refers to the most readily identifiable document in a set of documents or pages within a Dox Package. Frequently, it is the first page of a document, but that is not required by the definition as the first page of a document may be a cover page, such as a fax cover page. An example of a reference page is the front page of a Form 1003. The "reference page" herein is the page of a document that represents the maximum logical properties or identifying properties of the document with all subsequent document members able to be classified as having affinity towards this "reference page." This "reference page" could be, but is not necessarily, the first page of the document within a bucket or with the classified documents.

As used herein, the term "field" refers to the region of a document where specific items of information might be found. Thus, on a Form 1003 there is a field for a name where an individual's name is found; the individual's name is a "fact" and may also referred to herein as a "text snippet" when the fact is extracted from a field. Thus, fields are converted into facts by extracting the information and "scrubbing" the text output to create a value that can be utilized and/or consumed by a computer in the operation of embodiments of the instant invention.

As used herein, the term "information fields" refers to the content of the blanks on the forms, e.g., in the context of the mortgage field, the price of the property, the amount financed, the address, etc. or specific content from an unstructured document such as stated interest rate in a promissory note.

The term "Feature Vector" as used herein refers to a manner of mapping documents wherein the relationship of keywords to fields or keywords to other keywords is mapped both as to physical distance and direction.

The meaning of the term "Location Diagram" as used herein is best explained by an example. Each file is present in three formats: (1) the original .tiff image format, (2) the text format from simple OCR output, and (3) a grid format, i.e., a text pictorial representation of the document. All three formats are used in classification and extraction.

Assuming that A, B, C, D and E are five phrases, the overall representation that may come in a single feature-vector may be represented as follows:
(1) A and B form a meaning X;
(2) A is primary key;
(3) B is p columns and q rows away from A;
(4) with similar information about other key phrases being recorded.

These overall positions form a Location Diagram.

Here, the Location Diagram is a relative position map of key phrases represented in unique way by their vectors of relative distances. The structured files are represented in flexible structure maps called grid files.

Collation is done to segregate documents in groups to represent: (1) the Class-version, (2) the document identity (doc id), (3) page, and (4) versions and/or occurrences.

As used herein the term "collate" refers to the process of taking a bucket comprising a document, or a pages of a document, or sheets classified to the same taxonomy identified niche; analyzing the sheets located therein, preferably as well as all the sheets in a Dox Package, and sorting them into the correct buckets whereby all sheets belong to a document will be correctly sorted, and preferably different versions or dates of documents collected together. Thus, the term's definition comprises the dictionary meaning of "collates" whereby a collation occurs through a process that assembles pages in their proper numerical or logical sequence, and/or through a process examines gathered sheets in order to arrange them in the proper sequence. Collation also refers to the process of organizing Knowledge Objects into Business Objects.

OCR is generally referred to as the process of recognizing characters on an image file and converting them to ASCII text characters format.

As used herein, the acronym "NLP" refers to natural language processing, as is known to one of skill in the art.

As used herein, the term "Image Based Classification" refers to methods to classify documents using features and/or references other than text such as the visual page layout, the white-space distribution, and graphic patterns.

The purposes of instant invention include conducting a business and making business decisions using an automated acquisition and analysis of information from a Dox Package. This invention thus, in part, provides:

(1) a comprehensive method/apparatus that extracts relevant information from electronic images of paper documents to electronic data and assembles the extracted information with a very high level of accuracy and very little human intervention;

(2) a comprehensive method/apparatus that facilitates decisions at all levels by those with an interest in the documents or data therein by providing data with a quantifiable level of accuracy;

(3) a comprehensive method/apparatus for classification, collation, and identifying the version of documents together with relevant information extraction where the overall method/apparatus being enabled by an automatic document learner; and/or (4) a decision-engineering framework specific to a given business application to overview and analyze the extracted information. In preferred embodiments, the documents and/or information may be converted in an XML file format such as those defined for the mortgage industry by MISMO.

Although there are a few superficially similar classifiers and extractors in the present-day art, the instant invention has several advantages over the art by fulfilling some or all of the purposes noted above, and in its unique combination of document processing features which include some or all of the following features:

(a) it is enabled with automated document learner providing learning and classification at the level of a page, the level of a zone within a page, or the level of a field within a page;

(b) it is easily adaptable to any given business due to its learning ability;

(c) it provides incremental learning to allow the system/process to rapidly accommodate new variations of the same documents as well as new types of documents;

(d) it features incremental learning that enables the system to accommodate variations and adapt to the changes in patterns of documents;

(e) it provides validation and verification of located and extracted information specific to the business domain while minimizing extraction mistakes and providing a high confidence level in the accuracy of the results;

(f) it provides a Location Diagram-based extraction that allows for accurate extracting of information even with significant changes in the document formatting;

(g) it provides, via Location Diagram-based information extraction, the accurate extraction of information even when page boundary information is lost during the OCR process, including data slipping to other pages, and/or the format or organization of the document changes;

(h) it provides, via the Location Diagram-based classification and identification, the ability to provide the sequential number and order of pages based on intelligence built during learning the document set in the form of Location Diagrams;

(i) it provides the ability to separate multiple revisions of the same document type into unique documents by identifying the reference page of each document type and the Feature Vector affinity of associated pages of that document by using distance measurement algorithms; and (j) it provides the ability to further collate the information with the help of the grid of information created; and (k) it provides the ability to flexibly distribute collated documents or extracted information to a user, or sets of different documents or information to different users or decision systems using standards such as MISMO SMARTDocs or custom XML tags.

One of the advantages of embodiments of instant invention is the number of discrete pages it can analyze. Although other document analysis methods and apparatuses exist, the instant invention may handle more pages and more diverse pages than what was present in the art prior to the instant invention. Thus, in embodiments of the instant invention, 2, 3, 4, 5, 6, 7, 8, 9, 10, 13, 15, 18, 20, 25, 30, 35, 40, or more pages may be analyzed in on Dox Package. Also in embodiments of the instant invention, 2, 3, 4, 5, 6, 7, 8, 9, 10, 13, 15, 18, 20, 25, 30, 35, 40, or more document types may be analyzed in on Dox Package Thus, the instant invention provides a method/apparatus that analyzes, and collates documents, even individual versions of similar documents, preferably based on both their logical and their numerical sequence to systematically order groups of pages to enhance usability and to analyze them based on these grouped sets. These grouped sets are meaningful and comprehensive entities and are placed in their unique context for the specific business being supported. This collation takes place in spite of potential extreme variation in documents and in forms and the sequence of the documents or forms being input into the process. In preferred embodiments, the method/apparatus of the instant invention is directed to a specific business, the mortgage loan business, for example.

It is an object of the instant invention to provide comprehensive processes and systems that can convert relevant information from electronic images of papers and/or documents already in an electronic form to an electronic database with minimal human intervention. Further, "Knowledge Objects" are formed based on the extracted information. These Knowledge Objects may be further utilized to form "Business Objects." The Business Objects are collations of Knowledge Objects centered on specific business requirements and can be used for subsequent decision making. An additional object of the invention is to provide a managing tool that can help in learning and configuring the overall process.

It is also an object of the instant invention to classify documents and uniquely identify documents and revisions of the same document type, and extract information with the aid of automatic learners.

The method/apparatus of the instant invention may collate images of sets of pages for any given type of document package (referred to herein as the "Dox Package") presented to the operator or the apparatus of the instant invention. It is expected that documents in such a Dox Package may include images of paper documents, such as those in electronic .pdf files, native pdf files, or documents received by fax servers, for example in .tiff format. The instant invention, however, is not limited to the handling of such paper documents or images thereof. Thus, as used and defined herein, documents, sets of documents, pages, sets of pages, paper documents, form documents, physical pages, paper form, paper images, sheets, and the like includes documents and the like that exist in digital form, including documents, papers and forms, such as Microsoft®.doc documents and in other proprietary document formats, and the use of such are included within the scope of the present invention. Such documents may also contain embedded images, such as digital signatures or imported graphics or other documents, and likewise are included within the scope of use of the present invention.

In many preferred embodiments of the instant invention, documents are presented or utilized following the OCR conversion of original, signed or executed, documents or a text dump of the native pdf document. Along with mapping to standard MISMO taxonomy, the method/apparatus is also capable of generating its own taxonomy of buckets based on document features observed or recognized by the method/apparatus during analysis of the Dox Package. In this collation process, each page analyzed is assumed to hold a unique position within an individual document, and this page's position is determined and assigned. The method/apparatus initially assigns each page from the Dox Package the most logical bucket and the most appropriate position within the bucket; a page can belong to one and only one logical group. The position or a particular page and the sequence of pages is determined based on the page's purpose, location, readability and usability by the method/apparatus of the instant invention. After being assigned, the location of the sheet or page is preferably repeatedly re-evaluated and thus the accuracy of its position assignment, and the ultimate quality of the data, is increased.

In the case of ambiguity it cannot resolve in the assignment of a document to a bucket or to a page location within a bucket, the method/apparatus of the instant invention, in preferred embodiments, provides for escalation to a human collaborator or assistor to supplement the basic machine and expert-system-based collation. The level of ambiguity that triggers escalation may be preset, modified, or created during operation. In escalation, the human collaborator can determine the identity and classification of the ambiguous document and where it should be assigned to provide clues to the method/apparatus of the instant invention.

The present invention, in preferred embodiments, utilizes Location Diagram concepts and integrates multiple components including image processing, intelligent collation, feedback learning, a document classifier, a verifier, a versioning engine, an information locator, a data extractor, a data scrubber, and manual collaboration. Taking advantage of structured and unstructured properties of documents, the instant invention can convert representations of form documents into grid format, i.e., a text-pictorial representation. Using grid format, the instant invention can extract more and important features from the documents that then can help in formation of a Knowledge Object with very high level of accuracy and minimum human intervention. By using the method/apparatus of some embodiments of the instant invention, human review of pages within the Dox Package may only be required for one page in ten, one page in twenty, one page in thirty, one page in forty, one page in fifty, one page in sixty, one page in seventy, one page in eighty, one page in ninety, one page in one hundred, or less.

(a) Objects of Invention and their Description

Numerous paper transactions occur in various business fields such as the mortgage industry, the health care field, the various insurance industries, including the health care insurance industry, financial banking, etc. The papers, documents and other information involved in these transactions generally are not random but rather all have interrelationships within a specific business context. Dox Packages obtained during the course of business, or images thereof, typically are not very well organized especially due to the fact that they may be created or obtained by different entities and/or at different points in time. There is need for segregation and subsequent coherent organization of these documents, as well as extracting information from these documents, and organizing and collating the extracted information, e.g. into MISMO standard SMART Doc™, custom XML tag based, other commonly used data file formats, or those to be developed. The need for segregation, organization and collation of documents in the Dox Package arises from a number of reasons: (1) checking for completeness of the Dox Package, i.e., whether all documents required, necessary or desirable to those entities having an interest in the information contained in the Dox Package, are present in the Dox Package; (2) legal aspects of the information contained within the Dox Package; (3) business aspects of the information within the Dox Package, (4) extracting data from a large number of "hard-copy"-only documents or images thereof, which may only be possible from a 'representative number' dur to time or money constraints, (5) requiring rapid and inexpensive access to the data contained in the documents for analysis; and (6) having available or distributing documents or sets of documents in a segregated manner based on type of document or other criteria; and (7) making decisions based on the extracted data, including compilations, aggregations, and analyzed or processed sets of such data, optionally with an automated rules engine.

To address these needs and other needs associated with the collation documents and extraction of information, the inventors have devised a method and apparatus to accomplish these tasks to collate and analyze documents and sets of documents, and extract information from specific versions of these documents. The instant invention, in preferred embodiments, provides a comprehensive process and system which can convert information on papers or images to an analyzed and organized electronic form where it can be used for business decision-making.

The present invention, in some embodiments, solves the problems of sorting into versions, sequencing and collating documents and extracting information for specific industries. Thus one object of the instant invention is to provide users with separated, collated and sequenced documents. Users of the instant invention provide the method/apparatus a document set obtained in their course of business, a 'Dox Package,' which is then collated and analyzed to meet their business requirements. In preferred embodiments, all documents are provided at once in one location, although such documents may be provided at different times and from different locations. A feature of the invention is that paper documents that do not have all the data contained therein in a segregated digital form are readily used with the instant invention.

This invention, in some preferred embodiments, comprises a comprehensively automated process that can convert data from documents in paper form to electronic form without with little, if any, human intervention. The instant invention may collate and classify documents based on Location Diagrams, which are based on Feature Vectors and connectivity/relationships among them. Further, the engine used in the instant invention can locate and extracts information from documents based on these Location Diagrams with additional scrubbing. The product is equipped with learners, which work on Location Diagram distance maximization within and across the document classes to optimize results, a "studio" (user-friendly interface) and a warehouse for storage and making data available as required by the operator of the instant invention or others designated by the operator. This invention may use methods of solving Location Diagrams based on simultaneous equation- and weight-based confidence measurements. The invention may provide significant benefit to all industries that handle sets of documents, and in particular, large, disparate sets of documents, by accelerating and improving accuracy to current decision-making process when compared to existing and traditional methods/technologies.

The instant invention, in some embodiments, provides a method/apparatus that collates and analyzes a set of documents. The apparatus automatically employs various algorithms to identify groups or logical units of documents. These algorithms work to complement one another to yield higher quality results. Further, the method/apparatus of the instant invention utilizes and takes into account discontinuities, for example, a page break in the middle of a sentence, to assemble pages of a document. Each of these logical units is a complete document identified as to its business identification and mapping to location within the taxonomy.

Further, the invention's method/apparatus preferably measures relatedness among various pages; to accomplish this the method/apparatus works on the principle of a reference page. As used herein, a "reference page" is a page that represents the maximum or near-maximum logical properties of a particular document, and thus all the subsequent document members have affinity towards this reference page. A reference page frequently is, but is not required to be, the first page of a given document. Using the principles of the instant invention, the logical sequence of a Dox Package is related to its purpose, location, readability and usability. Grouping and collating using the principles of the instant invention is concerned with completeness, usability, integrity, and unique occurrence.

The classification and collation unit as used in the instant invention in a preferred embodiment has an Image Based Classifier, a set of text based classifiers, versioning engine, an intelligent collation engine and a verifier. The text based classifier preferably has a set of classification engines and each classification engine confidence is prioritized based on its strengths in handling particular types of documents as will be determined by the particular application and recognized by one of skill in the art operating the instant invention.

The reference page identification method in one embodiment uses a hybrid approach where an affinity determination method is used in connection with an input dictionary, but can also provide feedback to enhance and/or enhance the input dictionary. This dictionary preferably not only provides a list of words but also gives quantitative relevance of words and phrases with reference to each class of document. Keywords and keyphrases have a high affinity towards a given document. For example, word 'W1' is defined as having a very high chance of occurrence in document 'D1' (e.g., the word 'interest' ('W1') in a mortgage note ('D1')) then, according to the uses and principles of the instant invention, the word 'W1' has high affinity towards document 'D1.' This affinity may be determined using Bayesian analysis and is represented as a probability or a conditional probability. Other Feature Vectors such as font size and type may also be considered in determining the affinity of a page to the reference page of document being examined. There is no limit to the number of Feature Vectors that might be considered for affinity analysis.

The method/apparatus employs a multi-level approach to identify documents. Typically, the first pass, or Level-1 approach identifies some of the reference pages efficiently and quickly. Level-1 analysis may identify some reference pages along with their respective classes. Using the instant invention, attempts are made to identify classes for the remaining pages. In preferred embodiments, Level-1 uses various statistical algorithms, e.g., algorithms based on SVM and Bayesian. In preferred embodiments, the Level-1 reference page identifier is integrated with multi-algorithm classifier which selects the best of set of algorithms based on input data.

These reference pages are mapped to a taxonomy class by measuring the association of Feature Vectors and the relevance of the reference page using supervised learning. The closeness of other pages with reference to reference page is measured. This closeness is used to establish association of these pages with respect to the reference page. The pages in the document are arranged in logical/numerical sequence using this relevance.

The classifier takes advantage of various methods like word phrase frequency, Bayesian analysis, and SVM, but is not limited to these methods and has the capability to give priority and higher weight to the most suitable method to be used for the given document for maximum accuracy and usability.

In some of these preferred embodiments, Location Diagrams and Feature Vectors are neither required nor generated. Documents identified by Level-1 algorithms as ambiguous or as having affinity for more than one taxonomy class proceed to Level-2 analysis. Thus, all the documents that could not be handled in the Level-1 process effectively or routinely by the classifier are sent for verification in a Level-2 analysis. The verifier used in the Level-2 analysis is preferably capable of resolving the ambiguous document classes leftover from the Level-1 analysis. The instant invention also can resolve and relate documents belonging to multi-class families and documents that are within families or a group of classes that are similar. The verifier produces the final identification in these multi-class scenarios, using a combination of voting and critical-feature-based class verification.

In preferred embodiments, with the Level-2 analysis, all the documents that are unable to be classified in the Level-1 analysis are processed using critical-feature-based verification approach. In other embodiments, all documents are processed using the Level-2 analysis. The Location Diagram Map approach used in the Level-2 analysis in some preferred embodiments of the instant invention provides the required discrimination and accuracy to handle ambiguous documents and correctly classify or collate them. In preferred embodiments, this Level-2 reference page identifier uses critical-feature-based verification and voting, along with the verification algorithm and is referred to as the "verifier."

In preferred embodiments, the collation process provides for documents to be given a logical and/or numerical sequence. Thus in accordance with the instant invention, a Dox Package is collated with reference to a prescribed or developed taxonomy where the taxonomy classes are characteristic of the industry, (e.g., industry standards like MISMO) or required or desirable by the industry, yet may be adjusted by the operator/user of the instant invention.

Each document and/or page within the Dox Package is mapped to a class according to the taxonomy. The method/apparatus of the instant invention classifies these documents and collates sets of pages for industry standard taxonomy like MISMO, or any given taxonomy. A further feature in some embodiments of the instant invention is that the method/apparatus of the invention is also capable of generating its own taxonomy based on document features it observes. The overall method assigns most logical document structure based on the taxonomy and most appropriate position within each document for each page.

The separation, collation, and sequencing of the documents is taxonomy-based set by users' business requirements or defined by the field of use, such as MISMO standards, for the documents processed in the instant invention. The initial grouping into buckets and then refined into documents is utilized to further extract information specific to each document and Dox Package and is an important feature of preferred embodiments of the instant invention from the business perspective.

The instant invention may thus assign meanings to the documents and put them in their proper business context by the use of the separation, sequencing and collating methods described above. Each document, group, or subset formed within the Dox Package is based on the document's, group's or subset's use in the relevant business.

In preferred embodiments, the system has human collaboration along with its basic machine learning and expert system based collation.

In preferred embodiments of the instant invention, the method/apparatus of the instant invention is also equipped with a fact extractor for use with the pages, documents or sets of documents in the Dox Package. This fact extraction capability provides for locating and extracting the information/fields required for various business/compliance requirements and transforms the information contained therein to facts or data that can be subject to further use or manipulation. Preferably, the fact extractor is also equipped with weight-based confidence measurement. The fact extractor enables, in part, facts of all types and coming in various forms in the original documents to be accessed, extracted and/or manipulated. As with one feature of the instant invention that ultimately provides for pages, documents or sets of documents to be separated, classified or collated, the fact extraction feature of the instant invention allows for human collaboration for exceptional or problematic documents, although such human intervention is not required. The instant invention can handle all types of fields, e.g., OMR, tables, descriptions, numbers and the like, that will be known to those of skill in the art, depending on the particular business application. The decision system that is optionally used as part of the instant invention provides logical decisions based on this information obtained or extracted and the relevant business context. The preferable need-based human collaboration built into the system makes it possible to extract information and/or data from fields with a very high level of accuracy and coverage.

In preferred embodiments, the instant invention also provides a decision-engineering-framework specific to the business application to organize and utilize the extracted information. Thus, the information extracted from a Dox Package is preferably presented in a usable format, such as a spreadsheet or XML tag file format. Further, automated decisions may be made on the information obtained by an automated rules engine such as Microsoft BizTalk, ILOG jrules, etc.

In an preferred embodiment, an appraisal report regarding a piece of property (most of which are created as PDF files, if they are available electronically at all) and extract the information (including unstructured information), to create an XML output. This output can be used for a variety of purposes such as it may be furnished to a company that evaluates and scores the accuracy risk of the appraiser's information, to generate a report similar to an AVM to a mortgage banker for a business decision. In preferred embodiments, the instant invention may convert the information from an appraisal into electronic data over 100 times as fast as a human operator and with better accuracy.

In another preferred embodiment, the instant invention can extract information automatically from a credit report. This information may be furnished, for example, to a mortgage lender for their risk assessment process.

Thus, in preferred embodiments, the instant invention provides for collation of all the pages, documents, or sets of documents within a Dox Package into a taxonomy classification to meet the business needs of the operator and/or a particular industry. Virtually any Dox Package from any industry may be analyzed by preferred embodiments of the instant invention. Thus, the collated documents are mapped as to a taxonomy such as MISMO or any other industry-specific or user-specific taxonomy. As part or in addition to this, information is extracted from this Dox Package. This information is scrubbed and transformed into discrete data and/or facts. The facts and its related information is used to form an information matrix called a Knowledge Object. The Knowledge Objects are transformed in a particular or required business context to create Business Objects. The Business Objects are then used for business decision-making. In preferred embodiments, the instant invention therefore facilitates extraction of critical information for businesses from the documents, and provides for manipulation, compilation, analyzing and/or access to the facts or data or creation of transaction sets that comply with the MISMO SMART Docs™ standard and/or other custom XML tag file formats.

Advantages of the Instant Invention

Methods currently available do not meet all the objects of the instant invention, but rather have contributed to the shortcomings, problems and challenges present in the art. Preferred embodiments of the instant invention provide advantages over the current state of the art and these embodiments improve upon them because of all or some of the following reasons:

a) the instant invention, in preferred embodiments, offers a comprehensive process which takes unorganized documents or document images and yields extracted information suitable for business decision-making;
(b) the instant invention, in preferred embodiments, provides for an automated method with exception-based human collaboration ("escalation") to collate with increased speed and accuracy;
(c) the instant invention, in preferred embodiments, provides superior accuracy and quantifiable measures for accuracy;
(d) the instant invention, in preferred embodiments, is the only comprehensive collation solution which can collate pages, documents, or sets of documents identified by revision numbers, for business decision making purposes;
(e) the instant invention, in preferred embodiments, is not limited to document separation by boundary detection algorithms;
(f) the instant invention, in preferred embodiments, provides for the mapping of documents and document images to a MISMO taxonomy, as well as other industry standard and custom taxonomies;
(g) the instant invention, in preferred embodiments, locates and extracts information from documents and document images sorted into buckets with a high degree of accuracy;
(h) the instant invention, in preferred embodiments, provides, among others, the features of intelligent scrubbing and fact conversion and/or other data manipulation features; the fact conversion converts extracted information into data or facts that offer value to businesses and provide direct input into an automated rules engine using custom or industry standard XML formats such as those specified by MISMO;
(i) the instant invention, in preferred embodiments, provides an automated learner which can accommodate and incorporate new document types, and the intelligence to deal with variations in the number and type of documents and field locations;
(j) the instant invention, in preferred embodiments, can incrementally learn to adapt to changes in the patterns between and/or within documents;
(k) the instant invention, in preferred embodiments, validates and verifies collated documents, and Knowledge Objects to improve accuracy;
(l) the instant invention, in preferred embodiments, provides a Location Diagram-based extraction for accurate extractions in case of slippage, variations and changes in format; and
(m) the instant invention, in preferred embodiments, features in some embodiments a collation confidence matrix to be able to assess the confidence level of the method or algorithm, plus the instant invention, in preferred embodiments, may effectively use all clues gathered during all phases of document processing and analysis to validate the accuracy of the result. Thus, by use of the instant invention, business decisions, such as whether to invest in a bundle of loans on the secondary market, may be based on extracted information from a large number of the associated Dox Packages, or a majority of the associated Dox Packages, or almost all of the associated Dox Packages.

One of the advantages of embodiments of instant invention is the number of discrete pages it can analyze. Although other document analysis methods and apparatuses exist, the instant invention may handle more pages and more diverse pages than what was present in the art. Thus, in embodiments of the instant invention, 2, 3, 4, 5, 6, 7, 8, 9, 10, 13, 15, 18, 20, 25, 30, 35, 40, or more pages may be analyzed in on Dox Package. Also in embodiments of the instant invention, 2, 3, 4, 5, 6, 7, 8, 9, 10, 13, 15, 18, 20, 25, 30, 35, 40, or more document types may be analyzed in on Dox Package.

The systems and methods described herein provide the capability to ensure that the right information is always available to the right people at the right time. Although outsourcing and offshoring typically require a paper-based system, such paper-based system can be converted to images using systems and methods described herein to unlock data that needs to be accessible to make decisions. Using systems and methods described herein, trailing docs are automatically sent to the correct electronic folders, bypassing mailroom delays, and even brokers offices are made virtually paperless. Tasks can be handles as easily offshore as onshore, if such outsourcing fits into the lender's plans.

Illustration of the Instant Invention

As described above, the instant invention is, in preferred embodiments, a process and system for separating, organizing and retrieving information from various documents, for example from a Dox Package. The system preferably employs a collator, a classifier, an extractor, a scrubber, a verifier, a version engine, a voting engine, a transformer for creation of Knowledge Objects and Business Objects, a decision engine and a learner for classification and extraction.

Figure 6:
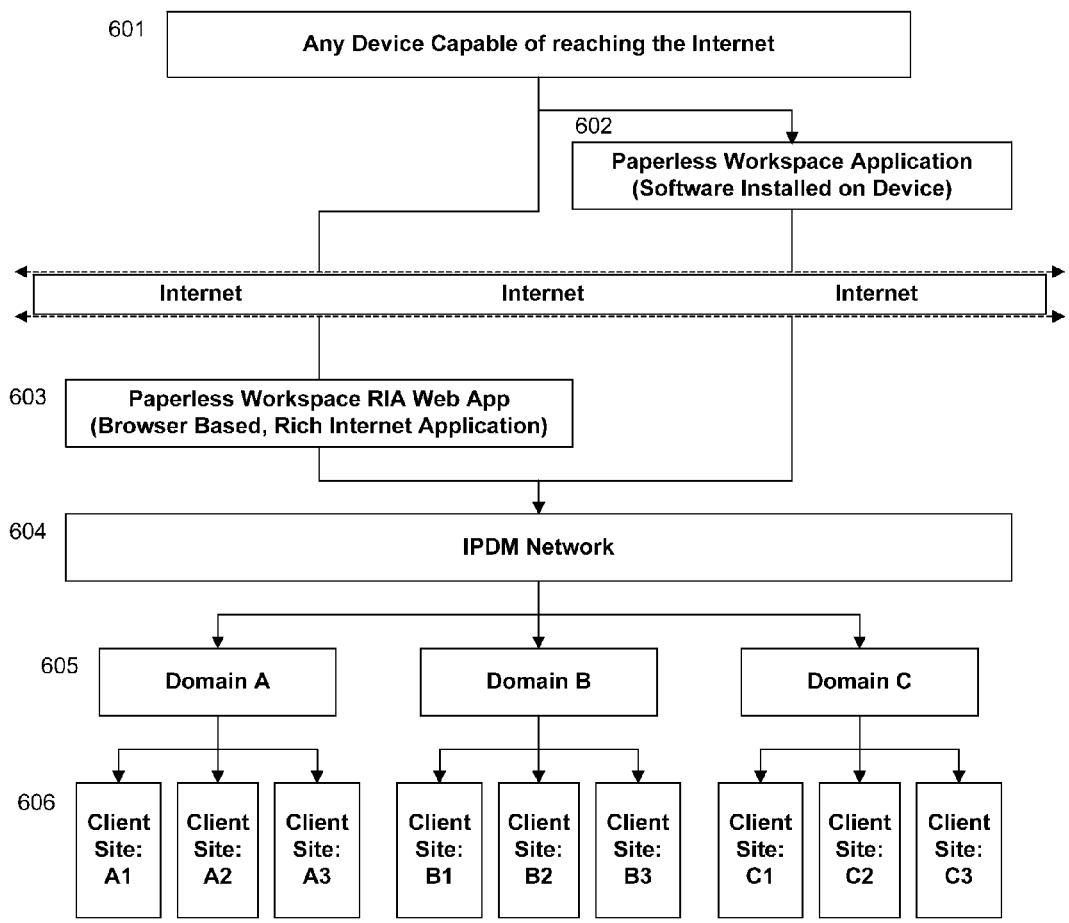
FIG. 6 shows an exemplary embodiment of the network deployment of intelligent paperless document management (IPDM).

An exemplary embodiment of the invention is illustrated by FIG. 6 depicting a deployment method to execute a Web-based method for intelligent paperless document management. As shown in 601, any device capable of reaching the internet can be used for accessing a paperless workspace of the subject invention. The paperless workspace can be represented to the device through a web browser as a Rich Internet Application 603 or through an installed software application 602 local to the device that accesses the paperless workspace securely via the Internet. The applications that represent the paperless workspace can communicate securely through the Intelligent Paperless Document Management Network (IPDM Network 604). The IPDM Network 604 can act as the gateway and hub to route all common services and host the engines required by the systems and methods described herein.

Domains 605 and Client Sites 606 are logical subsets of the full functionality available via the systems and methods described herein. For example, the Domain A in 605 may be a private labeled sales organization that markets and fulfills demand to certain industries, such as "LoanKatalyst" primarily caters to the industry comprised of US Mortgage Bankers/Brokers. The LoanKatalyst Domain (Domain A) is a sales organization that has used the systems and methods described within to pre-define capabilities for the attached Client Sites that primarily house "Mortgage Loan Folders." The Client Site 606 comprises the entirety of secure data and configurations for each mutually exclusive Intelligent Paperless Document Management for an organization and/or user. Client Sites A1, A2, and A2 in 606 within the LoanKatalyst Domain (Domain A) may be restricted to a pre-defined sub-set of capabilities outlined by the systems and methods described herein, whereas Client Sites within a different domain may employ a different sub-set of capabilities. Domains 605 described herein allow sales organizations to constantly provide the right type of functionality to the right people and organizations. In some embodiments, the systems and methods described herein require at least one configured IPDM Network 604, at least one configured Domain 605, and/or at least one configured Client Site 606.

The Web-based Rich Internet Application representation of the Paperless Workspace 603 can be critical to providing an authorized end-user a user experience that enhances the decision to "go paperless" by enabling the user to have a digital paper experience as friendly and accessible as using paper. By using application development tools such as AJAX, Adobe Flex, etc, the systems and methods described herein can be deployed either on the desktop through compatible operating system extensions such as Adobe AIR, or through Web-based browser plug-ins such as Adobe Shockwave Flash. In some embodiments, the systems and method described use the deployment of a Paperless Workspaces Application as a Rich Internet Application.

Figure 7:
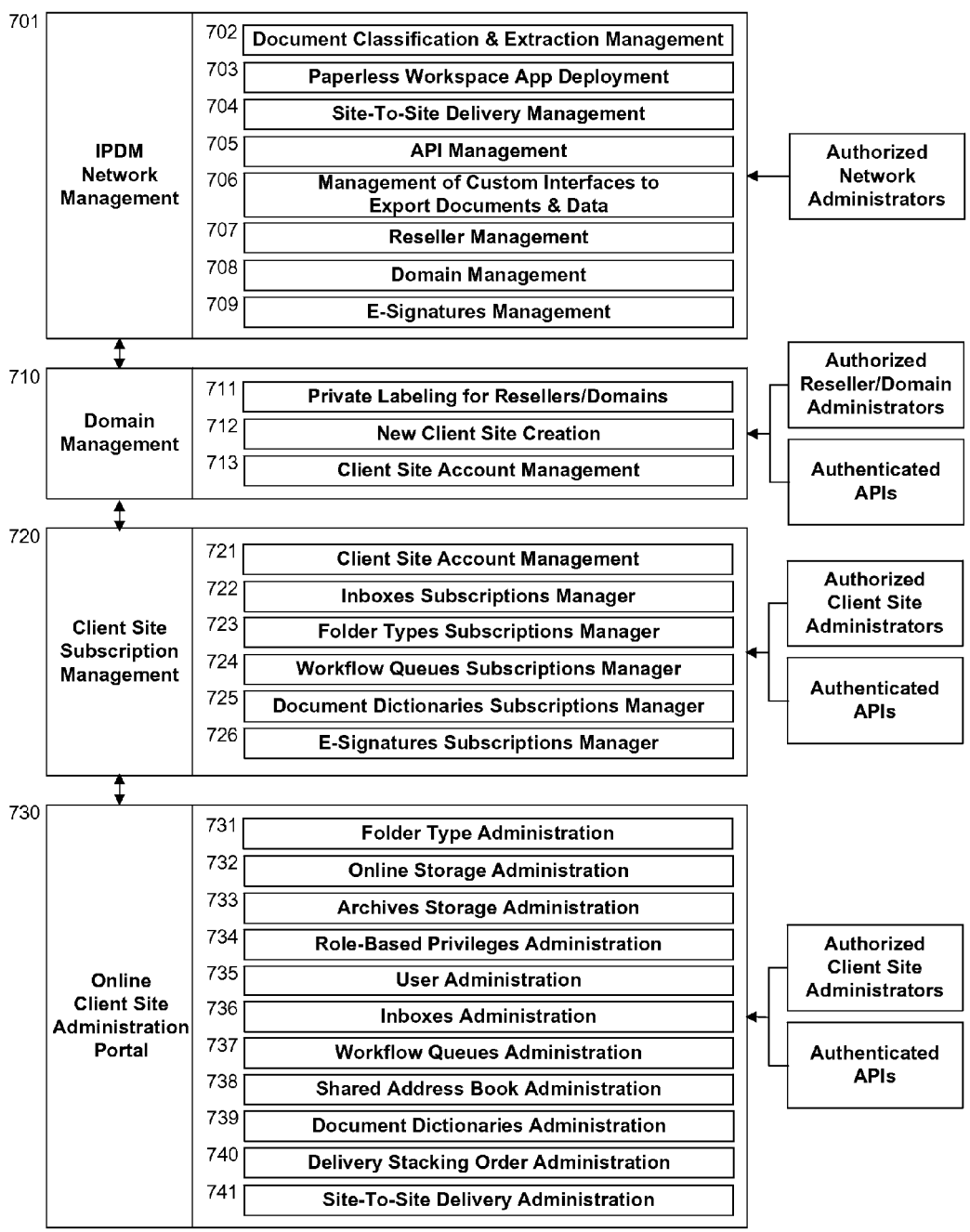
FIG. 7 shows an exemplary embodiment of the administration of intelligent paperless document management.

An exemplary embodiment of the invention is illustrated by FIG. 7 depicting the configuration management and administration of a Web-based method for Intelligent Paperless Document Management. As shown in FIG. 7, a flexible configuration and administration chain having various modules such as the IPDM Network 701, Domains 710, and Client Sites 720 and 730 can be deployed to form the foundation of administration for the systems and methods described herein.

In step 701, Authorized Network Administrators (at the right side of FIG. 7) can be used to configure and administrate the IPDM Network. The IPDM Network Administration 701 can include at least one of the following components: document classification and extraction management 702, paperless workspace application deployment 703, Site-To-Site delivery management 704, secure application program interface management commonly referred to as "APIs" 705, management of custom interfaces from the network to export documents and data to third party data and document systems 706, management for creation and administration of reseller organizations 707, as well as the management for creation and administration of Domains 708.

In step 702, the extension of auto-classification (automatic indexing) and data extraction from submissions of organized or unorganized digital paper can be used to create the foundation for the deployment of Intelligent Paperless Document Management, where such Intelligent Paperless Document Management can stand up to the real world needs required to eliminate paper from an organization. Step 702 can use document classification (automatic indexing) and/or extraction engines described herein or any other commercial available auto-indexing/extraction engines. These engines can be coupled with respective libraries of document dictionaries depending on the industry of choice. Document dictionaries can be defined where a series of learned documents are grouped together to efficiently solve a business problem identified industry by industry. For example, the "US Residential Mortgage Loan Document Dictionary" used by the LoanKatalyst Domain (Domain A in FIG. 6 and a domain in 710 here) provides the capability to create an extendable group of learned documents that can be used in the auto-classification of submitted documents through an Inbox that is assigned to a LoanKatalyst Client Site (such as Client Site A1 in FIG. 6 and a Client Site in 720 here). Each Client Site can take the advantage of using an auto-classification (automatic indexing) engine described herein, or any other commercial classification/extraction engine available for license.

In step 703, at least one paperless workplace app deployment can enable and manage authorized end users to access digitally represented paperless workspace using any device that can access the Internet through these applications. In step 703, multiple applications can be devised and deployed to provide authorized end-users with a rich interface that can model and enhance a user experience similar to actual paper. Due to emphasis on end-user experience, different applications may be needed for different types of users to provide a tailor-fit paperless workspace experience to an intended user at every time.

Step 704 shows the configuration and management of Site-To-Site delivery of documents and/or data among various Client Sites. Client Sites can be provided with capabilities and administrative tools required to allow delivery of documents and/or data from other Client Sites to their Client Site. For example, a Mortgage Lender, who uses a Client Site A1 on the IPDM Network, can receive documents of a new loan submission from a Mortgage Broker, who also uses a Client Site A2 on the IPDM Network, using the Site-To-Site delivery in step 704. The IPDM Network can provide all the necessary services required to deliver authorized groups of documents & data through the network securely without requiring the digital package to travel outside of the network.

Step 705 shows the management of application program interfaces (APIs) that allow authorized third party developers to create interfaces from third party systems to the systems and methods described herein.

Step 706 shows the management of custom interfaces developed specifically using third party APIs or industry standards to enable the link between the systems and methods described and third party systems based on business rules and authorizations specified at the Domain and Client Site levels.

Step 707 describes the management capabilities for the Authorized IPDM Network Administrators (at the right side of FIG. 7) to create and administer distribution relationships called "Resellers" that may distribute Client Sites under certain specific Domain(s).

Step 708 describes the management capabilities for the Authorized IPDM Network Administrators (at the right side of FIG. 7) to create and administer Domains for extending the flexibility of IPDM Network systems and methods down through a Domain to be used by the Client Sites. At the IPDM Network level, the Domain can be created to extend and make available different types of functionality based on the needs and requests from Domain Administrators. In some embodiments, Client Sites can be shown with the LoanKatalyst Domain labeling. The LoanKatalyst Domain provides the capability to extend the flexibility of the systems and methods described herein to create a user-friendly way to create a paperless mortgage loan for use by all interested parties in the US Mortgage Industry. Typical administration tasks can include at least one of the following components: the extension of Document Dictionaries to link to Inboxes, Folder Types, and Workflow Queues, as well as the exporting of documents and/or data from the system to third party mortgage data or document systems. Through the practical example of the LoanKatalyst Domain, the systems and methods described herein can provide extension by Domains to an easy to use, yet incredibly advanced and paper-like business method of creating a paperless transaction and paperless workplace in any industry applied.

E-Signatures are quickly becoming a viable method for execution of documents within the United States and can be expected to grow throughout the world. The implementation of an easy to deploy and use E-Signature protocol within a paperless workspace can be important to maximizing the possibility of eliminating all paper in an organization that deploys a Client Site. Management and Deployment of E-Signature protocols for the IPDM Network are depicted in step 709. E-Signatures requested by subscribing Client Sites at the Online Client Site level can extend the IPDM Network's E-Signature systems and methods. Recipients of deliveries requiring E-Signature can access the Document Pickup and E-Sign Portal (as shown in Step 821 of FIG. 8) through a link. If the Recipients are not authorized to perform E-Signatures, the Recipients can create an E-Signature account on the IPDM Network. Once authorized E-Signatory account holders, Recipients can download and install an application that works in conjunction with the Document Pickup and E-Sign Portal to validate the identity of E-Signatories against the documents required for E-Signature. In some embodiments, E-Signatories may have future access to download or print copies of the documents provided for E-Signature. Once the E-Signatures are collected, the information can be vaulted and encrypted using industry electronic signature standards on the IPDM Network and the recorded transaction and documents can be accessible to the Online Client Site. Delivery of documents bearing E-Signature data can be handled on an industry by industry standard.

Step 710 shows the management on the Domain Level by the Authorized Domain Administrators (at the right side of FIG. 7). Authorized Domain Administrators can be provided with the ability to use at least one of the following available interfaces: the management of private labeling per Domain for Resellers 711, the creating of new Client Sites 712, and the management of the accounts of previously setup Client Sites 713.

The Authorized Domain Administrators (at the right side of FIG. 7) can be provided with necessary tools for putting private labels onto the Client Site applications that will attach to that Domain (Step 711). Such management tools can include at least one of the following capabilities: the ability to change logos, color schemes, automated messages, and other branding opportunities. Due to the incredible flexibility of the systems and methods described herein to deliver Intelligent Paperless Document Management, distributions of Client Sites can be maximized by having Domains that focus specifically on extending the capabilities to focused verticals of expertise by distribution agent or Reseller, using the systems and methods in such a way as to make the smoothest transition to paperless for each Client Site without requiring intimate technical knowledge.

Step 712 shows that Authorized Domain Administrators (at the right side of FIG. 7) can directly create new Client Sites or enable authenticated APIs to have Client Sites sign up through a Web-based form to auto-create a new Client Site attached to the Domain. In some embodiments, a new Client Site can be automatically created for the LoanKatalyst Domain with a click of a button. Due to the complete prior configuration of the IPDM Network and that of the Domain, creation of Client Sites attached to the LoanKatalyst Domain can be automatically generated within a matter of seconds using the systems and methods described herein. This is advantageous to the distribution to users enhancing the perception of an easy-to-deploy paperless workplace.

After Client Sites are created and established, Authorized Domain Administrators can be provided with management tools to manage the accounts of the Client Sites, as shown in Step 713. Examples of such management tools include, but are not limited to, managing the status of Client Sites, canceling a Client Site from the Domain, and modifying the subscriptions to services/methods/apparatus that are made available to the Client Site through the Domain.

In step 720, at the Client Site level, Authorized Client Site Account Administrators (at the right side of FIG. 7) can manage each Client Account and their subscriptions separately through a Client Site Subscription Management portal to services offered by the Intelligent Paperless Document Management systems and methods defined herein. The Client Site Subscription Management portal 720 can use at least one of the following management tools: Client Site account management 721, and management of subscriptions to Inboxes 722, Folder Types 723, Workflow Queues 724, and Document Dictionaries 725. Changes to subscriptions within Client Site Subscription Management 720 can yield direct changes to further administer on the Online Client Site.

In step 721, the Client Site Account Management can provide means for Authorized Client Site Subscription Administrators (at the right side of FIG. 7) to manage their account status, account information, and/or their list of Authorized Client Site Subscription Administrators.

The Client Site can be provided with the ability to extend its functionality by subscribing to additional services offered through the Domain. One such extension is the capability of expanding the list of Inboxes that allow intake of documents and data from both third parties and authorized users. For example, in some embodiments for the LoanKatalyst Domain, a Client Site must have at least one Inbox that is configured to allow for the transmission of digital data through a designated Fax Number, Email address, SFTP site, HTTP adaptor, etc. This method describes a publically accessible Inbox which can be further expanded through the Inboxes Subscriptions Manager 722. A Client Site may wish to have multiple publically accessible Inboxes to extend its business practices. In some embodiments, a Client Site on the LoanKatalyst Domain can provide at least one following publically accessible inboxes: Company Inbox, New Retail Loans Inbox, New Wholesale Loans Inbox, and an Employee Inbox for every employee. Publically accessible Inboxes may require the IPDM Network to assign a list of addresses such as Fax Numbers, Email Addresses, SFTP and HTTP locations. These locations can be publically accessible to transmissions of documents and data to those addresses to be routed to the subscribed Inboxes.

If authorized by the Domain, the Client Site can be provided with the ability to expand subscriptions to Folder Types represented by Step 723. Folder Types are a type of extendable container for documents with associated, configurable and searchable meta-data attributes and document properties. For instance, the LoanKatalyst Domain can make accessible a "Mortgage Loan Folder" type that has a pre-defined list of attributes specific to what a mortgage industry professional may use to describe, search for, and organize a paper-based mortgage loan folder such as text fields entitled "Borrower Name," "Loan Number," "Property Address," "Loan Officer," "Processor," "Lien Position," etc. A Client Site can provide a user the ability to create a New Folder by creating an instance of a Folder Type for which they subscribe, which would then extend the attributes and document properties of the Folder Type to that instance of the new Folder. For example, a New Folder created using an instance of the "Mortgage Loan Folder" in the LoanKatalyst Domain would allow the user to enter searchable data in the folder attributes such as: Borrower Name "John Smith"; Loan Number="200609129283A"; etc. Furthermore, the Folder Type repository can have additional modifiable properties that may be specifically associated to any documents that reside "within" an instance of that Folder Type. Again, using the LoanKatalyst "Mortgage Loan Folder" example, documents within can be modified to have a "Submitted to Underwriting Date," "Cleared Underwriting Date," or other specific information that may be useful on a Document by Document basis for documents residing in a Folder of Type "Mortgage Loan Folder." In step 723, each Domain can be provided with the ability to extend multiple pre-defined Folder Types for which the Client Sites may choose to subscribe. Furthermore, a Domain can be provided with the ability to allow the Client Site the ultimate flexibility to create their own Folder Types, and allow the Client Site to subscribe to a number of those custom Folder Types in step 723.

Extending workflow into the paperless world may require methods to extend advanced technological capability across many types of business apparatus through an easy-to-understand method. Step 724 shows the Workflow Queue systems where the methods described herein can be extended to the Client Site through subscription by Client Sites that wish to deploy workflow through Intelligent Paperless Document Management. In some embodiments, if a Client Site wishes to deploy Queues as authorized by being a member of the Domain, they may merely subscribe to them and administer them at the Client Site level.

In step 725, Client Sites can be provided with capability to manage their subscriptions to document dictionaries of learned documents as well as to submit requests to the IPDM Network to learn and incorporate new documents into a subscribed document dictionary that are custom to that Client Site. Step 725 can truly bring the power of auto-classification and extraction to the fingertips of business administrators. For example, a Client Site on the LoanKatalyst Domain may have an internal document named "New Wholesale Loan Checklist" which is a PDF document that is internal to that user organization and is filled-out by hand with data using Adobe Acrobat for each loan that comes into the organization. Such a Client Site may prefer that the document be auto-classified and may also wish for the data that is input to the PDF be extracted in a certain format. Step 725 can allow the Client Site to electronically submit samples of the document and data that the Client Site wishes to be learned, and subscribe to having that document/data added as a custom learned document to one of their subscribed document dictionaries.

Client Sites may use Step 726 to manage their subscription to E-Signatures. If a Client Site would like to deploy E-Signature methods within their Online Client Site, they may manage their subscription to E-Signatures using Step 726.

In Step 730, the Authorized Client Site Administrators can interact directly with the Online Client Site Administration Portal to manage and configure all of the features of the Online Client Site. Examples for such administration abilities can include at least one of the following: Folder Type administration 731, Online Storage administration 732, Archived Storage administration 733, Role-based privileges administration 734, User administration 735, Inboxes administration 736, Workflow Queues administration 737, Address Book administration 738, Document Dictionaries administration 739, Document Stacking Order administration 740, and Site-to-Site Delivery administration 741. Collectively, the Online Site Administration methods can provide a targeted, user friendly environment to deploy very advanced security and access functionality. In some embodiments, the methods can be designed in such a way to make the Administration of Intelligent Paperless Document Management accessible and understandable to business level users without the support of specific technical resources or knowledge.

Client Site Administrators can be those end users of a Client Site that have been given Administrative access to the entirety of the Online Client Site Administration Portal or any subset of Administrative methods. These end users can be different from those described in Step 720 for accessing Client Site Subscription Management.

In the subject exemplary embodiment, the first step in administering an Online Client Site can be to administer the Folder Types that may be setup using the Online Client Site. Step 731 can be an extension of Folder Types administration into the Online Client Site. Client Sites that have subscribed to a single Folder Type through a domain, or have subscribed to the capability to create Custom Folder Types can be offered Online Administration of these Folder Types. Authorized Client Site Administrators can be provided with the ability to customize Folder Types to enhance the searchability and usability of Folder instances of those Folder Types. In some embodiment, Folder Types have properties that may be turned on and off to enhance the security model of the organization. Folder Types have searchable attributes that can be created and defined to enhance the usability of the Folder instances created. Folder Types can have configurable document attributes that can be attached to documents that are filed into an instance of the Folder Type. Folder Types can also have configurable named default Document Sets that can be setup to enhance security and usability.

In the subject exemplary embodiment, the second step in administrating an Online Client Site can be to setup Online Storage repositories to house Folders. Administration of Online Storage repositories of documents can the method described by Step 732. Folders can reside in Online Storage repositories that can be configured per Domain in a hierarchy that best represents the industry that the Domain services. In the example of the LoanKatalyst Domain, a Client Site can have access to Mortgage Loan Folders that are stored in online Cabinets, whereby the online Cabinets reside hierarchically in online Offices. Administration of the Offices and Cabinets can create online repositories to store online Folders. Offices and Cabinets can be created, named, and grouped in such a way that best supports the individual Client Site. For example, a LoanKatalyst Client Site may have an Office named "Retail Sales—San Diego, Calif. Office" holding Cabinets named after the individual Sales representatives. The possibilities for setups of the Offices & Cabinets can be endless per Client Site per Domain per Industry in the hierarchical method described. Administration of the online storage can also allow for the renaming and deletion of repositories to suit the needs of the Client Site.

Step 733 shows the Archived Storage administration. Just as in the paper-based world, if a Folder or group of Folders has outlived its shelf life need to be within reach, they can be moved to an archived facility or converted to a non-indexed medium and can be held in boxes in physical warehouse storage to reduce the costs and clutter of keeping the paper folders indexed and within reach. Such a need also exists in the paperless world, as the creation of online folders depending on the types of folders and industries they are created in may eventually clutter up the repository and the costs of keeping the folders online would outweigh the benefit. Therefore, the extension of Archived Storage can be administrated through the creation of repositories. The Archived Storage administration method can allow for the creation of Archive Warehouses and Boxes per Folder Type to keep Folders that are required to be archived. These Archive Warehouses can hierarchically house archive Boxes, which contain archived Folders.

User management can be extremely important to any computer system. Ease of use of managing the security privileges and access of all users is paramount to adoptability of a paperless system. The method of custom created Roles that are tied directly to system privileges can allow an easy way for a Client Site Administrator to attack User management. Step 734 depicts the administration method for Role-based privileges. Depending on the Domain, a Client Site can have different levels of functional capability. An Authorized Client Site Administrator can create an unlimited number of Roles for which they may allow or deny any number of Client Site privileges to each Role. Another way to describe Roles is that they are groups of pre-defined user privileges that may be assigned to Users to enable ease of privilege administration. Conveyed privileges can allow a user assigned to a Role to enact events on the Online Client Site. Examples of such privileges can include, but not limited to, creation of folders, editing folder attributes, moving folders from one Office/Cabinet to another, archiving folders, deleting folders, editing documents, deleting documents, delivering documents by fax, delivering document by email, adding notes to documents/folders, deleting notes on documents/folders, editing document attributes, and more. In some embodiment, the systems and methods described provide at least one privilege listed above.

Step 735 depicts User Administration, which can be the actual method to create and administrate a list of End-Users who may be granted access to portions of paperless workspace application software digitally representing the Online Client Site. Enabled Users can be given the authority to use their private login credentials to access the Online Client Site. Disabled Users can be denied access to the Online Client Site. In some embodiments, Enabled Users may have their password reset by a Client Site Administrator at any time, and must follow login/password rules as defined in the system by Client Site Administrators.

Enabled Users may be given access to different Folder Types. Users may be assigned a Role that governs the privileges the User has been conveyed when accessing a Folder of certain Folder Type. Users may be assigned different roles to each Folder Type they are granted access.

Users may be given access to Online and/or Archived Storage and/or workflow Queues. Online Storage access may be granted by giving the User access to All Offices, or a mix of single or multiple Offices and/or single or multiple Cabinets. If a User is given access to a cabinet, the User can have access the Folders of a Folder Type that they have permitted that reside in the Cabinet(s) assigned. If a User is given Office level access or All Offices access, then the User can have access to all Folders of a permitted Folder Type across all the Cabinets in that Office or across All Offices, respectively. If Queues are extended through the Client Site Subscriptions, the User may be assigned to specific Queues to perform work in those Queues. Furthermore, Users may be granted access to shared Address Books.

Inboxes administration for the Online Client Site is depicted in Step 736. Public Inboxes can be inboxes deliverable to by publically addressing the Inbox via Fax or Email addresses, as well as giving access to a third parties via SFTP/HTTPS/APIs. Public Inboxes can land in the Client Site as the result of subscription to the Inboxes from the Domain/IPDM Network. Inboxes may be assigned to a Document Dictionary subscribed to by the Online Client Site for which the learned documents will comprise the extent of auto-classification and extraction for transmissions through that Inbox. Private Inboxes can be inboxes deliverable to only by Authorized Users of the Online Client Site or through authorized Site-To-Site delivery methods. The Authorized Client Site Administrators may create, edit, or delete Private Inboxes. In some embodiments, all Inboxes must have one Inbox Manager to access the documents and data that are delivered to the Inbox. Authorized Client Site Administrators may add or remove Inbox Managers through 736. Inbox Managers may be setup to subscribe to Inbox Alerts to an external email client, SMS, or workspace alert based on the type of event that happens in an Inbox, such as, but not limited to, being alerted upon the receipt of new Mail Items in the Inbox and being alerted if Mail Items in an Inbox are overdue for filing. In an example of the LoanKatalyst Domain, a Client Sites that wishes to deploy Inboxes to each of their 25 employees may setup 25 Inboxes (either Public or Private), name the Inboxes in a way to designate that the Inbox is for Employee X, and add Employee X as the Inbox Manager. The flexibility and easy deploy ability of Inboxes can significantly enhance the adoptability of a paperless workspace. Users with Public Inboxes can eliminate having sensitive documents sent solely via unsecured email to their email clients, or deploying or subscribing to third party fax-to-email servers, and can instead take advantage of Fax/SFTP/Secured Email/HTTPS/Secured Upload directly to their Inbox, and have the capability to file those documents and data securely in a repository. Administration of this very complex deployment of Public and Private Inboxes can be easy enough for business users to deploy without requiring specific technical knowledge.

Workflow Queue administration for the Online Client Site is depicted in Step 737. Paperless workflow can be as accessible and easy to use as the paper-based workflow of dropping Folders in a physical paper tray, while also providing all the benefits offered by a paperless system. Administering and deploying workflow in a paperless environment previously requires a tremendous amount of technical knowledge. In some embodiments, Workflow Queue administration for the Online Client Site of the subject invention does not require such technical knowledge. The Authorized Client Site Administrators may create, edit any aspect of, or delete a Queue. A Queue may have one or more Queue Managers. A Queue may be associated with a Folder Type. A Queue may have one or more Work Tasks defined within. A Queue may have one or more automated Alerts defined. A Queue may have one or more automated or manual processing rules assigned. A Queue or its work tasks may have time limits for completion before generating an automated processing rule assigned. A Queue may be accessible by Authorized Users assigned to the Queue. A Queue may be stand alone, part of a series, or allow parallel processing.

The administration of Online Client Site Shared Address Books is depicted in Step 738. Shared Address Books and the Entries within may be created, modified, or deleted by Authorized Client Site Administrators or Address Book Managers. Each Shared Address book may have Address Book Managers that can be added or removed to a Shared Address Book by Authorized Client Site Administrators. Address Book Users are Users that can be granted access to the Shared Address Books. Shared Address Books can allow the Delivery of chosen documents to pre-defined recipients. Shared Address Book Entries may be created and setup to deliver via any of the real world methods of delivering paper or digital paper between one human/system to another. A Shared Address Book Entry may be setup to deliver to a specific Fax Number, Email Address, SFTP site, HTTPS, Site-to-Site delivery, or through interface to process a hard copy to a physical address through an overnight mail carrier. Once validated, Authorized Users can deliver directly and immediately to the Address Book Entry. In the case of LoanKatalyst, Mortgage Brokers can setup each and every Mortgage Lender they enact business with as an entry in the Shared Address Book titled "Mortgage Lenders." Many Lenders have Fax Numbers, Email Addresses, SFTP, or HTTPS capability to accept deliveries of documents by the Mortgage Brokers. Once validated, Users of the Client Site who are granted access to the "Mortgage Lenders" Shared Address Book can deliver confidently to the Mortgage Lenders listed as Entries. Delivery Stacking orders may be applied as the default stacking order when creating or editing a Shared Address Book Entry.

The Administration of Document Dictionaries is depicted in Step 739. Listed in the Online Client Site Administration Portal are the Document Dictionaries subscribed. In the Online Client Site, Document Dictionaries can represent compiled groups of Document Taxonomies. Document Types listed within the Document Dictionaries may be standard or custom. Document Types listed within the Document Dictionaries may be part of a Category within the Document Dictionary. Document Types listed within the Document Dictionaries may be part of the Auto-Classification learn set. Document Types listed within the Document Dictionaries may be part of the Data Extraction learn set. Document Types listed with the Document Dictionaries may have searchable tags added to them to facilitate searching for an instance of the document within a Folder. Document Types may be added, edited, or deleted from the Online Client Site's Document Dictionaries using Step 739.

In the use of paper-based transaction documents, it is advantageous to deploy an order in which documents are stacked so that documents can be located quickly. There may be industry standards, such as in the mortgage industry's "Fannie Mae Stacking Order" or there may be standards adopted company by company. In the paperless world, document stacking can be replaced by sorting and search capabilities. If a set of paperless documents are selected for delivery to a recipient that cannot accept document meta-data and must receive a flat transmission, such as a PDF or FAX, it can be advantageous to deploy a predefined Stacking Orders to the delivery if the list of documents is large. Administration of these Stacking Orders is depicted in step 740. Authorized Client Site Administrators may add, copy, edit, or delete Stacking Orders. Stacking Orders may contain document types of one or more Document Dictionaries. Stacking Orders may be rearranged to suit the parties necessary. Stacking Orders may be assigned to any delivery at the time of delivery, or as a default for one or more Address Book Entries.

The fastest and most secure method of delivery between two parties can exist if they both deploy a Client Site on the IPDM Network. Site-to-Site delivery can allow any Client Site on the IPDM Network to delivery documents and/or data to any other Client Site on the IPDM Network, regardless of the Domain. Administration of Site-to-Site Delivery is depicted in step 741. Authorized Client Site Administrators may create, edit, disable, or delete a Site-to-Site delivery protocol between Client Sites. A Site-to-Site Delivery protocol may be enabled for any external Client Site. A Site-to-Site Delivery protocol can require two-party authentication between Client Sites. A Site-to-Site Delivery Protocol may be authorized by one Client Site to accept Inbound Deliveries from another Client Site through a designated Inbox. Multiple protocols may be created between Client Sites. As an example, if Client Site A wishes to receive documents from Client Site B, Client Site A may add Client Site B to a Site-to-Site inbound protocol. Client Site B may then accept the Site-to-Site protocol and may add a protocol to allow Client Site A to deliver Site-to-Site back to Client Site B. Two-way delivery can be accessible once Client Site A accepts the new Site-to-Site protocol. Client Sites may setup multiple inbound protocols for the same external Client Site to deliver through different inboxes respectively to allow for correct channeling of documents/data.

The systems and methods described herein depicted in FIG. 7 can create a highly accessible system to organizations or users that wish to deploy a Client Site on a Domain. At the Client Site level, a mere business user using the Client Site Administration methods laid out can be able to administer and deploy a technically advanced Intelligent Document Management System with or without requiring technical experience or knowledge. The systems and methods described within can vastly open up the possibilities of a paperless world.

Figure 8:
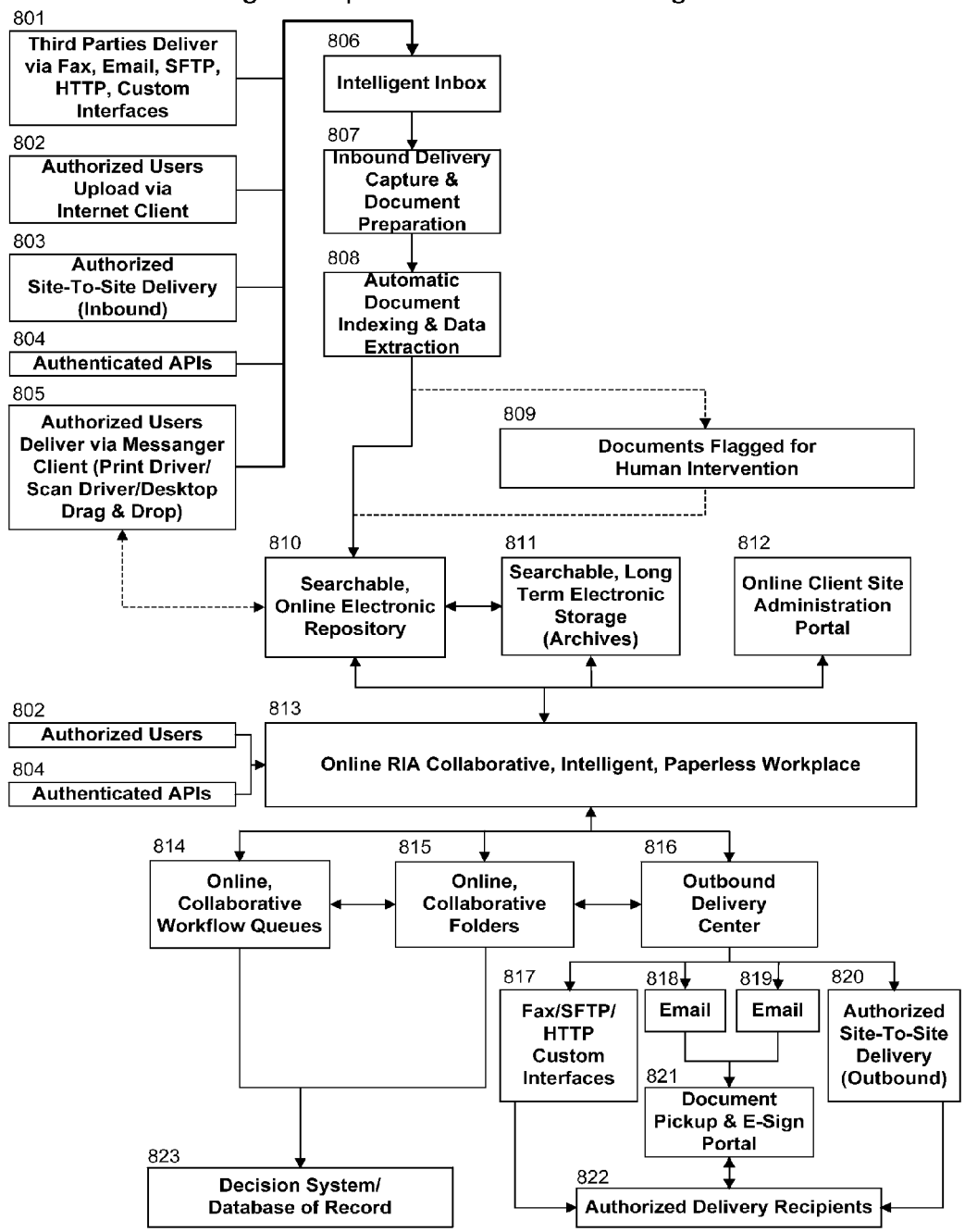
FIG. 8 shows an exemplary embodiment of the client deployment of intelligent paperless document management.
Figure 52:
FIG. 52 shows an example of fax cover sheet including detail information for a designated electronic folder.
Figure 53:
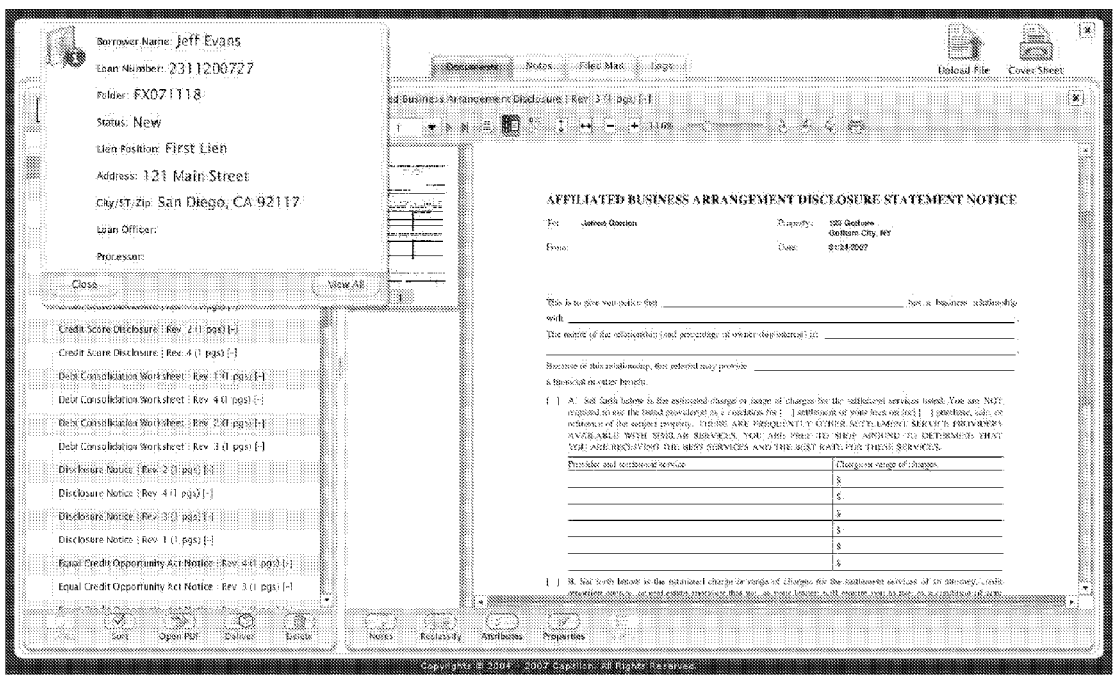
FIG. 53 shows a user can view the document image and extracted data at the same time using loan katalyst.
Figure 54:
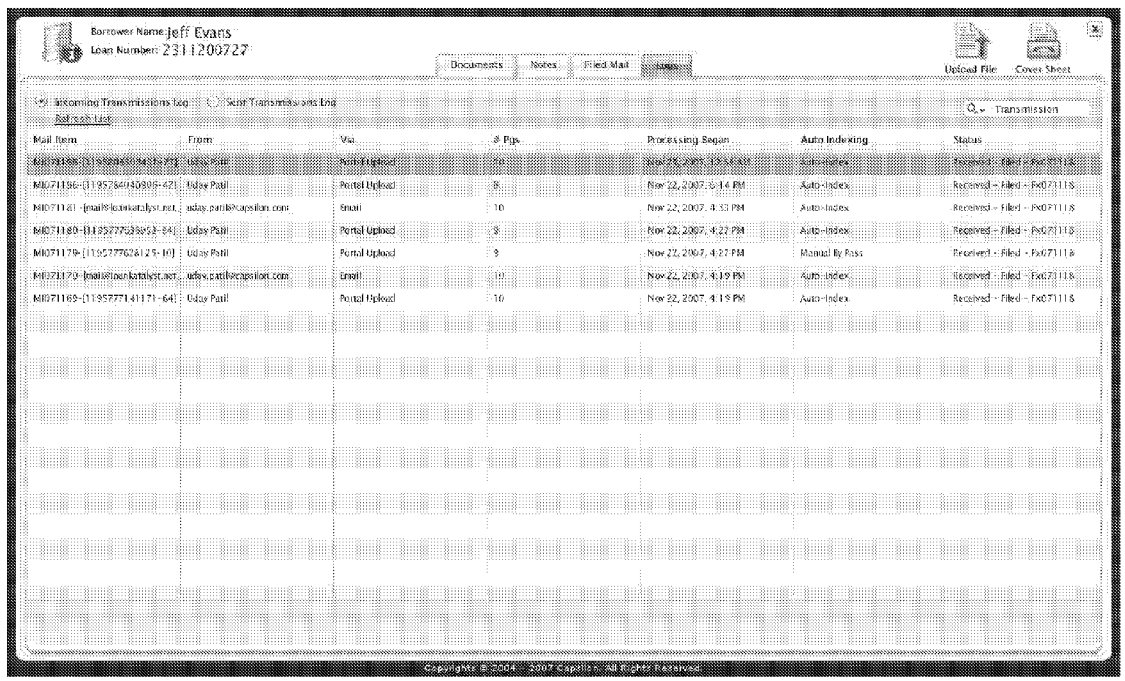
FIG. 54 shows the incoming transmission log of the subject folder using loan katalyst.
Figure 56:
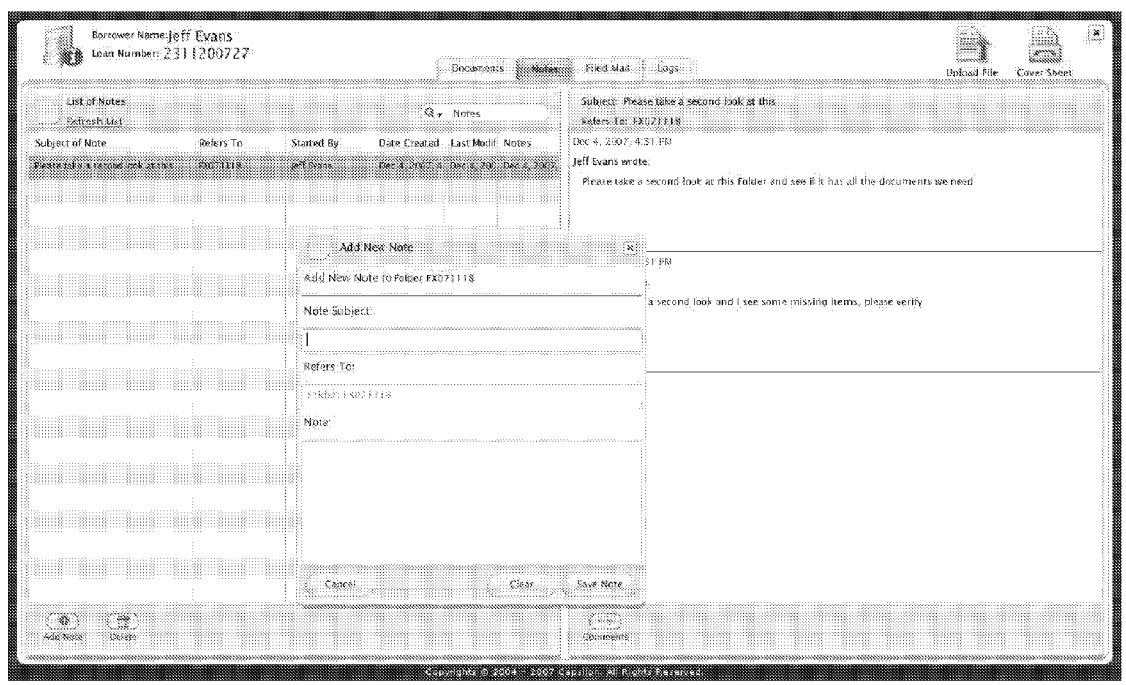
FIG. 56 shows that a user can add a new note for a document using loan katalyst.
Figure 57:
FIG. 57 shows that a user such as a broker can upload documents into a particular electronic folder using loan katalyst.
Figure 59:
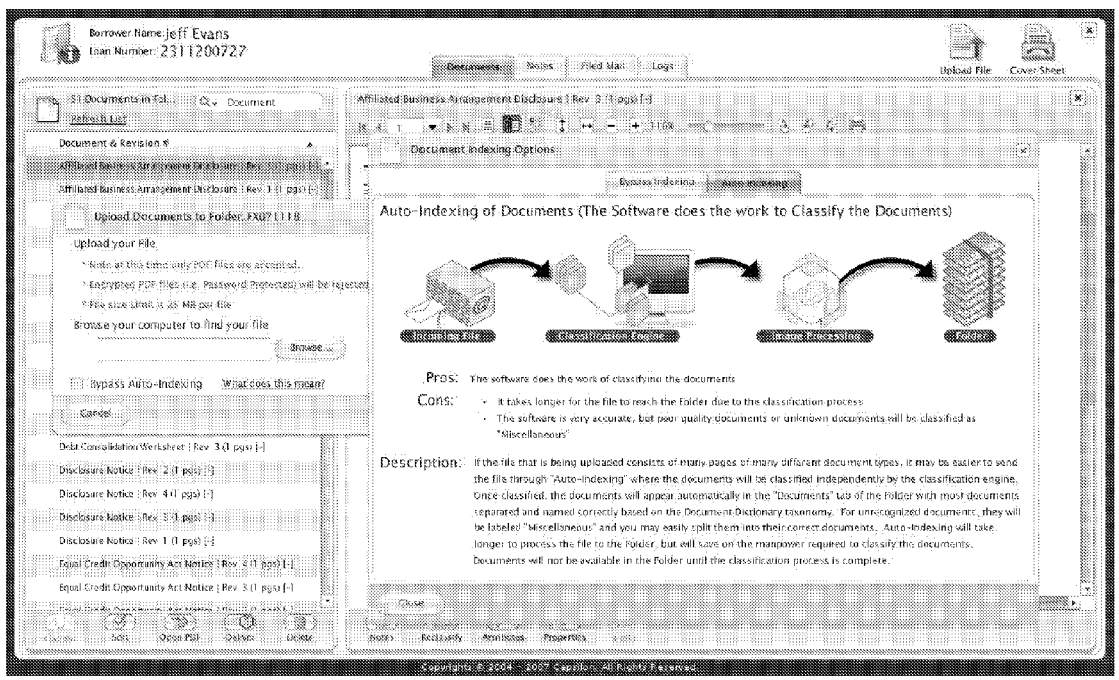
FIG. 59 shows the "indexing option" button for explaining auto-indexing using loan katalyst.
Figure 60:
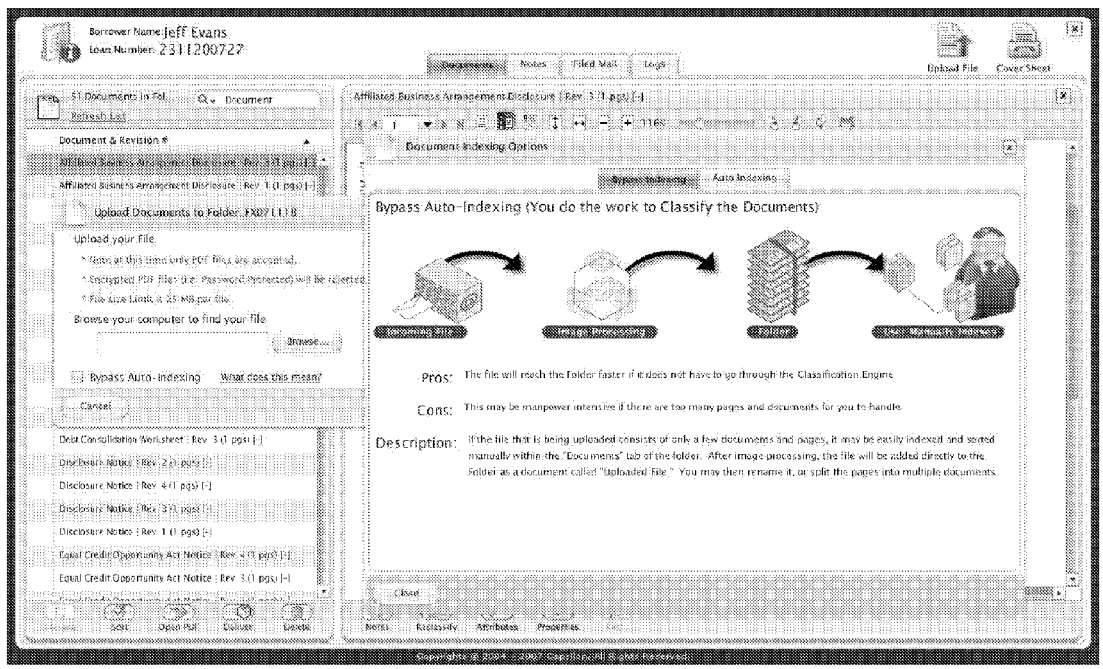
FIG. 60 shows the explanation of bypassing auto-indexing using loan katalyst.
Figure 61:
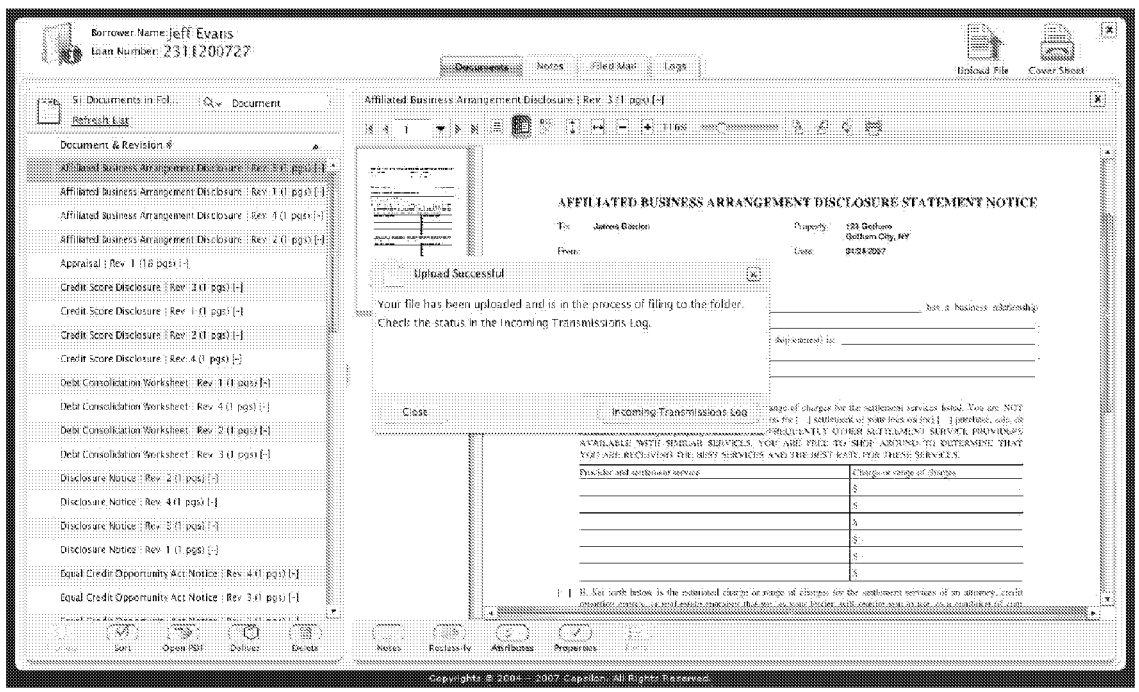
FIG. 61 shows that the document is completely uploaded into the system using loan katalyst.
Figure 62:
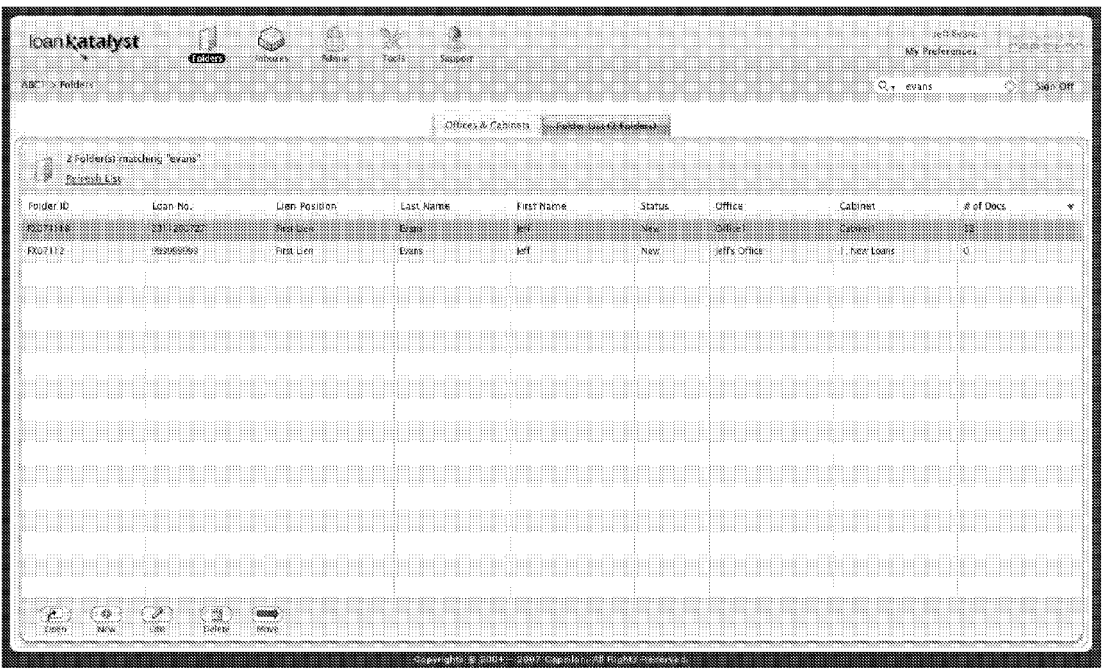
FIG. 62 shows that a particular user can access documents in two folders here using loan katalyst.
Figure 64:
FIG. 64 shows the website screen for inputting access code to log in the system described.
Figure 65:
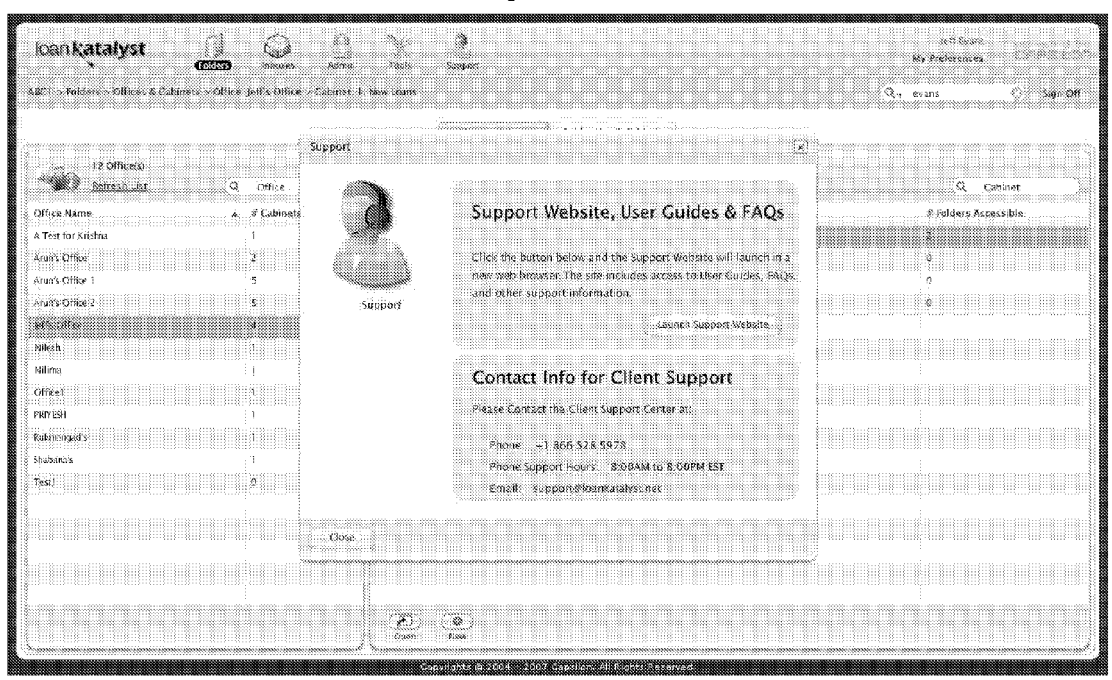
FIG. 65 shows that the system described provide user guide and FAQ for online help as well as contact info for a customer center.
Figure 66:
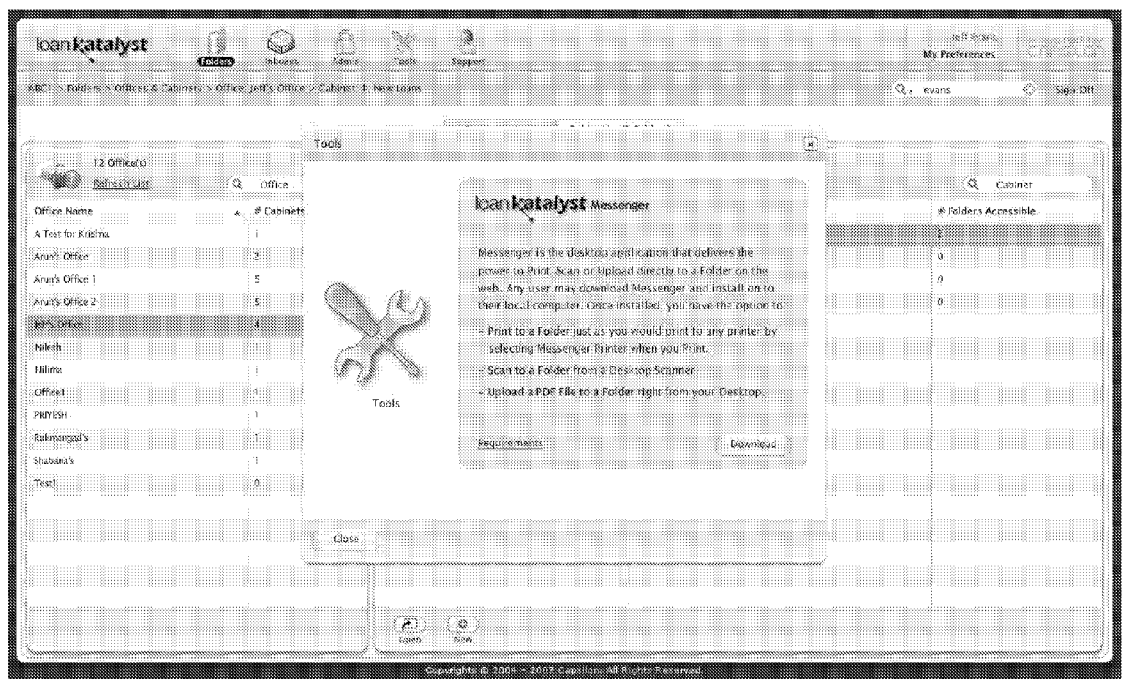
FIG. 66 shows that a desktop tool can Messenger can be downloaded from the Web-based system.

An exemplary embodiment of the invention is illustrated by FIG. 8 depicting a Web-based method for intelligent paperless document management. First a user must set-up for accessing the secure website. After the user performs the online sign-up step for registration, an automatic e-mail disclosing details such as a password will be sent to the administrator specified during the registration step. The systems and methods described herein will then assign at least one intelligent inbox 806 for accepting incoming documents and ensure data is secure and accessible only to individuals approved by the administrators. In some embodiments, the at least one intelligent inbox can recognize certain coversheet with routing information. For example, a fax coversheet containing details describing destinations of accompanied documents (such as folder ID numbers) can be used to facilitate automatically indexing and/or routing of the documents to the desired folder (see examples below and FIG. 52). As another example, e-mail containing folder ID numbers in the subject line can be used to facilitate automatically indexing and/or routing of attached documents to the desired folder. Such intelligent inbox can accept incoming documents from various means such as fax or e-mail with various formats such as pdf, tiff, or gif files.

Incoming documents or data items can be delivered from a third party deliver via fax, e-mail, SFTP, HTTP, or custom interfaces (see 801). In some embodiments, documents can be directly uploaded from the Web-based offices by an "upload" button found in the document viewer. Authorized users can upload documents via such internet client site (see 802). The systems and methods described can provide siteto-site delivery from one internal client site to another internal client site if both sites have been authorized to do so (see 803). Documents can also be delivered from authorized APIs (see 804).

In some embodiments, the systems and methods described comprise a desktop tool (can be called Messenger) which can assist in scanning and uploading files (see 805 and examples below). The desktop tool can work with any TWAIN compliant scanner, and it will let the user navigate the Web-based offices to directly upload documents into specific folders. The desktop tool can also comprise a flexible print driver for printing one or more documents directly into the Web-based offices instead of printing the documents using regular printers, and then scanning and uploading the documents.

Step 807 is for document upload and preparation. In some embodiments, step 807 is similar to 201 Doc Prep in FIG. 2. Step 807 may use modules for image capture, image enhancement, image identification, and/or optical character recognition. Any component of this exemplary embodiment can be replaced by a person of skill in the art with another commercial available component. For example, any commercially available scanner or digital copier can be used to upload documents in step 801. In some embodiments, the systems and methods described herein can take a file or document that has been faxed to the user, turns the file or document into at least one image and breaks the image down into various components of the file or documents. This process can be carried out without the need for inserting blank sheets as separators. The systems and methods described do not require pre-processing, separator sheets, or bar-coding for the purpose of indexing or classifying documents.

Step 808 provides the use of at least one automatic or automated indexing engine. The systems and methods described herein provide capability to upload unorganized or organized documents, identify and classify each documents, collates pages of the documents, store the documents in a central repository within a secure FTP site, allow access of documents via a secure internet site. Incoming documents are automatically indexed and collated into a familiar "stack," tabbed by categories, and placed into at least one designated electronic cabinet/folder. Documents that are not recognized can be automatically labeled or labeled using a pull-down menu.

The systems and methods described herein can auto-classify documents as they enter an organiztion's office, such as a mortgage lender or broker's office, via fax, e-mail, FTP transfer or by using the systems' print driver. The user interface and file management capabilities can move documents into repository as pdf documents. In some embodiments, the systems and methods described provide an automatic indexing engine which recognizes over 200 document types in categories reflecting typical loan stacking protocols. Any component of the exemplary embodiment can be replaced by a person of skill in the art with another commercial available component. In some embodiments, the automatically indexing in step 808 can be performed using a classification engine described in US 2007/0118391. In some embodiments, the automatically indexing step 808 can be performed using another commercially available auto-indexing engine.

Step 808 also provide the use of at least one data extraction engine which can pull data points from pages of a document. Data can be extracted with high precision from native pdf files. In some embodiments, data extraction can be carried out from all Fannie Mae SMART Doc, because many lenders and investors continue to produce electronic loan documents in PDF format. Data extraction (or data capture) services are available to isolate key fields, enabling anti-fraud and other analytics at high speed for both post-closing and pre-finding applications. The data extraction engine of step 808 can minimize manual data reentry which is time-consuming and error-prone. If all extracted data are consistent to one another, extracted data can be stored in a searchable online electronic repository 810 in at least one specified format. If there is any inconsistency among extracted data, step 809 provides a process flagging for human intervention. In some embodiments, the human intervention can be sorting, modifying, or deleting at least one document or file.

As an example, data extracted from an appraisal can be compared automatically to an automatic valuation model (AVM), or similar decision system, to see whether the appraisal reflects adjustments beyond lender tolerances. As another example, data returned from a fraud report may show multiple recordings from a borrower, and those transactions can be checked against data extracted from other investment property documents. If the information does not match, an underwriter and/or lender can be notified automatically or manually (also see step 814 and 823 below).

Step 810 provides the step of storing indexed documents and extracted data into a central secure repository for easy access and retrieval. Instead of manually collecting and organizing files, the systems and methods described herein allow files to be uploaded into one central repository automatically. Documents are no longer spread out in multiple offices or in the hands of multiple people and all documents can be easily accessed by multiple users simultaneously via an online RIA collaborative intelligent paperless workplace 813. Most of screen shots in the examples and figures are taken from an exemplary online RIA collaborative intelligent paperless workplace 813.

In the searchable online electronic repository of step 810, the indexed documents can be organized into electronic folders in pre-determined electronic cabinets. Each organized document can be searchable and can be viewed by any user allowed for access within minutes after the receipt of the incoming documents. In some embodiments, access to the central repository 810 from a desktop tool such as Messenger 805 can be authorized. In such embodiments, users can view documents in the central repository 810 without going through the online collaborative intelligent paperless workplace 813.

Step 811 provides the use of searchable Long-Term Storage. Although files remain online in the Web-based offices, specific cabinets can be designated for long-term storage purpose only. Files under long-term storage can be easily retrieved such as using universal folder searches for purpose such as compliance checks. Searches can be performed using various fields used when the folders were created previously.

Alternatively, the systems and methods described herein allow documents to be delivered electronically and/or archived to CD/DVD's or to users' local computers. Users can save selected documents onto hard drives of local desktop or laptop computers and/or onto one or more removable storage media such as CD-ROM or DVD-ROM. For example, an "export" feature of the systems and methods described can allow users to export documents into local personal computers for local storage.

Step 812 provides the use of at least one online client site administration portal. An exemplary administration portal is illustrated in FIG. 7.

Step 813 provides the use of online RIA collaborative intelligent paperless workplace which allows many permitted users to view and take actions on indexed files or documents simultaneously, with full security. Once documents are uploaded and indexed, everyone with authorized access to the documents can instantly view any of the documents via internet. The online RIA collaborative intelligent paperless workplace 813 functions as "software as a service" over the Internet. In some embodiments, the only types of software users need to use the systems and methods described are Flash® player and Acrobat Reader® by Adobe Systems Inc. San Jose, Calif. The user interface of the online RIA collaborative intelligent paperless workplace 813 can take the viewers directly to the documents, extracted data, and/or information desired to make decisions.

For example, a loan processor (user) can click to open the documents and view them on screen. Notes can be recorded as needed right onscreen rather than on sticky notes and scrap papers. When the loan file is ready to be reviewed by loan underwriting, the loan processor (user) can simply drag the icon into the underwriter's cabinet. As another example, when the underwriter has completed their tasks, the loan can be dragged and dropped back either in loan processing or in the closing department's cabinet where it is queued up and waiting. Such workflow queues can be viewed and monitored as provided in step 814 using an online collaborative interface. Either the online collaborative interface for workflow queues 814 or the decision system/database of record 823 can be linked to the data extraction engine 808 as described earlier. In some embodiments, the linkage between the data extraction engine 808 and the collaborative interface for workflow queues 814 can provide automatic detections of important tasks or automatic notifications of important information. In some embodiments, the linkage between the data extraction engine 808 and the decision system/database of record 823 can provide certain automatic decision making to facilitate business decisions.

Administrators can add additional users based on a tiered-access system. Access options can include universal access, access to specific offices only, or even specific cabinets within offices. Permissions to access can be limited using present roles or by creating custom roles. Once user roles and access privileges are determined, the systems described will e-mail users with login information for instant access. The securitization function of the systems described can allow a user to correct and/or notify errors already viewed by other users.

The systems and methods described herein can be integrated with at least one desk-based system such as mortgage loan origination software (LOS), automatic underwriting systems (AUS), lender underwriting systems (LUS), automate mortgage compliance software, or other electronic loan software. For example, the systems and methods described can determine specific documents required by a particular person or party and automatically import or send documents into the person or party's system. The systems and methods described can also be integrated with other web services.

The systems and methods described herein allow multiple people to access documents simultaneously from difference locations through password-protected access via internet. In some embodiments, the systems and methods described organize electronic cabinets by workflow steps and use a "move" feature allowing users to send documents from cabinets to cabinets. Several people can have access to the same file or document simultaneously as it can be viewed on computer screens at the same time.

Step 814 can also provide at least one Business Rule Manager based on at least one Workflow Rules. Step 815 provides the use of online collaborative folders, where each folder comprises a different metadata.

Step 816 provides an outbound delivery center for document delivery, where files can be sent via various means such as secure e-mail, hard-copy fax, direct upload, or overnight delivery. Delivery can be carried out among anywhere in the world with internet access or valid address for delivery. Delivery of documents is designed for parties who do not have access to the secure internet site, but any user can also be a recipient for document delivery. The stacking order of documents in the package can be easily adjusted, and documents can be easily added or removed for a customized delivery package. Sending a custom delivery package can be a simple matter of clicking and dragging documents into the desired stacking order, selecting secure e-mail, fax, direct upload, or overnight delivery, and clicking send. Like access, the delivery function of the Web-based systems and methods described can be available 24 hours a day, 7 days a week.

The delivery of documents can be accomplished using fax, SFTP, HTTP, custom interfaces (see step 817), e-mail (see step 818), e-signature (see step 819), electronic transfer delivery (EDT), overnight package delivery via a shipping vendor, or authorized site-to-site delivery (see step 820). For deliveries using e-mail such as step 818, the system will send out an e-mail to the at least one authorized recipients for alerting the recipients to take action of picking up documents from a document pickup portal 821. The e-mail may state that the recipient must take action of picking documents within certain time limitation, otherwise the link for picking up documents will expire for security reasons. Similarly, for deliveries using e-signature such as step 819, the system can require the input of e-signature within certain time limitation for security reasons. For deliveries using authorized site-to-site delivery 820, the documents will be delivered into the recipient's inbox, where the delivered documents can be processed and indexed depending on the recipient's choice. Of course, there can be more than one recipients regardless means of delivery.

In the case of loan or mortgage applications, a broker may want to deliver loan packages to multiple lenders at the same time. Document delivery to multiple persons or parties simultaneously can be achieved using the outbound delivery center 816 of the systems and methods described. Loan packages can be delivered electronically. In some embodiments, sending loan packages to external underwriters or investors can be achieved by selecting the loan to send, choosing the documents to be included, and selecting the delivery function of the systems described to send the documents. As another example, closing packages can be generated automatically or manually based on specific requirements of the intended lenders and/or investors.

Authorized users 802 and authenticated APIs 804 for accessing the online RIA collaborative intelligent paperless workplace 813 can vary and depend on each particular industry utilizing the systems or methods described. An administrator can provide a custom level of security for a user to access particular offices, cabinets, or folders, wherein offices, cabinets, or folders of the systems or methods described can be organized based on different factors such as location, timing, stage of process, etc. For example, potential users in the mortgage/loan industry can include due diligence auditors, underwriters, mortgage brokers, secondary marketing, investors, and other post-closing users.

Due Diligence—downstream from origination, due diligence processes typically require people to be transported to work where the paper is located. Using the systems and methods described herein, due diligence auditors no longer have to be sent on the road to conduct their review. Analysis can be conducted from any location, making more auditors available to accept assignments without the expense and inconvenience of being on the road.

Underwriters—using the systems and methods described herein, underwriters can handle files more quickly and efficiently, accelerating decisions that once required meetings and phone calls.

Mortgage Brokers—using the systems and methods described herein, account executives and brokers can view the loans' status on line, reducing time-wasting phone calls. Loans can be achieved electronically, saving hundreds of dollars for long-term storage.

Secondary marketing—using the systems and methods described herein, loans can be dragged and dropped from one pool or inventor cabinet to the next, accelerating transaction closing. Using the "alerts" capability, secondary marketing can be notified via e-mail when the loan is ready to be funded, along with other interested parties such as the processor, account executives, or even the broker who send the loan.

Post-closing—using the systems and methods described herein, internal audits can be accelerated for quality assurance and QC purpose by using the intelligence portal's viewing capabilities. Trailing documents are routed automatically to the correct electronic folder, vastly reducing the impact of chasing documents expected after closing. This allows improved response to internal departments and external stakeholders like inventors, rating agencies and document custodians.

Investors/capital markets/service providers—using the systems and methods described herein, investors can evaluate loan pools without wading through thousands of pages of paper. Investor delivery can be electronic, secure and immediate. Investment bankers can look quickly and directly at loan information instead of counting on error-prone bid tapes. This saves a great deal of time for analysis in data integrity checking, and brings the security to market faster. Rating agencies and bond insures can conduct more accurate analysis by having permitted access to the loan files.

Systems and methods for intelligent paperless document management described herein provide not only a change in mortgage processing, but also a transformation of entire industry. Systems and methods described also can provide additional functions such as workflow enablement, notifications and instant communications of things like loan conditions and status. Systems and methods described can also provided compatibility via Web design for various internet enabled or mobile devices to receive and view necessary information. Any devices generally known to be capable of connecting to the internet and use a Web-based software are within the scope of the invention.

A high-level exemplary overview of one embodiment of the instant invention is provided by FIG. 1 depicting the method/apparatus of the instant invention. Here, unorganized information is captured by the apparatus from various office devices such a computer, a FAX, an e-mail system, a scanner, or uploaded to a FTP or a Web site 101. Further the captured documents or information, unorganized and unidentified when acquired, are organized into an information matrix known as Knowledge Objects by referencing a Knowledge Warehouse 102, and stored in an information data warehouse 103. Knowledge Objects are then transformed into Business Objects, such as electronic documents and transaction sets such as MISMO standard XML files 104. The Business Objects are stored in business data warehouse or delivered to users of the system and external organizations 105. Finally, a Work-flow and Decision engine uses the Business Objects to facilitate both manual and automated business decisions, and collaboration 106.

Figure 2:
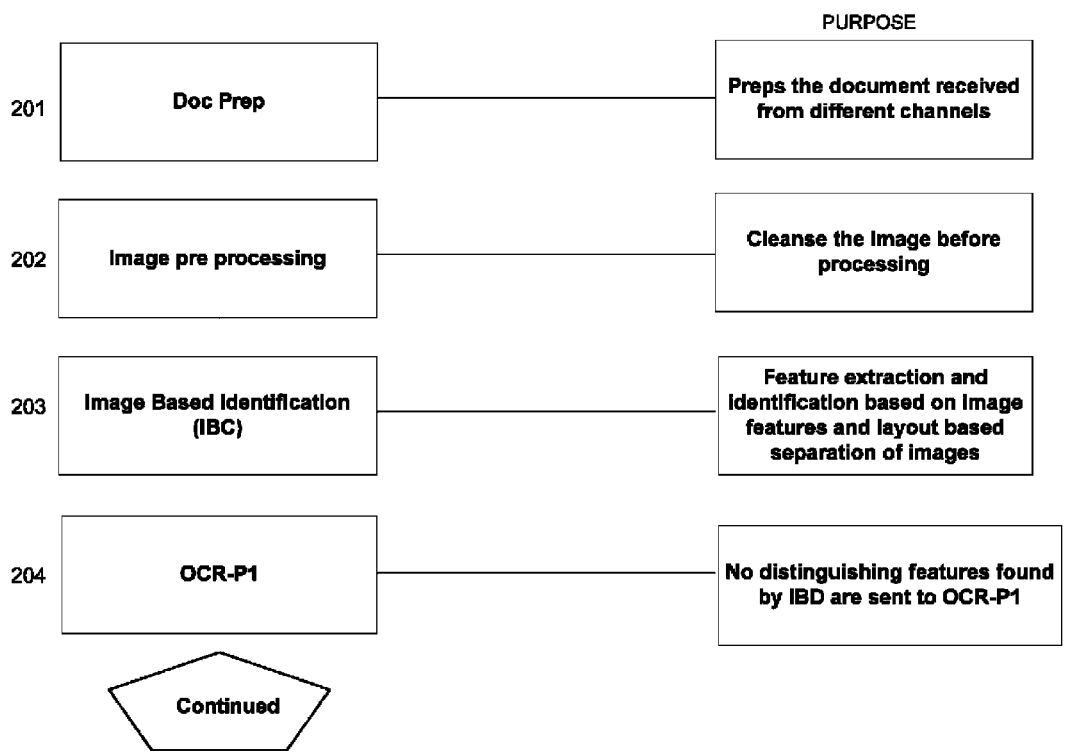
FIG. 2 depicts a detailed diagrammatic view of the business methods of the instant invention, i.e., the system flow of a preferred embodiment of the invention.

A detailed exemplary overview of the instant invention is provided by FIG. 2 depicting one preferred embodiment of the method/apparatus of the instant invention. It will be recognized by those of skill in the art that FIG. 2 is only one example or embodiment of the instant invention; other embodiments of the instant invention may be recognized by reference to FIG. 2 and/or the description herein. For example, each of the steps described in FIG. 2 may be modified; further, many of the steps are optional so that one or more steps may be eliminated. Also, other steps may be added. Similarly, the order of the steps may be changed or rearranged in numerous ways. Each of these embodiments is within the spirit and scope of the invention as defined by the appended claims.

Capture Documents:

Pages, documents, sets of documents, a Dox Package, or Dox Packages are sent electronically to the system for classification or/and extraction of data 200. Such documents may be input in any sequence and by or through any manner known to those of skill in the art such as from a fax machine, scanner, e-mail system or any other electronic communication device. The document or documents may be in text, electronic, paper, or image form, or a mixture of formats. If needed, in preferred embodiments, the document(s) are captured by techniques or in a manner known to those of skill in the art. The Dox Package is separated into Image type documents or Text type documents as they are captured.

Image Pre-Processing:

The document image quality, in particular, from documents obtained by low resolution scans or facsimile transmission may not be good enough for direct OCR. Therefore, primary image processing may optionally be done to bring the image to the requisite quality for OCR, and Image based classification 202. In preferred embodiments, noise is removed from the image by technologies such as de-skew techniques and de-speckle techniques, a change or changes in DPI, and/or image registration correction or by a combination of the above and/or similar techniques.

Image Based Classification (IBC)

In the preferred embodiment the IBC 203 attempts to identify one or more discrete pages using Image Based Features like lay out, white space distribution, and other features registered in the collection of document feature descriptors by the Document Learner.

OCR (Optical Character Recognition)

If required, as in the case of image type documents, and in preferred embodiments, the portions of or the entire image of a page or document is converted into text using OCR by means known in the art 204. In some preferred embodiments, the OCR program is available commercially. In preferred embodiments, the OCR engine is supported with a general as well as a business-domain-specific dictionary to increase the accuracy. The OCR output may optionally be in text and xml formats, or may be in other formats.

In preferred embodiments, once a image type document is OCRed, the output file is converted to a grid-based matrix format to form a text-pictorial representation of the document (Document Grid File). Text type documents, such Microsoft word documents are also converted into a Document Grid File.

In preferred embodiment the output from image preprocessing and OCR is used for the Image Quality Detection IQD 205.

Identification:

All pages or documents are placed in buckets using a preliminary analysis of features discovered in the Document Grid File, without detailed validation. The order of the presented pages, sheets, and/or documents presented to the method/apparatus is recorded by the system, for example using a computer database.

In preferred embodiments, the method/apparatus then attempts to identify one or more reference pages and then the documents are grouped logically based on the reference page and/or affinity 206. Numerous classification engines known in the art can be used, separately or together, including a Word Map 207, a SVM classifier 208, a Location Diagram 209, a Bayesian classifier 210, and a critical-feature-based identifier 211, but any manner known to those of skill in the art can be used. In preferred embodiments, the engines are used in a particular order. In some preferred embodiments, if all the classification engines agree as to the classification of a page or document, the result is accepted as the identification, and taxonomy classification, of the document; in other or the same preferred embodiments, if most of the classification engines agree, then the result is accepted as the identification of the document. If the document, page or sheet is not identified at this point, further analysis is performed with the aid of a human collaborator (i.e., via escalation). Further, in preferred embodiments, discontinuities are used to identify pages from a single document, e.g., a sentence or a table separated by a page break.

Preferably, all pages are revisited and checked with regard to their affinity towards the reference page. This method of confirmation in preferred embodiments works by measuring affinity of the pages in the vicinity of a reference page towards that reference page, but also reviews pages far removed (distance measurement) from the reference page to guard against, and correct, pages being shuffled during document assembly of the Dox Package or input into the system. In preferred embodiments, the page "footer" description is measured for closeness, an example of distance measurement, against the reference page using fuzzy logic matching techniques, and other mathematical techniques as known to one of skill in the art.

Taxonomy Classification/Mapping:

In preferred embodiments, each document page is classified into, or sorted into, one of the taxonomy classes, as defined by the MISMO standards committee or pre-programmed by user using the document learner, or a class designated by a human collaborator. If the putative class identified by the system is unknown and it cannot be classified by the system, the document or representation thereof may be stored in a feedback folder for further manipulation. Taxonomy classification is also done in multiple levels to identify class, sub-class, and version of the document. Taxonomy classification is preferably performed using multiple classification engines. All the outputs of the taxonomy classifier may be flagged or designated as one of four types: (1) classified, (2) multi-class, (3) ambiguous, (4) unknown. Document pages flagged as unknown are submitted to an OCR program from a different manufacturer 212, and re-identified 213 using the same Identifier Engines, 207, 208, 209, 210, 211.

The pages or documents thus far classified may be further evaluated automatically. In preferred embodiments, those documents that fall into categories 2 and 3 are forwarded to the verifier.

Verifier:

Documents that are flagged as either multi-class or ambiguous, or both, are routed through the verifier, although any document used in the system may be routed through the verifier. The document verifier performs a very accurate form of location-based checking for verification of class 214.

Further voting and probability algorithms are preferably used to determine the class for the remaining pages. 215.

The Information Sequencing process is used to create a sequence matrix from the information acquired during the previous steps. 216.

The automatic version detection and page sequencing for some or all documents is done using the Versioning and Sequencing engine. 217. This is done using the Feature Vectors specific to versions and sequencing matrix as captured 216.

Classification Exception Handler:

Document pages that are still not mapped to a taxonomy class due to bad image quality, a new variation of a document, or for other reasons that do not result in immediate identification or classification are flagged as Unknown. Document pages that fall below the confidence threshold value that may be preset or varied by the user, even after the verifier, are sent to exception handling client (Classification client) (i.e., via escalation) 218. There, human collaborators can verify the class, assign a class, or note that the document cannot be identified. If a human collaborator verifies or changes the class, this information is sent to a feedback box for an incremental learning. During escalation, in preferred embodiments, the human collaborator is presented with an image comprising the header and footer region of the page or document in question, and optionally with an image of the entire page if the image quality is poor. Frequently the identification of the page or sheet may be made in reference to the header and footer information, although display parameters, such as position of the various images on the human collaborator's computer screen and zoom capabilities, may be varied by the human collaborator. Escalation may occur before, but preferably occurs after, the verifier step.

Apply Filter for Classification:

For documents having peculiar properties, such as a specific variation of a class of documents, a filter may optionally be applied. An example is if two documents are very close in format and data, but they differ in a very specific property and because of that they belong to different class. A weighted filter, that is a Location Diagram with primary key set for the distinguishing property or feature, is applied so that those can be classified accurately and rapidly. This technique is also used for determination of different versions of documents. For example, two notes may have very similar contents but differ in specific feature such as the absence or presence of an interest rate adjustment clause, need to be put in different classes for business decisions involving an Adjustable Rate Note and/or a Fixed Rate Note.

Collating (Class Specific):

Within each taxonomy class as determined to this point, document pages are collated using methods of analysis based on Location Diagrams and Feature Vectors as may be understood by one of skill in the art 219. These methods of analysis determine the sequence, page numbers of pages and sheets within documents. This process of collation is capable of determining not only the class of a document page (which in most cases is determined earlier at the Classification step or the Verifier step) but also the exact identification of a document including the version number of each particular document within the Dox Package. The collation methods also correctly identifies the pagination within the document, and also notes and records the presence of duplicate documents. For example, during collation, the method/apparatus of the instant invention may find and note as identical two identical mortgage notes in a single taxonomy class. This collation process of the instant invention is differentiated from classification technologies known in the art by its ability to distinguish closely related documents. An example of this is that the method/apparatus of the instant invention can pick two mortgage notes out of a Dox Package, correctly paginate them, and identify and log them as separate, but otherwise identical, documents. Pages or documents are then segregated into a logical group determination, and the pages are mapped to a predetermined business-specific or user-determined taxonomy.

In preferred embodiments of the instant invention, the collation process is based on incremental learning and various artificial intelligence ("AI")-based techniques, which may include one or more of the following, such as:
(1) the Location Diagram- and Feature Vector-based feature extraction and page mapping;
(2) SVM and NLP;
(3) an intelligent filter technique taking advantage of header and footer based information;
(4) collation by finding common threads within or between pages, documents, or sets of documents;
(5) finding disagreements based on affinities;
(6) inference-based mapping; and
(7) feature based discontinuity detection and collation,
as well as human collaboration.

The collate confidence matrix which is the result of the above-described collation process is preferably used for final formation of documents. The collate confidence matrix represents affinity among various pages, positions of the pages within sets and the confidence of mapping to a particular taxonomy.

Extraction:

In preferred embodiments of the invention, extraction of information or data from the documents or Dox Package that has been captured using the method or apparatus of the invention, and preferably extraction is first done automatically from readily identifiable fields 221 and image snippets of other fields location are re-submitted to the OCR step with a field specific dictionary before repeating the extraction process 220. Using a Location Diagram-based method allows the location of fields even in case of variation between pages or documents within or between Dox Packages 221. Values missed by automatic extraction of these methods may be located by an automatic field locator 222. The automatic field locator uses auto field location based on Location Diagrams 223 and Image based field locator 224. In preferred embodiments of the instant invention, if automatic field locator cannot locate values, the region of the page and/or sheet in question is escalated and the field may be identified with the assistance of a human collaborator by escalation 225. In preferred embodiments, the human collaborator may be shown only the relevant region of a page or sheet (Image Snippet) and may identify the region containing the data to be extracted by simply mousing over the region with the values extracted by further processing 226 and, in preferred embodiments, the location of the value within the document then sent to the feedback folder for future reference in regard to learning and optimization of the system. In related preferred embodiments, the human collaborator indicates exactly where the field is located.

Relevant information, as defined by a pre-determined business-specific application or set by a user, is extracted from documents that have been successfully classified. In some preferred embodiments, each time a Location Diagram is resolved to select a field region, an overall weight may be associated with that solution and used to improve future selection of fields in a particular class of document.

Scrubbing and Verification of Extracted Information:

Extracted values are scrubbed to get exact value 227. Scrubbing further transforms the extracted value to a specific data type. The accuracy of the scrubbed value is verified. Thus, the system provides multiple confidence levels for decision-making. The system generates a Knowledge Object from the scrubbed results. The values with very high extraction confidence but very low scrubbing confidence are sent to a human assisted Field Location Process ("Manual FLP") 225. The system generates a field value from scrubbed results that pass the confidence threshold for the overall process.

Extraction Exception Handler:

Extracted data falling below confidence threshold value is sent to exception handling client (Manual Extraction Process ("MEP")) (i.e., via escalation) 225 & 226. Human collaborators can verify and/or change the data and/or extracted information in reference to the Dox Package. In preferred embodiments, each field subjected to MEP is extracted by a minimum of two human collaborators and the system compares the extracted value. In the event of a discrepancy, the value in question can be sent to additional human collaborators.

In all the steps involving human collaboration, the method/apparatus of the instant invention may optionally keep track of which data was viewed by human collaborators, and how long they viewed the data, in order to detect potential fraud or illicit activities. Information related to exceptions may also be used for statistical learning. In preferred embodiments, the human collaborator mouses over the exact value to be extracted. This is referred to herein as a "snippet" or a "text snippet" and the method/apparatus can pull the snippet and subject it to further scrubbing and processing 227. These snippets of required/specific values may also be extracted and used for formation of Knowledge Objects.

Transformation:

The processes preferred embodiments of the instant invention typically extracts the fields (as they appear in the document) required for various business and/or compliance requirements, then transforms them into facts that can be used further for decision making by an automated rules engine or search engine by packaging these facts and other related information such as text and image snippets, x,y coordinate location of these facts from a Location Diagram into an entity referred to herein as a Knowledge Object. A Knowledge Object 228 is an information matrix with the relationship among all the information entities clearly defined 229.

Knowledge Objects can be used to form Business Objects. A Business Object is a collated set of Knowledge Objects created for use in particular business context such as a MISMO SMART Doc XML file, custom transaction set or electronic document. Business Objects give data a business centered view of the information captured by the method/apparatus. 230 Business Objects are stored and used for business decision making by a Decision Engine. These Knowledge Objects and Business Objects are stored in an electronic data repository which can further be used by a decision engine, 231 a rule engine, or a search engine to make various decisions and/or accelerate, support, or validate decisions.

Further Features

Figure 4:
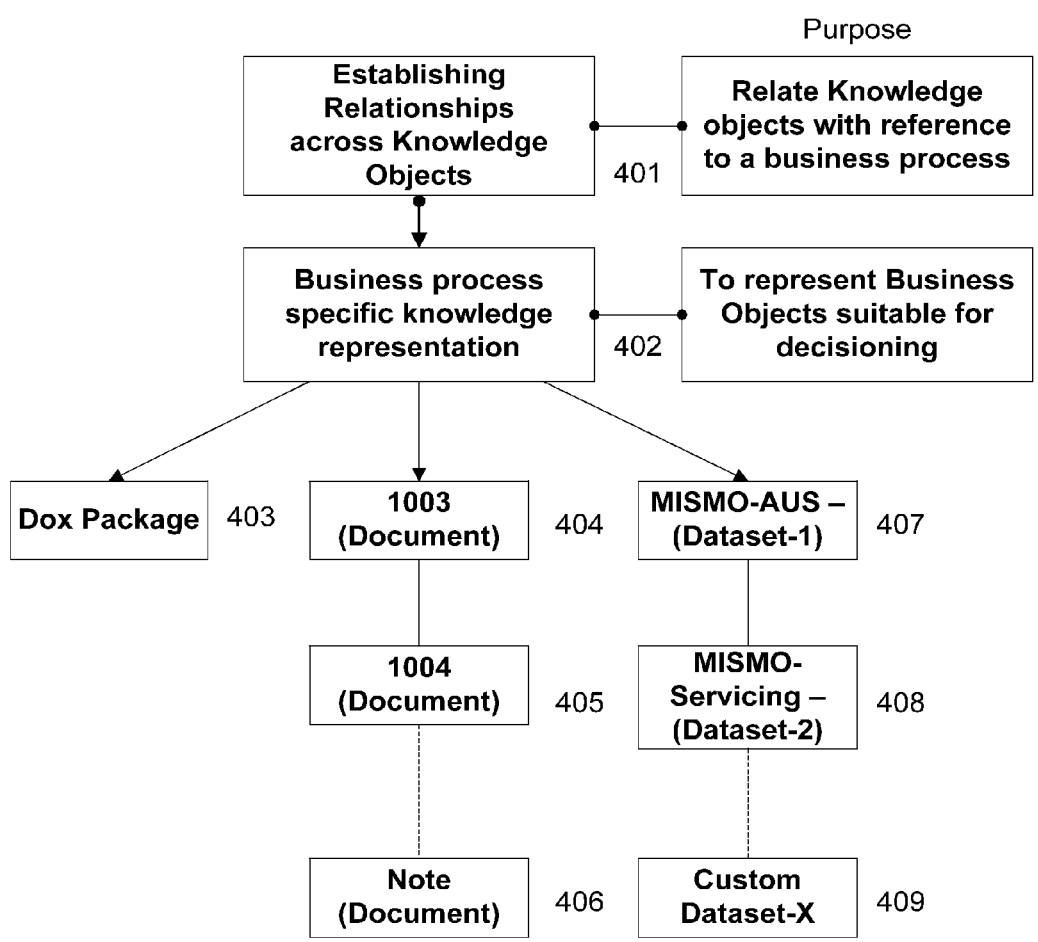
FIG. 4 depicts an embodiment of the Business Object formation elements.

Business Object Formation:

FIG. 4 depicts Business Object formation. The relationships among all Knowledge Objects is established by a method called Collation 401. The output of collating Knowledge Objects is done by referring to a knowledge map which has a business-process-specific knowledge representation of the Business Object required for making business decisions 402. For example a organized Dox Package in the form of a MISMO SMART Doc 403, XML representations of industry standard documents 404 405 406 Industry standard transaction sets defined by MISMO 407 408 409.

Figure 4A:
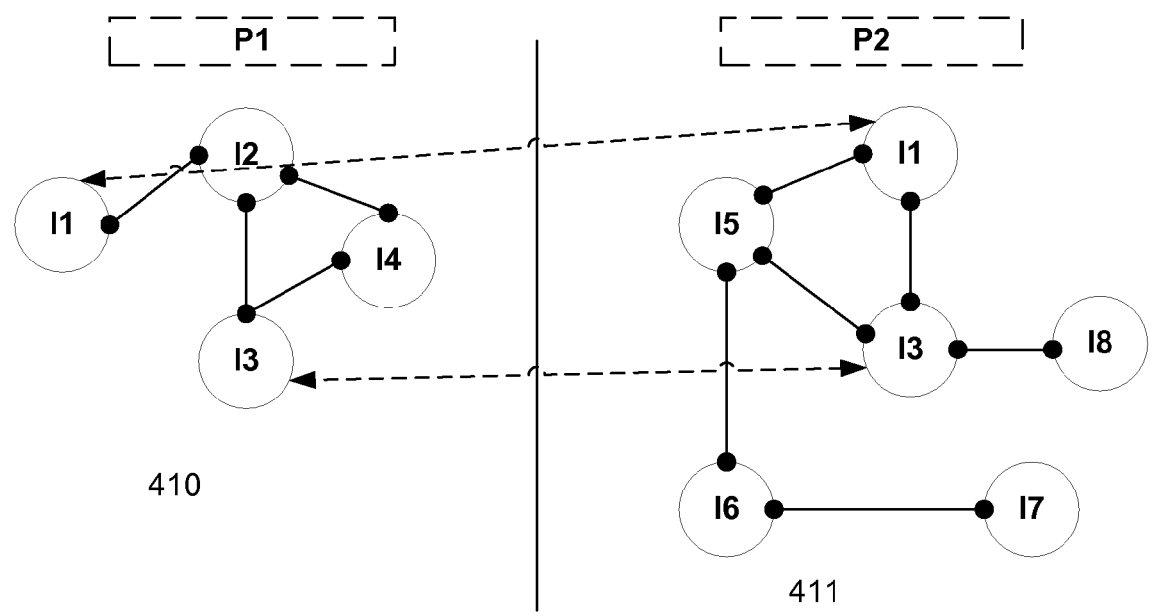
FIG. 4A depicts an embodiment of the relationship of Knowledge Objects within a Business Object.

FIG. 4A depicts the relationships among the Knowledge Objects. The relationship between Knowledge Object P1 410 and Knowledge Object P2 411 is shown in the figure. I1 and I3 is the set of common features belonging to P1 and P2, I2 is the set of data elements, I4 is set of location co-ordinates (snippets and regions) and I5, I16, I17, and I8 are the other attributes of P2. Since I1 and I3 are common to P1 and P2, the knowledge map is referenced to determine if they have affinity to the same category of Business Object such as a Promissory Note.

Figure 4B:
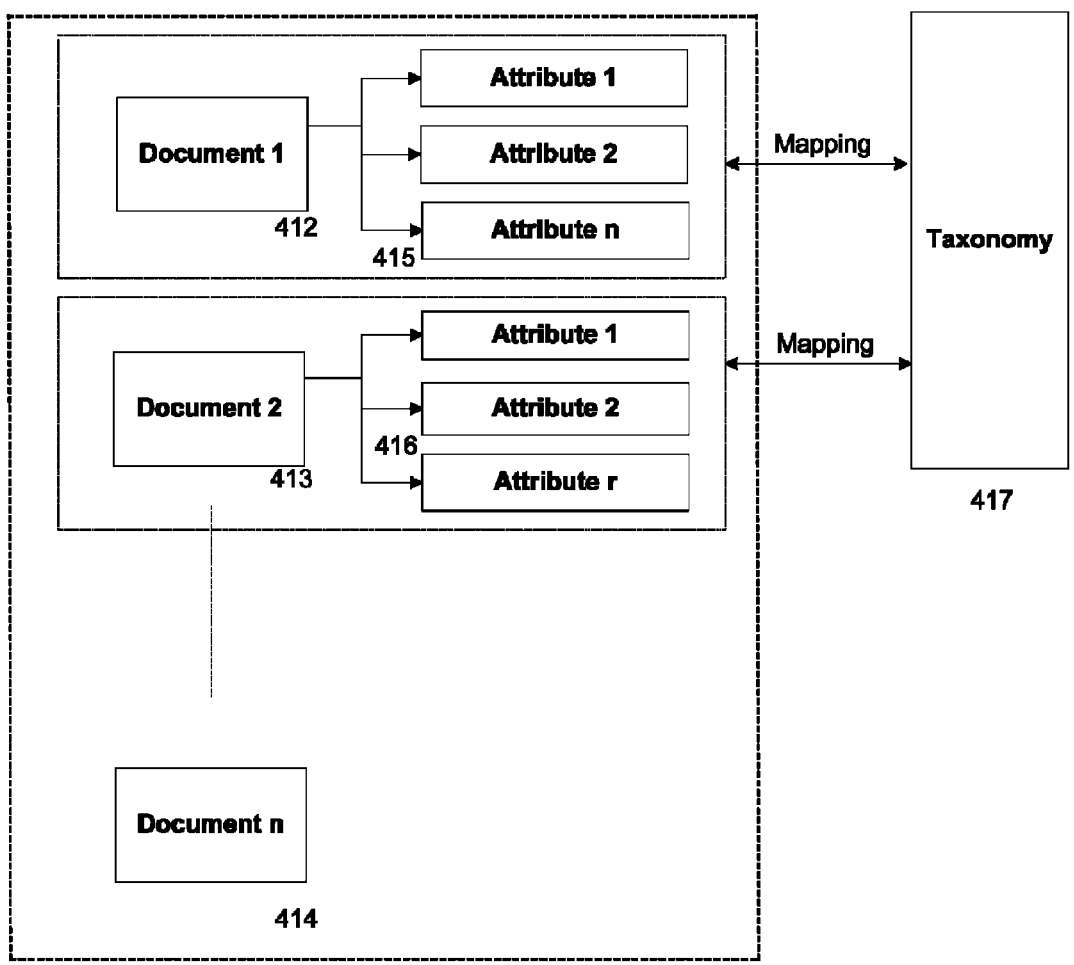
FIG. 4B depicts the process of Dox Package creation in one embodiment of the invention.

As an example FIG. 4B depicts the process of Dox Package creation. Here Document-1, Document-2, Document-n 412 413 414 have their individual attributes. (Attributes from left to right 415 416.) Based on these attributes these documents are mapped to the taxonomy. Here the collation process is used to determine affinity to a Dox Package based on common attributes such as Loan number or borrower name.

FIG. 4C depicts the process of Document formation. Here pages page-1 to page-n 417 418 419 420 421 based on closeness among pages, Feature Vectors and affinity 422 are mapped to different documents and their copies, revisions.

Figure 4D:
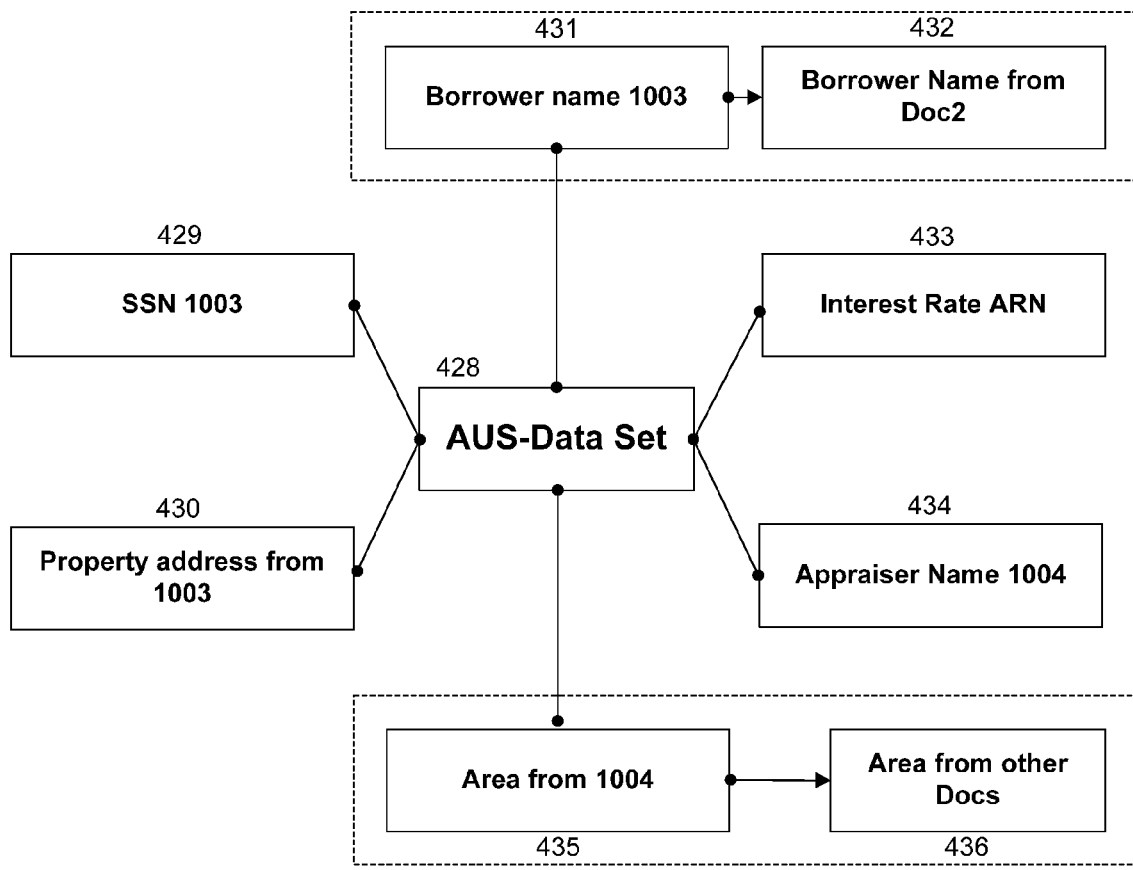
FIG. 4D depicts MISMO transaction data-set creation in one embodiment of the invention.

FIG. 4D depicts a Business Object MISMO AUS Transaction set 428. The Knowledge Objects extracted from various forms like 1003 429, 1004 434, and Note 433 are combined to form a transaction set for underwriting of a loan using a rules engine.

Incremental Learning:

The system of preferred embodiments of the instant invention performs incremental learning and tuning based on feedback and/or unclassified documents. All Feature Vectors are retuned without actual calculation of relative distances. The incremental learning is based on statistical analysis of exception and tuning.

The system keeps watch on statistical data of the collate, classification and extraction to dynamically tune various control parameters and optimize results. Further, in preferred embodiments, the method/apparatus can readily keep track of where human collaborators reviewed data and how long they accessed the data, thus enabling an operator of the instant invention a certain level of protection against fraud.

Figure 3:
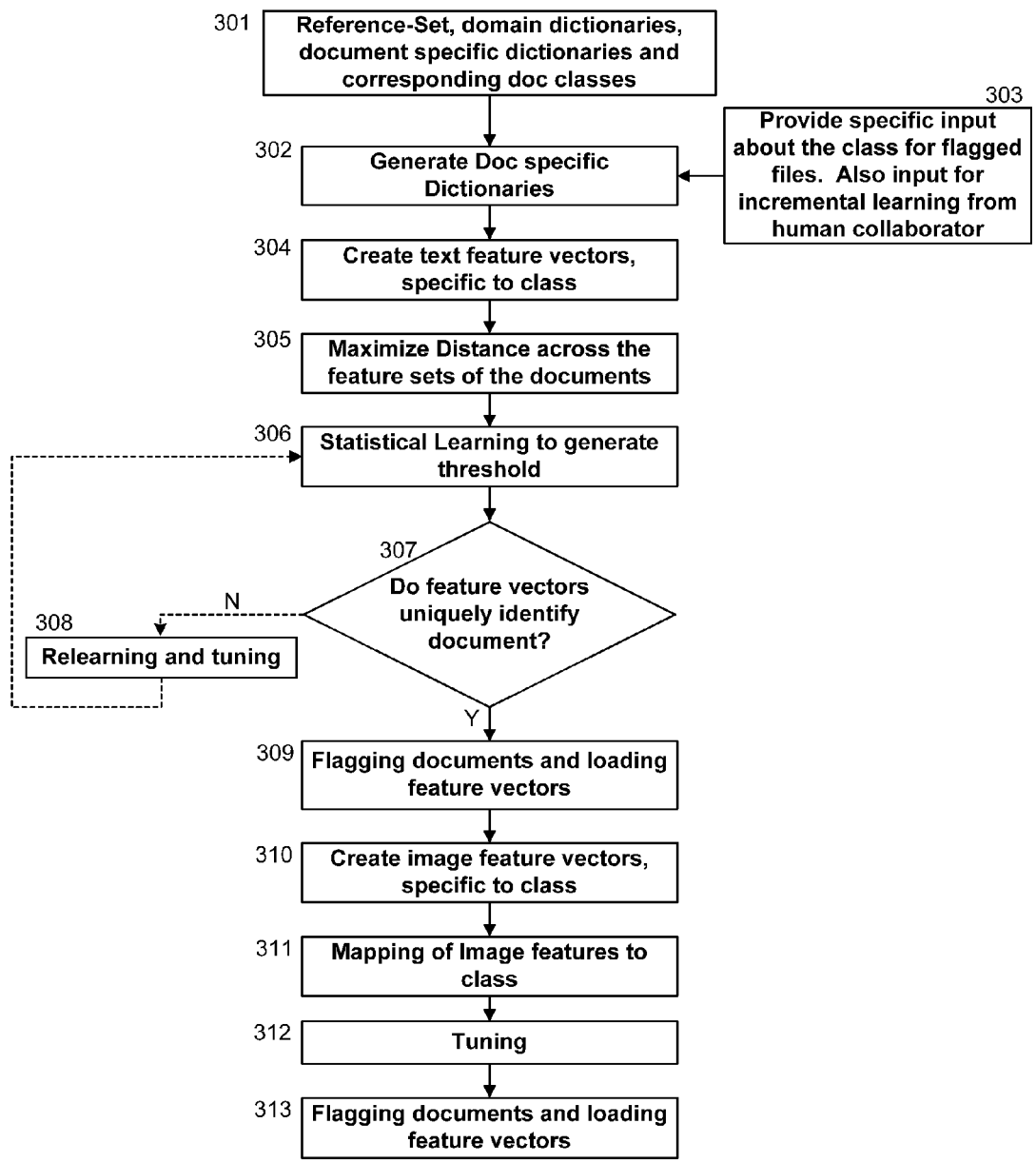
FIG. 3 depicts an embodiment of the Document Learner process, i.e., the flow of the classification learner.

Learning:

FIG. 3 depicts the flow of learning in one embodiment of the instant invention. The document samples for the document to be learned, and document-specific dictionaries and generic, as well as domain, dictionaries are loaded in to the Learner's Knowledge Base. 301. The Learner reads the document samples, and if document specific dictionaries are not available, then one is generated from the sample documents. 302. For some specific files, human input such as very specific key phrases and location are provided for learning, if required. 303 Text Feature Vectors are created using image processing, machine learning and Location Diagram based techniques and other methods known in a manner known to those of skill in the art. Here the Feature Vector represents various text features including frequencies, relative locations and Location Diagrams. 304. The distances among the Feature Vectors representing different classes, locating different information are maximized. Weights are assigned to Feature Vectors based on their uniqueness and distance from the other Feature Vectors. 305. Using Statistical techniques thresholds are calculated. 306. If the Feature Vectors uniquely identify document 307 document is flagged and Feature Vectors are loaded 308. Otherwise the Feature Vector is re-tuned to prevent misclassification by maximize the distance to from the wrongly classified document class 309. Similarly Feature Vectors are created based on image features. 310. These sets of Feature Vectors are then mapped to a class. 311. The Feature Vectors are tuned to optimize the results. 312. The documents are flagged and corresponding Feature Vectors are loaded in the system. 313. The text and image based learning process complements each other and can be performed in any order. The output of the learner is a collection of reference-sets that are then stored in a Knowledge Base of the Classifier and Extractor methods to reference.

Regarding Classification:

The system can prepare reference-sets of known classes with title of the class, i.e., taxonomies. The system can use either a dictionary specific to the endeavor domain (i.e., real estate) or a dictionary specific to a document classes.

The system can, based on reference-sets, generate a dictionary for each class. This dictionary also contains a weight for each word. The weight for each word plus a weight for combinations of words is determined based on frequency and Bayesian analysis of word features with reference to document identity.

Learning also generates Feature Vectors based on Location Diagrams for each set (reference-set). The Feature Vectors generated represent precisely that set of documents, or at least most of the documents, in that reference-set.

The method/apparatus can maximize distance between Feature Vectors derived from Location Diagrams to eliminate overlap and give high weight to properties those are specific to the document.

The method/apparatus can also load Feature Vectors from an outside source.

To address the needs of assigning a unique position to each page in a set of documents to its business context, as well as other needs associated with the given business, the instant invention features in one embodiment a method/apparatus that identifies and collates individual documents and revisions of the same document type within a set. The method/apparatus automatically identifies discontinuities using various algorithms to identify groups or logical units of documents. The instant invention takes advantage of its computer and human collaboration and to utilize the strengths of both. The output of the method/apparatus is a Business Object like MISMO Smart Docs. The Business Object is a business-centered Knowledge Object representation useful to a business decision maker. Further, the method/apparatus of preferred embodiments of the instant invention has a method for making decisions based on business processes to select and organize the Business Objects and provide automated decisions in some situations. The Business Object contains a complete collated and bucketed set of documents, complete relationships of KOs for specific process, etc. Further collated documents and information is presented with the business identification furnished and mapped to the business-specific or user-provided taxonomy. Further this method/apparatus measures relatedness among various pages and sorts and identifies documents on the principle of the reference page.

The instant invention, in preferred embodiments, collates pages from the input set of documents into a logical/numerical sequence. The fields required for different business processes are extracted from these collated and taxonomy-mapped buckets. In preferred embodiments, the instant invention also provides for fact transformation so that the information extracted from the pages in the document set is converted into usable form and can be used directly according to various business-specific manners. The instant invention, in preferred embodiments, provides the formation of Knowledge Objects and additionally ready-to-use Business Objects.

The processes of the instant invention, in preferred embodiments, typically extract the information fields required for various business and/or compliance requirements, then transforms them into facts that can be used further for decision making. The decision system used for analyzing the document set provides logical decisions based on the information within and the business context. The instant invention offers a collation system and complete organization and fact extraction solution that forms the information matrix, Knowledge Objects. This allows information flow from paper documents from a wide variety of types of images to decision-making based on error free analysis using the techniques of intelligent mapping available to the operator of the instant invention. The invention is highly scalable because of its dynamic learning ability based on Feature Vectors and ability to create Business Object based on requirement and business process.

The applications for this Business-Object-creation based on Knowledge Objects as are created by processes such as intelligent document collation and extraction of information are not limited to the mortgage and insurance industries. In fact, this method is useful where there is any business process that uses information from unorganized set of documents. All the places where unorganized information from the documents need to be used for business decisions this business method is useful. It can be used for Knowledge Object creation based on information extraction from various sources of images, paper documents, and PDF files. Further, this system can be great help for many processes, both inside the legal field and otherwise, that are based on signed documents and files with information available within the set of documents is distributed across a variety of pages.

Thus, some preferred embodiments of the instant invention feature:

(1) output of data from Dox Packages as Business Objects (e.g. MISMO SMART Doc) that is business-type specific (Underwriting, Servicing, Closing process etc.);
(2) a complete process right from information/document capture to creation of Business Objects which can directly used for automated decision making and also to advise manual decisions;
(3) unique flow with new algorithms;
(4) novel, user-adjustable, and very business-specific representation of information; and/or
(5) making data, or rather the Business Object, available to make facilitate e-mortgage processing as envisioned by MISMO.

In some embodiments, one of the major purposes of the process of the instant invention is Knowledge Object and Business Object creation. The final output is a Business Object and not only a set of classified or sorted documents. Further, in some embodiments, the purpose of the instant invention is not classification or extraction but to create Business Objects like MISMO Smart-Docs from Knowledge Objects, thereby accelerating automated and manual business decisions.

The basic method used for classification is different from current methods. Also the manner in which and sequence the instant invention uses various complementary technologies, such as filtering and voting, makes the method of the instant invention more accurate.

Additionally, the flow of preferred embodiments of the instant invention is uniquely valuable in yielding Business Objects. Various algorithms are used in a manner and sequence to obtain optimal accuracy. Also, the process of preferred embodiments of the instant invention emphasizes feature/knowledge extraction out of Dox Packages with classification and document separation an allied output. The instant invention, in preferred embodiments, locates the knowledge portion within a Dox Package irrespective of slippage and page numbers. Thus, the instant invention may provide information for the downstream business process directly from Dox Package capture to Business Object creation and decision-making based on the Business Objects.

The assembly of technology and algorithms unique to the instant invention in some embodiments may include at least some, or all of, the following in preferred embodiments:

(1) The intelligent information locator of the instant invention may help the business process by locating the business critical information. The location algorithm uses a novel method to provide accuracy.
(2) The method of preferred embodiments of the instant invention identifies all available sources and multiple occurrences of the same information across the Dox Package, i.e., to different versions of the same type document; this enables the user to compare this information and make decisions based on the most recent or relevant information.
(3) The image- and text-based information locator of the instant invention, in preferred embodiments, takes advantage of image and text properties of the documents while locating the information.
(4) The instant invention recognizes that the document boundaries in business context are not as significant as the multiple occurrences and sets of Knowledge Objects that suggest the presence of more than one form of the same types.
(5) The information locator may also indicate versions and facilitates relevant decisions.
(6) The Location Diagram-based method may be used for rapid location of data, and, which in turn, returns the data association with the image.
(7) The Location Diagram based method locates may collect information from proper page irrespective of similarities among the pages, as well as new variations among the forms.
(8) The Location Diagram-based locator can locate appropriate information based on the version of the form.
(9) The Image and Location Diagram based locator can locate the information on forms irrespective of poor quality of images/OCR output.
(10) The system of the instant invention either may extract or make available the relevant portion or the Dox Package for knowledge extraction by an operator by increasing extraction efficiency by up to 5× over prior methods.
(11) The instant invention, in preferred embodiments, features less turnaround or learning time.
(12) The instant invention, in preferred embodiments, features incremental learning as to locations.
(13) The instant invention, in preferred embodiments, features automatic and semiautomatic learning for added flexibility.
(14) The instant invention, in preferred embodiments, features the verifier for verifying location.
(15) The instant invention, in preferred embodiments, features a scrubber which can scrub extraction output.
(16) The instant invention, in preferred embodiments, features the ability of establishing knowledge-based relationship among all the relevant knowledge portions resulting in a rich Knowledge Object that can help in Creation of Business Objects.
(17) The instant invention, in preferred embodiments, features collation of Knowledge Objects to create Business Objects.
(18) The instant invention, in preferred embodiments, features efficient decision making based on Business Objects.

In one aspect the instant invention features a method of doing business by processing a Dox Packages wherein each Dox Package has at least two pages wherein minimal human intervention is involved in the extraction of information and/or data. In preferred embodiments, the Dox Package has documents related to a mortgage.

In another aspect the instant invention features a method of doing business by processing a group of Dox Packages wherein each Dox Package has at least two pages wherein the information is extracted from the Dox Packages and organized ten times as fast as a human operator. In preferred embodiments, the Dox Package has documents related to a mortgage.

In one aspect, the instant invention features a method of doing business by processing a group of documents, i.e., a Dox Package, where the process comprises some or all of the following steps:

(1) providing at least two of the discrete documents pages containing one or more fields from the group of documents to a device that can provide optical character recognition (OCR), and performing optical character recognition from the discrete documents using the device to generate one or more sets of text-based information;
(2) classifying at least some of the discrete document pages using the sets of text-based information, wherein multiple classification engines are employed and classification is based on a consensus of the classification engines, i.e. their vote;
(3) classifying at least some of the discrete document pages using Image Based Classification (as defined herein);
(4) verifying any of the remaining discrete document pages that are not classified in the step of classifying by employing a Location Diagram wherein the Location Diagram may be constructed using Feature Vectors with the remaining discrete document pages or a portion thereof;
(5) collating at least two of the discrete document pages that form discrete documents;
(6) determining the version number of each document and verifying the page sequence to form a unique document with a specific revision/version identity;
(7) extracting data from the fields of a discrete document to generate extracted data;
(8) scrubbing values from the extracted data to generate values therefrom;
(9) outputting the values to a data warehouse such as a data storage device or a hard drive;
(10) displaying at least some of the values to a user;
(11) forming required relationships between extracted information to form Knowledge Objects; and
(12) collating Knowledge Objects to form Business Objects such as MISMO SMART Docs.

In one aspect, the instant invention features a method of doing business by processing a group of documents using a computer where the process comprises some or all of the following steps:
(1) providing at least two of the discrete documents pages containing one or more fields from the group of documents to a device that can provide optical character recognition (OCR), and performing optical character recognition from the discrete documents using the device to generate one or more sets of text-based information;
(2) classifying at least some of the discrete document pages using the sets of text-based information, wherein multiple classification engines are employed and classification is based on a consensus of the classification engines, i.e. their vote;
(3) classifying at least some of the discrete document pages using Image Based Classification;
(4) verifying any of the remaining discrete document pages that are not classified in the step of classifying by employing a Location Diagram wherein the Location Diagram may be constructed using Feature Vectors with the remaining discrete document pages or a portion thereof;
(5) collating at least two of the discrete document pages that form discrete documents;
(6) determining the version number of each document and verifying the page sequence to form a unique document with a specific revision/version identity;
(7) extracting data from the fields of a discrete document to generate extracted data;
(8) scrubbing values from the extracted data to generate values therefrom;
(9) outputting the values to a data warehouse such as a data storage device or a hard drive;
(10) displaying at least some of the values to a user;
(11) forming required relationships between extracted information to form Knowledge Objects; and
(12) collating Knowledge Objects to form Business Objects such as MISMO SMART Docs.

In one aspect, the instant invention features an apparatus for analyzing a group of documents using the methods described herein wherein said apparatus comprises a computer. In this aspect, the instant invention features an apparatus for processing a group of documents where the apparatus performs all or some of the following steps:
(1) providing at least two discrete documents pages containing one or more fields from the group of documents to a device that can provide optical character recognition (OCR), and performing optical character recognition from the discrete documents using the device to generate one or more sets of text-based information;
(2) classifying at least some of the discrete document pages using the sets of text-based information, wherein multiple classification engines are employed and classification is based on a consensus of the classification engines, i.e. their vote;
(3) classifying at least some of the discrete document pages using Image Based Classification;
(4) verifying any of the remaining discrete document pages that are not classified in the step of classifying by employing a Location Diagram wherein the Location Diagram may be constructed using Feature Vectors with the remaining discrete document pages or a portion thereof;
(5) collating at least two of said discrete document pages that form discrete documents;
(6) determining the version number of each document and verifying the page sequence to form a unique document with a specific revision/version identity;
(7) extracting data from the fields of a discrete document to generate extracted data;
(8) scrubbing values from the extracted data to generate values therefrom;
(9) outputting the values to a data warehouse such as a data storage device or a hard drive;
(10) displaying at least some of the values to a user;
(11) forming required relationships between extracted information to form Knowledge Objects; and
(12) collating Knowledge Objects to form Business Objects such as MISMO SMART Docs.

In a still other aspect, the instant invention features a method of analyzing a bundle of loans assembled for sale on the secondary market wherein over 30%, over 40%, over 50%, over 60%, or over 70% of the mortgage documents are analyzed and the data/information is extracted.

In certain embodiments in any of the aspects of the instant invention, ambiguities in the processing of the documents are escalated to a human collaborator, in particular this may occur during or following the classification step, the field location step, and/or the data extraction step. In one embodiment of the instant invention, the step of performing optical character recognition is performed by, or with the assistance of, a computer. In another embodiment of the instant invention, the step of classifying is performed by, or with the assistance of, a computer. In still another embodiment of the instant invention, the step of verifying is performed by, or with the assistance of, a computer. In a further embodiment of the instant invention, the step of collating is performed by, or with the assistance of, a computer. In a still further embodiment of the instant invention, the step of extracting data is performed by, or with the assistance of, a computer. In another embodiment of the instant invention, the step of scrubbing is performed by, or with the assistance of, a computer. In still another embodiment of the instant invention, the outputting is performed by, or with the assistance of, a computer. In still a further embodiment of the instant invention, the step of displaying is performed by, or with the assistance of, a computer. In one embodiment of the instant invention, ambiguities at any step are escalated to a human operator. In another embodiment of the instant invention, the group of documents being analyzed is a group of mortgage loan documents. In other embodiments of the instant invention, the groups of documents being analyzed may be home appraisals, credit reports, and a single loan file where it is frequently used for underwriting purposes.

In any of the above aspects, the invention also features a method of operating a business where a purpose of the business is to offer the method/apparatus of preferred embodiments of the instant invention as a service. In another aspect, the instant invention features advertising the method/apparatus of the instant invention and/or advertising the availability of a service featuring the method/apparatus of the instant invention.

EXAMPLES

Example 1

FIG. 5 depicts screen shots of output obtained through the use of one embodiment of the instant invention. That is, using a Dox Package analyzed by the method/apparatus as described herein, the following exemplary data was available for analysis for making business decisions.

The invention illustratively described herein can suitably be practiced in the absence of any element or elements, limitation or limitations that is not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalent of the invention shown or portion thereof, but it is recognized that various modifications are possible within the scope of the invention claimed. Thus, it should be understood that although the present invention has been specifically disclosed by preferred embodiments and optional features, modifications and variations of the inventions embodied herein disclosed can be readily made by those skilled in the art, and that such modifications and variations are considered to be within the scope of the inventions disclosed herein. The inventions have been described broadly and generically herein. Each of the narrower species and subgeneric groupings falling within the generic disclosure also form the part of these inventions. This includes within the generic description of each of the inventions a proviso or negative limitation that will allow removing any subject matter from the genus, regardless or whether or not the material to be removed was specifically recited. In addition, where features or aspects of an invention are described in terms of the Markush group, those schooled in the art will recognize that the invention is also thereby described in terms of any individual member or subgroup of members of the Markush group. Further, when a reference to an aspect of the invention lists a range of individual members, as for a non-limiting example, 'the letters A through F, inclusive,' it is intended to be equivalent to listing every member of the list individually, that is 'A, B, C, D, E and/or F,' and additionally it should be understood that every individual member may be excluded or included in the claim individually. Additionally, when a reference to an aspect of the invention lists a range of individual numbers, as for a non-limiting example, '0.25% to 0.35%, inclusive,' it is intended to be equivalent to listing every number in the range individually, and additionally it should be understood that any given number within the range may be included in the claim individually.

The steps depicted and/or used in methods herein may be performed in a different order than as depicted and/or stated. The steps are merely exemplary of the order these steps may occur. The steps may occur in any order that is desired such that it still performs the goals of the claimed invention.

Example 2

For using the systems and methods described herein, the brokers do not have to change their behavior in order to deliver the native pdf package from their desktop loan origination system (LOS). Instead of printing to their HP printer, they select a special print driver and when they click "print," the information flows electronically and securely into the system described.

Using a traditional paper-based system, the broker needs to print out documents into papers, and sending documents via a fax machine while standing over the fax machine to make sure that papers are fed correctly. Using the systems and methods described, the broker logs on to the system via the Internet, puts in an ID and password, and watches the electronic load file populate with the documents he or she has just send. There is no need to call the processor to confirm if the papers arrive successfully—the broker can see the transmission via the systems and methods described. Remaining documents received via snail mail can also be faxed over for going right into the inbox or a designated electronic loan file. There is no need to take electronic data in the broker's LOS and turn it into paper only for the purpose of faxing it into a lender, who will spend time, money and effort to turn it back into electronic data.

On the lender's side, documents received in the inbox or a designated electronic loan file in the system described can be viewed within a few minutes. By clicking a "facts" button of the system described, data of predetermined fields can be extracted and outputted in a specified format for the mortgage lender's own database, AU engine, and pipeline management system. The system described can also trigger rules that compare the fields of one document to another automatically.

Example 3

Selected Screen Shots Showing Process to Set Up a New Client Site

Figure 9:
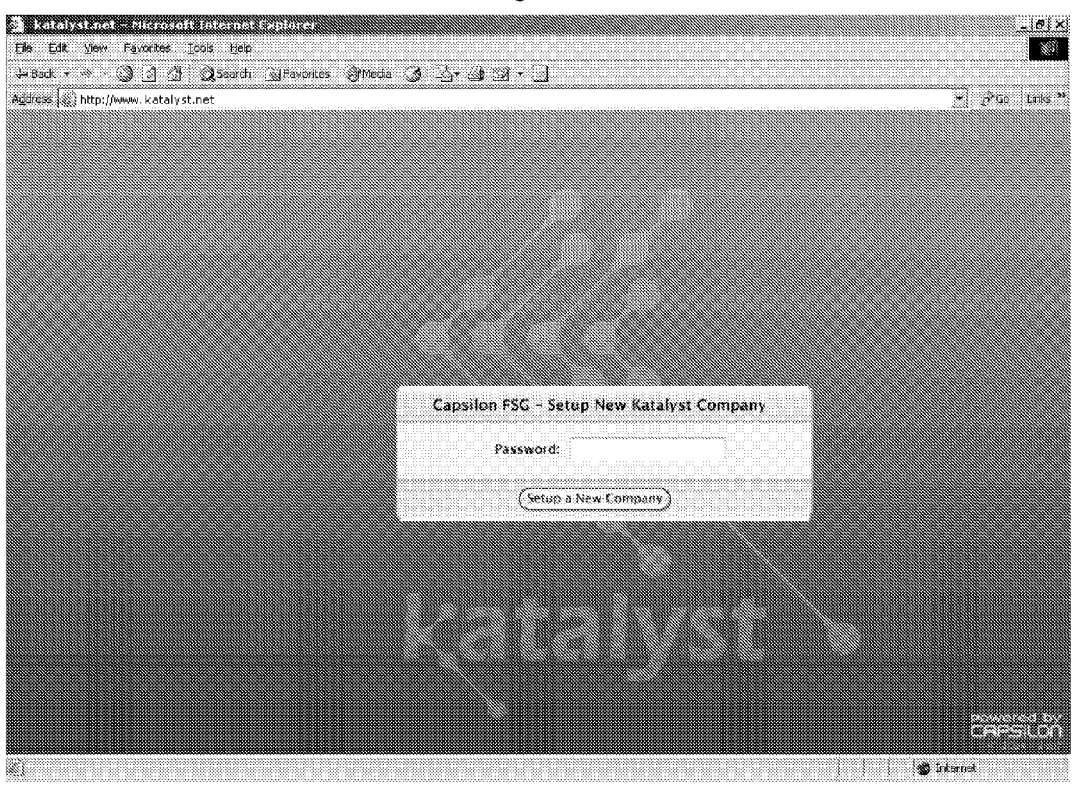
FIG. 9 shows the sign-up site for setting up a new Client Site for a new company using katalyst.net.
Figure 10:
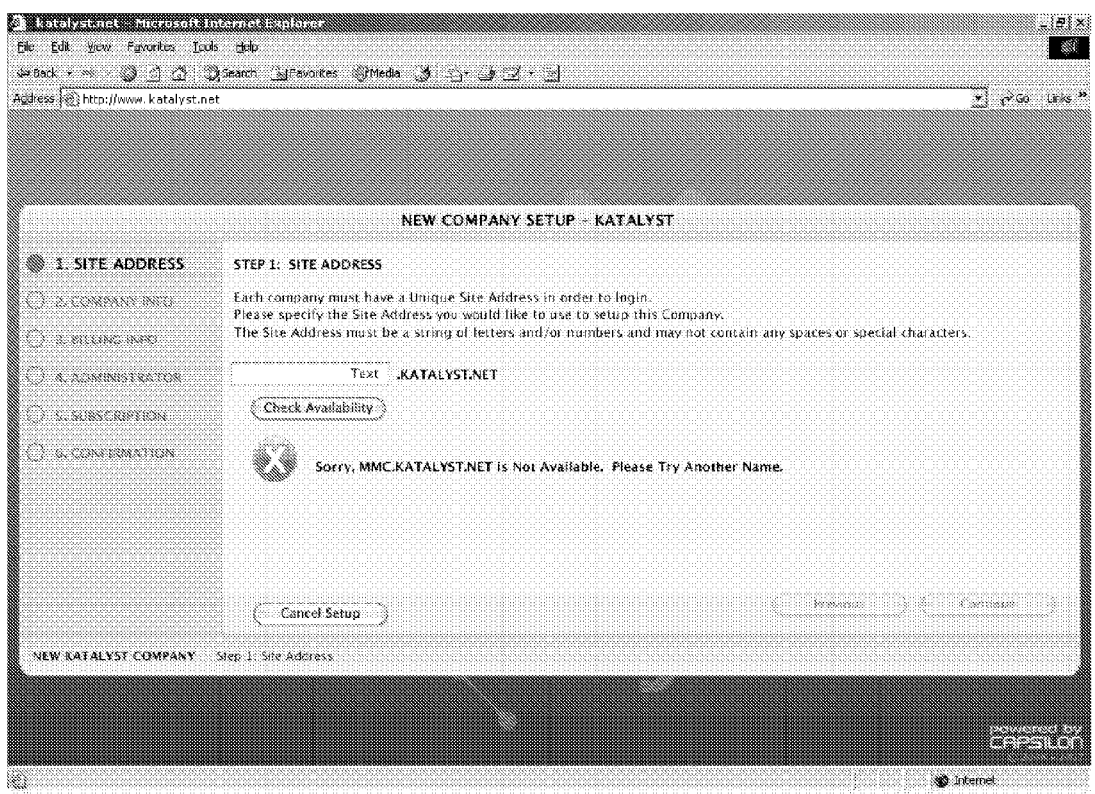
FIG. 10 shows that each company can have a unique name. If a particular name has been used, the program will ask the user to input a different name.
Figure 11:
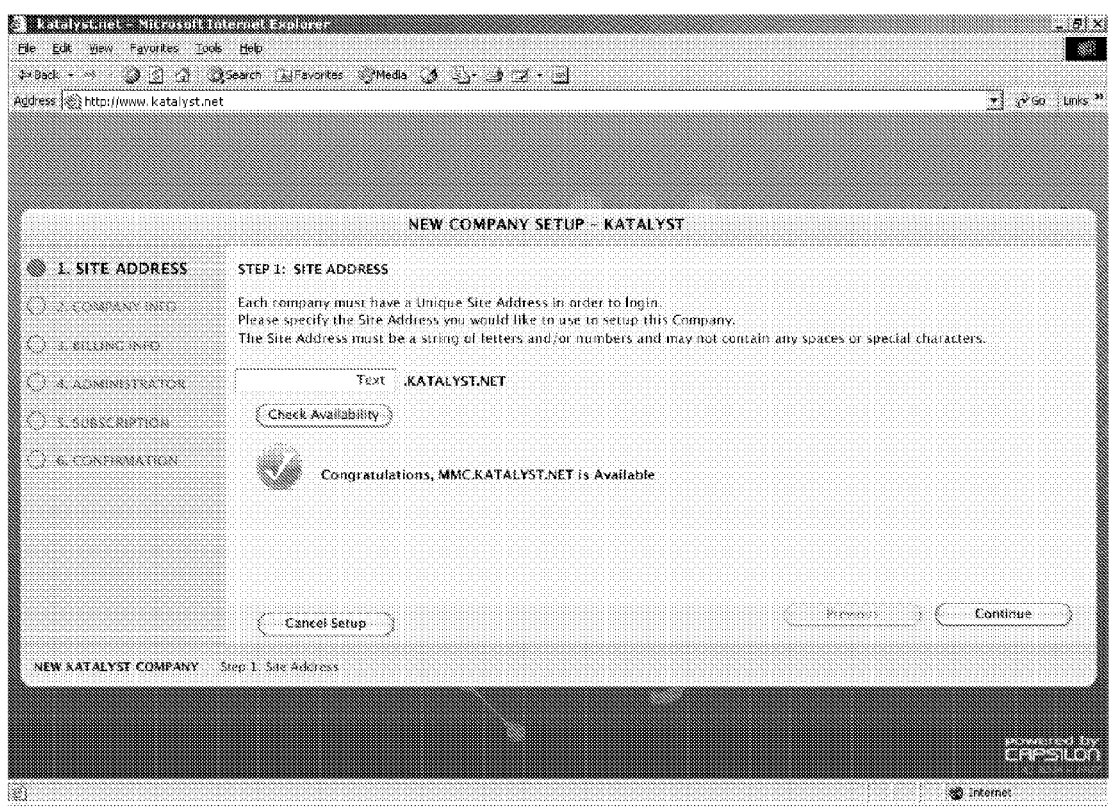
FIG. 11 shows that a new company name has been accepted by the program.
Figure 12:
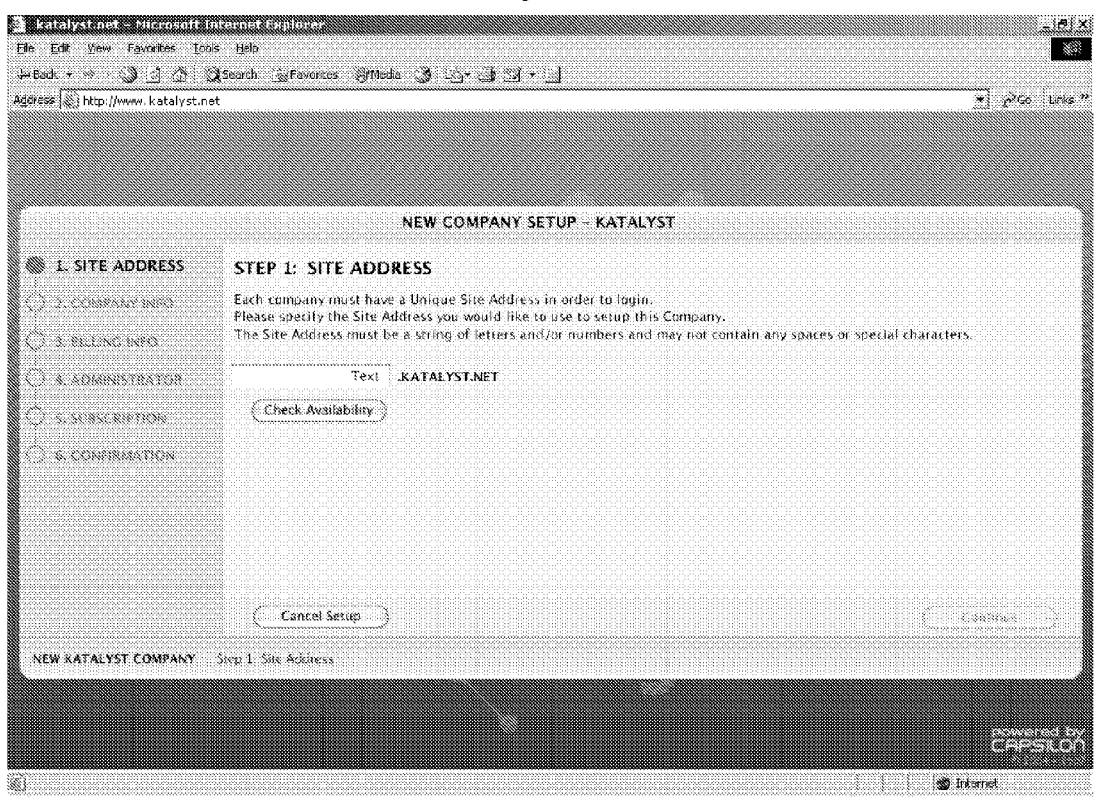
FIG. 12 shows that the user must have a unique site address in order to login as the first step.
Figure 13:
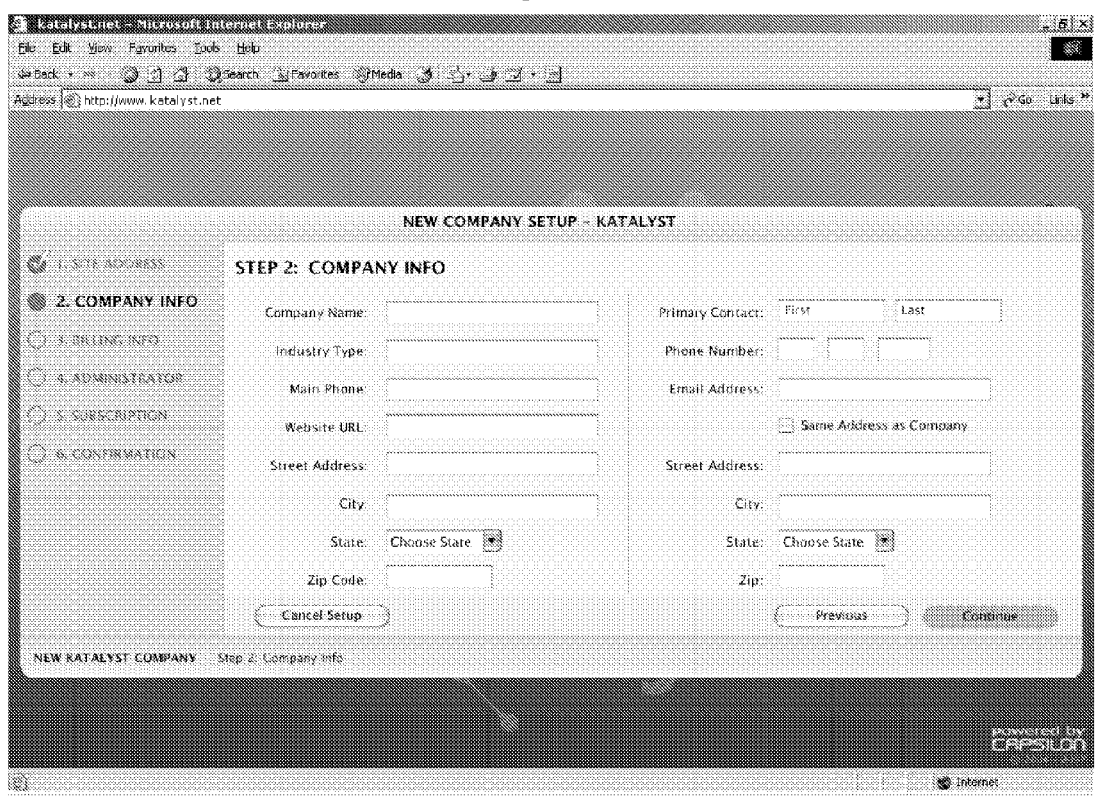
FIG. 13 shows that the user can input info for the company as the second step.
Figure 14:
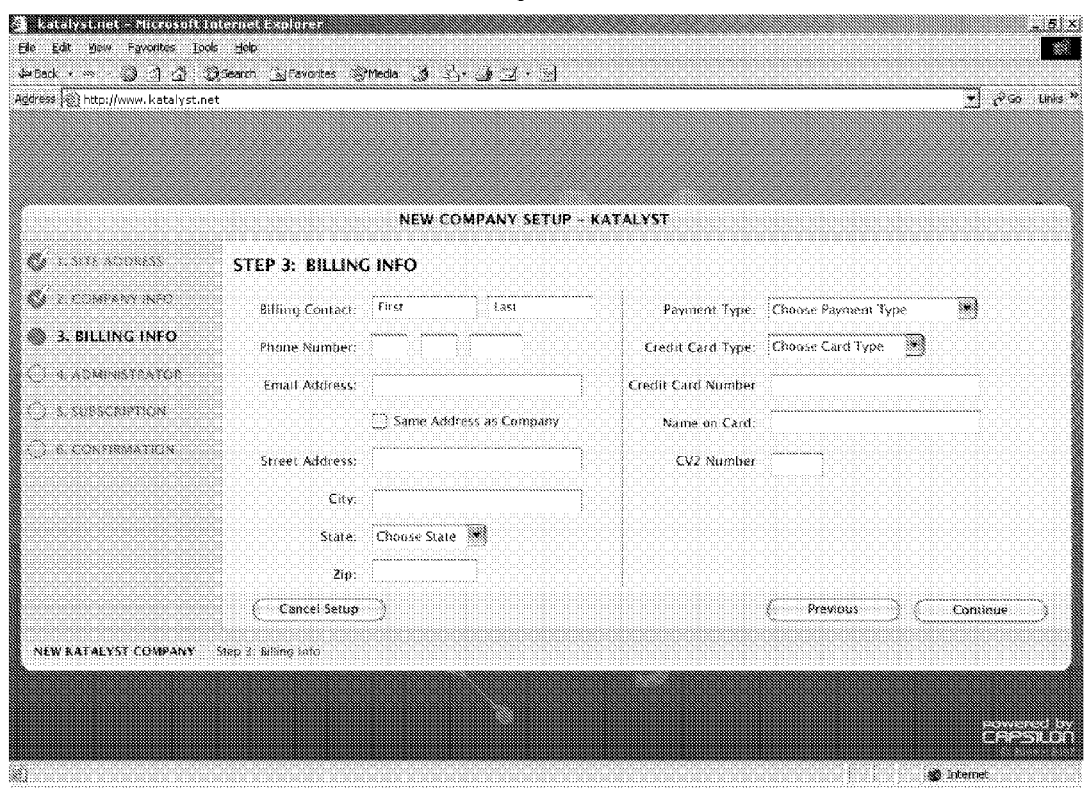
FIG. 14 shows that the user can input billing info as the third step.
Figure 15:
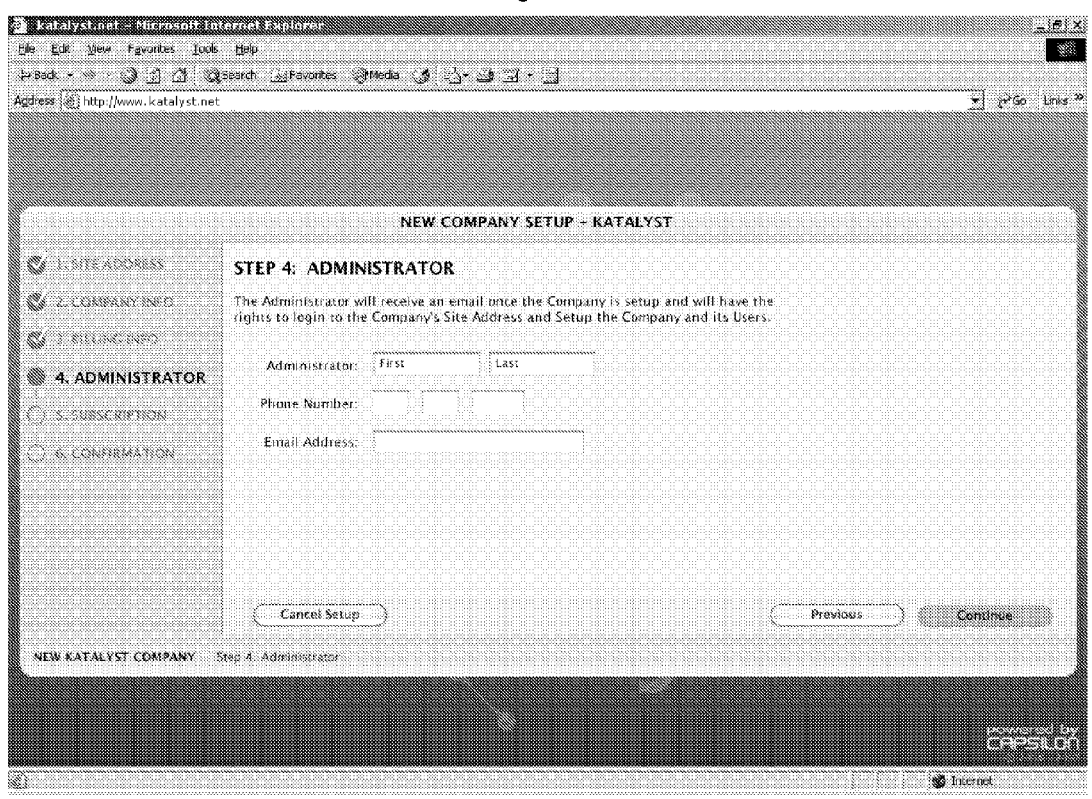
FIG. 15 shows that an administrator can be designated as the fourth step.
Figure 16:
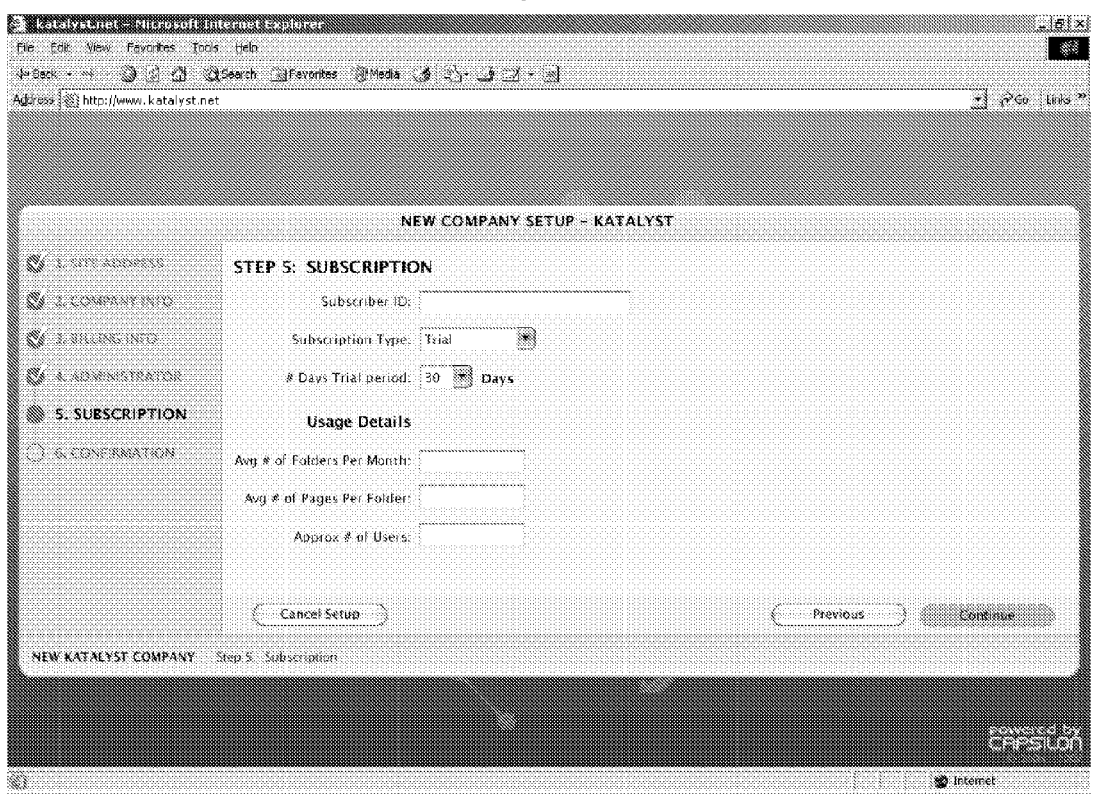
FIG. 16 shows that the user can choose various subscription details as the fifth step.
Figure 17:
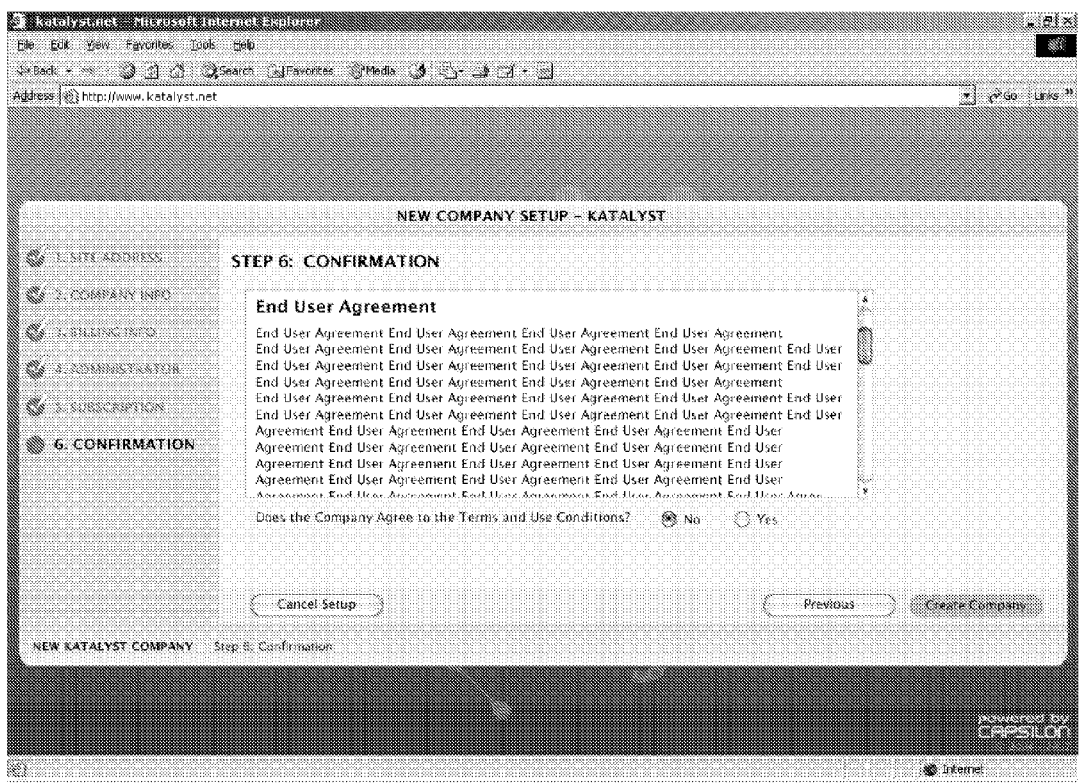
FIG. 17 shows that the user confirms the end user agreement as the sixth step.
Figure 18:
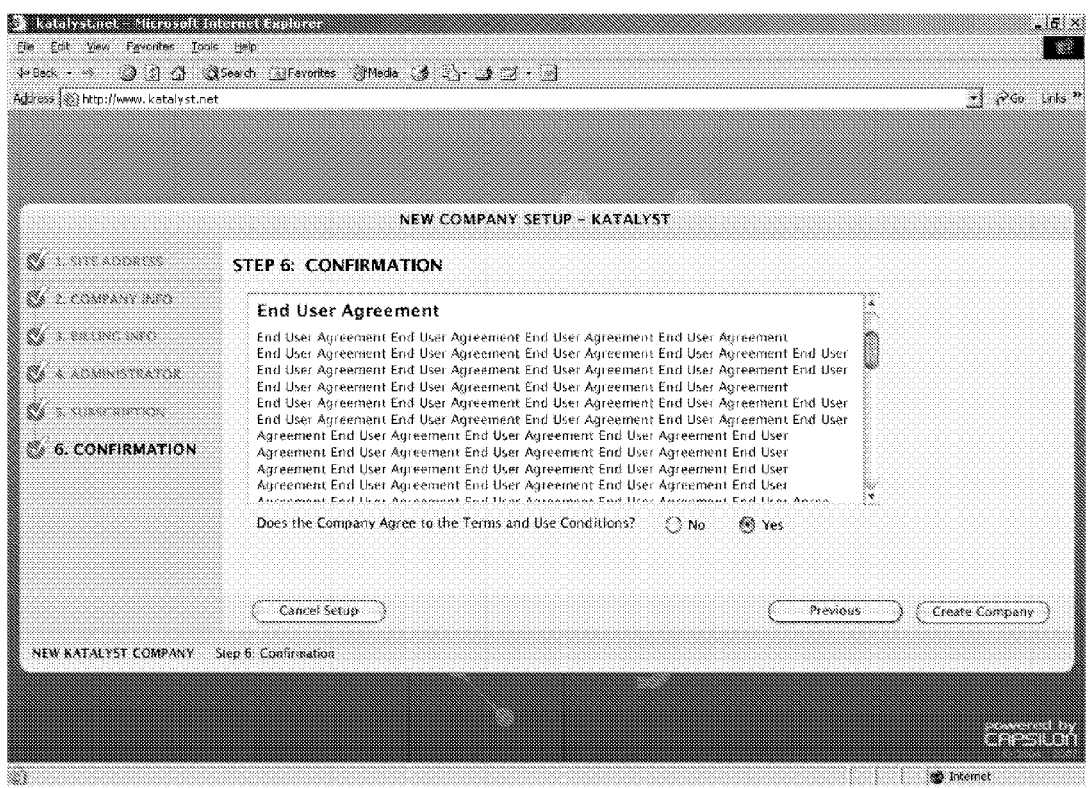
FIG. 18 shows that the user clicks to yes button to confirm the end user agreement.
Figure 19:
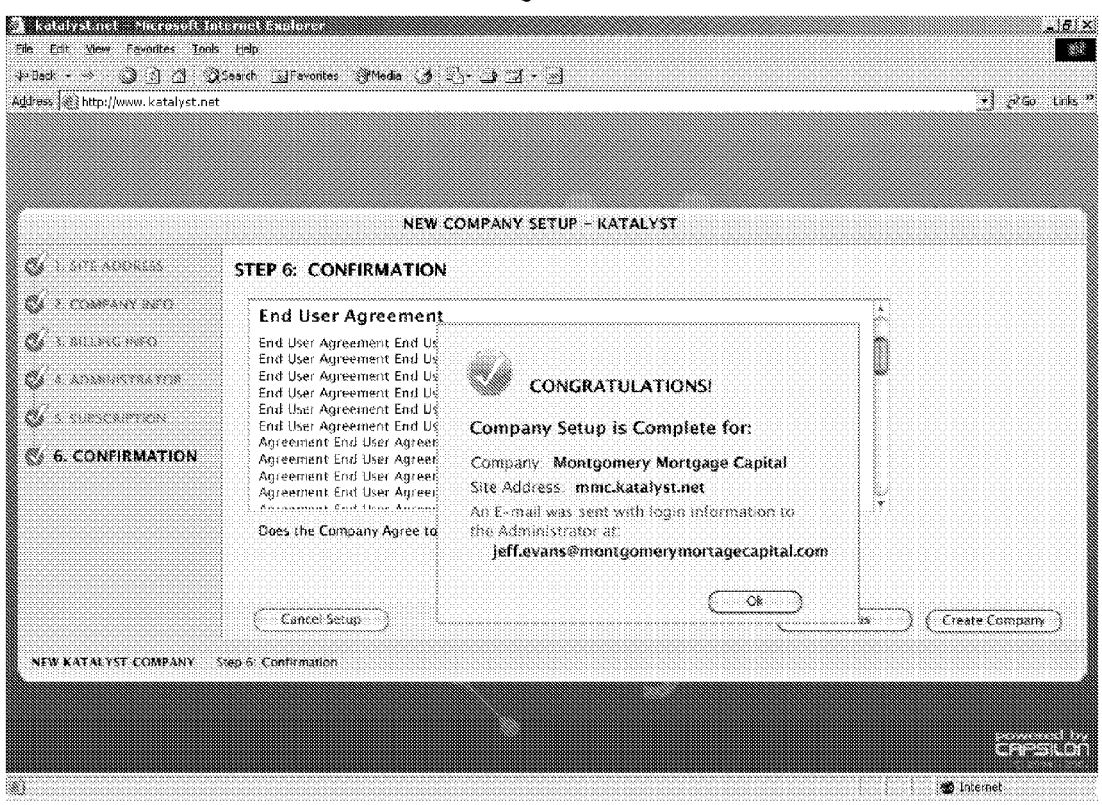
FIG. 19 shows the message stating that the set-up process has been completed.

A new user can go to the katalyst.net site for setting up a new Client Site for a new company (FIG. 9). Each company can have a unique name. If a particular name has been used, the program will ask the user to input a different name. (FIG. 10). FIG. 11 shows that a new company name has been accepted by the program. After entering into the program, as the first step of process, the program will ask the user to provide a unique site address in order to login in the future (FIG. 12). FIG. 13 shows that the user can input info for the company as the second step of the process. FIG. 14 shows that the user can input billing info as the third step of the process. An administrator can be designated as the fourth step of the process (FIG. 15). This is a very important step because an administrator has authority to control many functions of the program including setting up security levels in the future. FIG. 16 shows that the user can choose various subscription details as the fifth step of the process. For the sixth step of the process, the user needs to confirm the end user agreement as the sixth step (FIG. 17). FIG. 18 shows that the user clicks to yes button to confirm the end user agreement. After the set-up process has been completed, the program will show a congratulation message (FIG. 19).

Example 4

Selected Screen Shots from Katalyst Messenger

Figure 20:
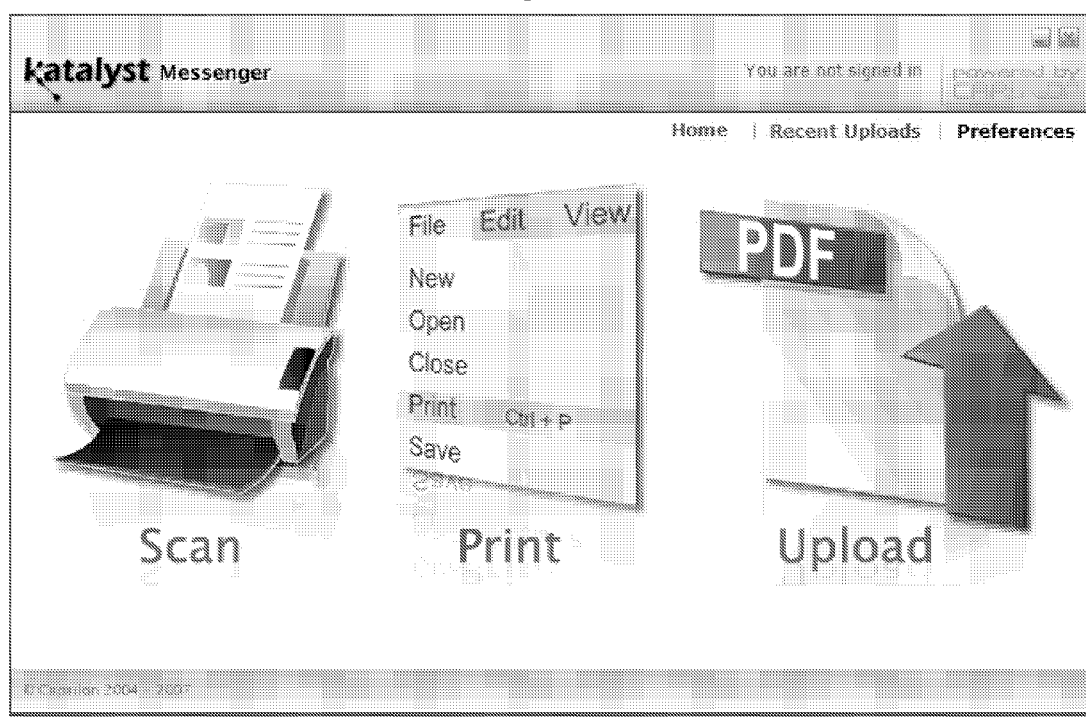
FIG. 20 shows that the desktop tool Messenger has three major functions—scan, print, and pdf upload files for uploading documents into the Web-based system.
Figure 21:
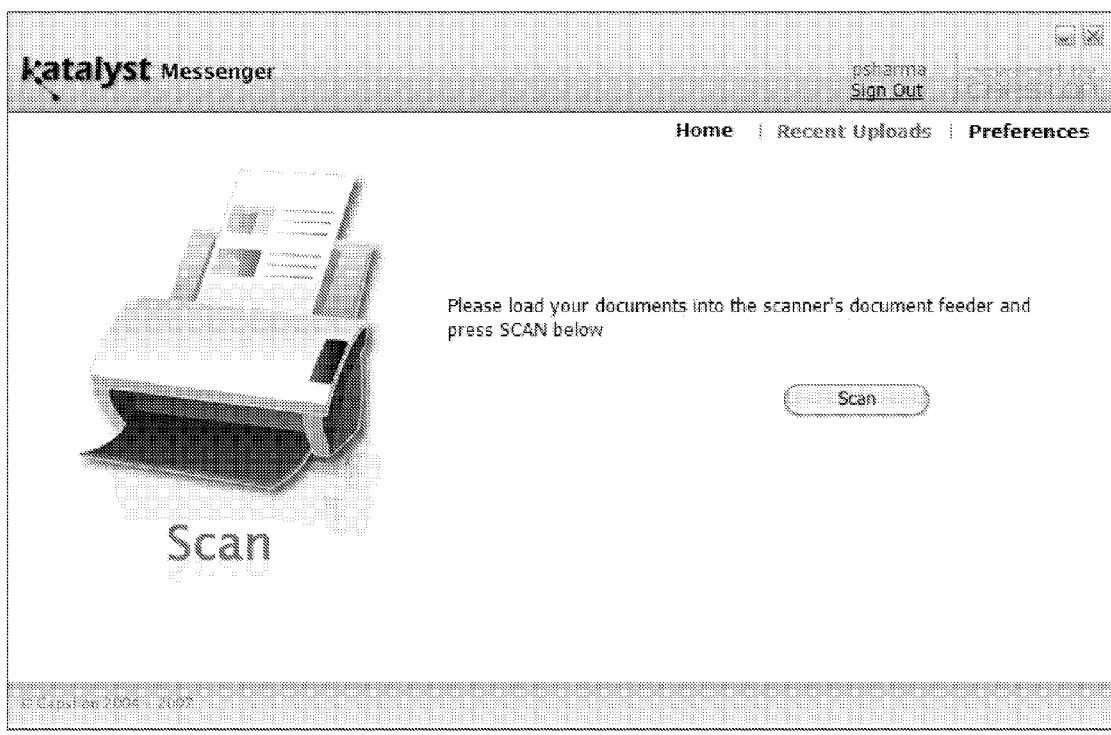
FIG. 21 shows the scan function of Messenger.
Figure 22:
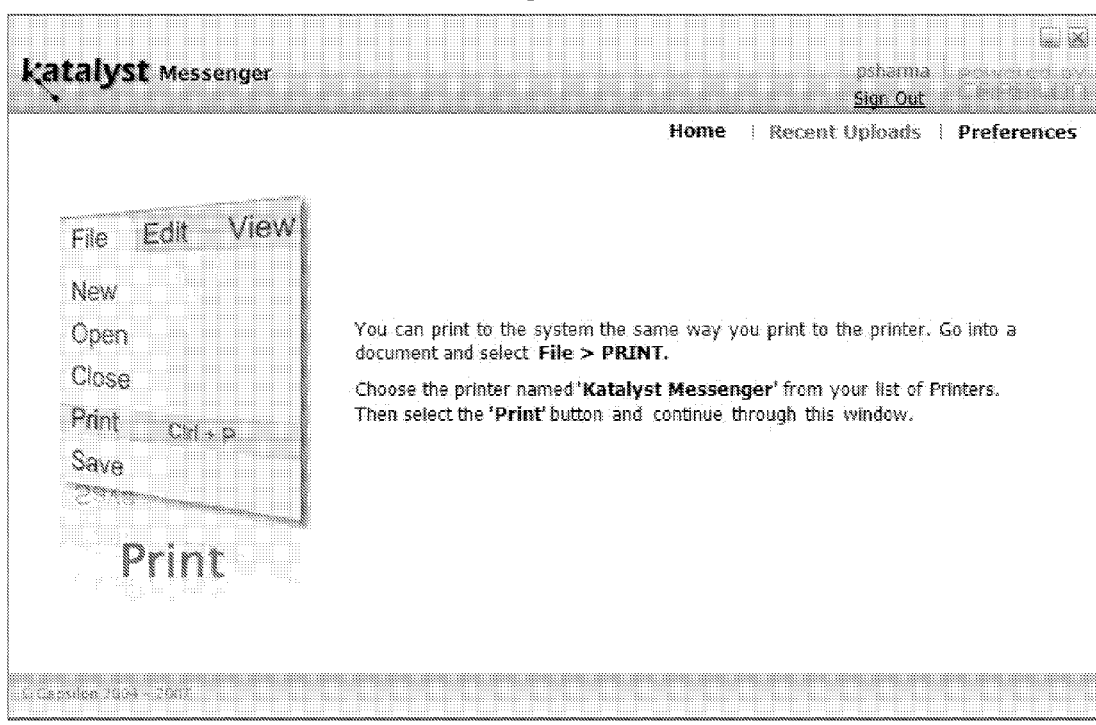
FIG. 22 shows the print function of Messenger.
Figure 23:
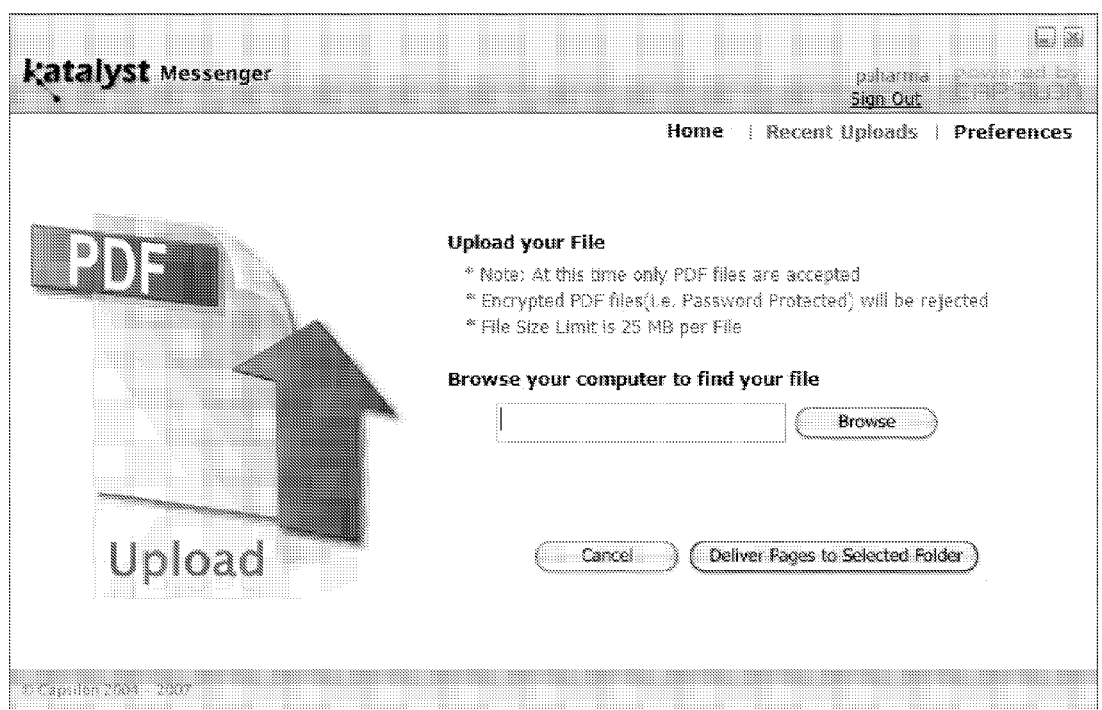
FIG. 23 shows the pdf upload function of the Messenger.
Figure 24:
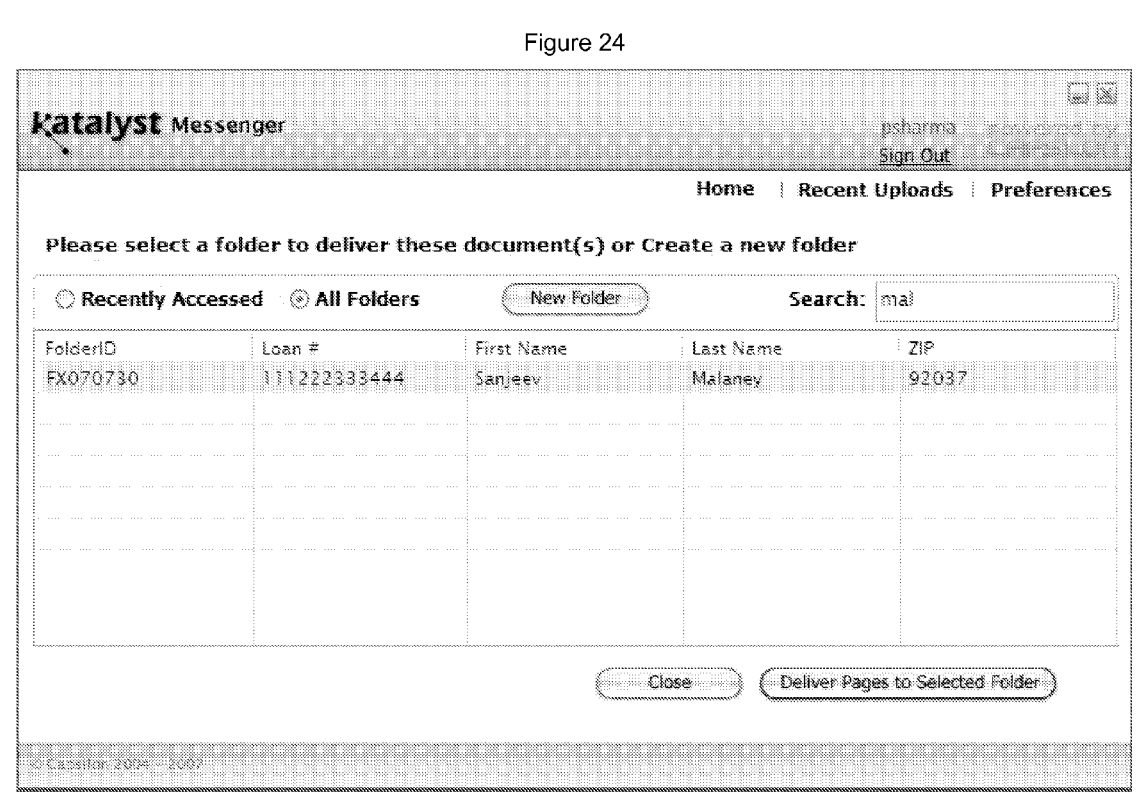
Figure 25:
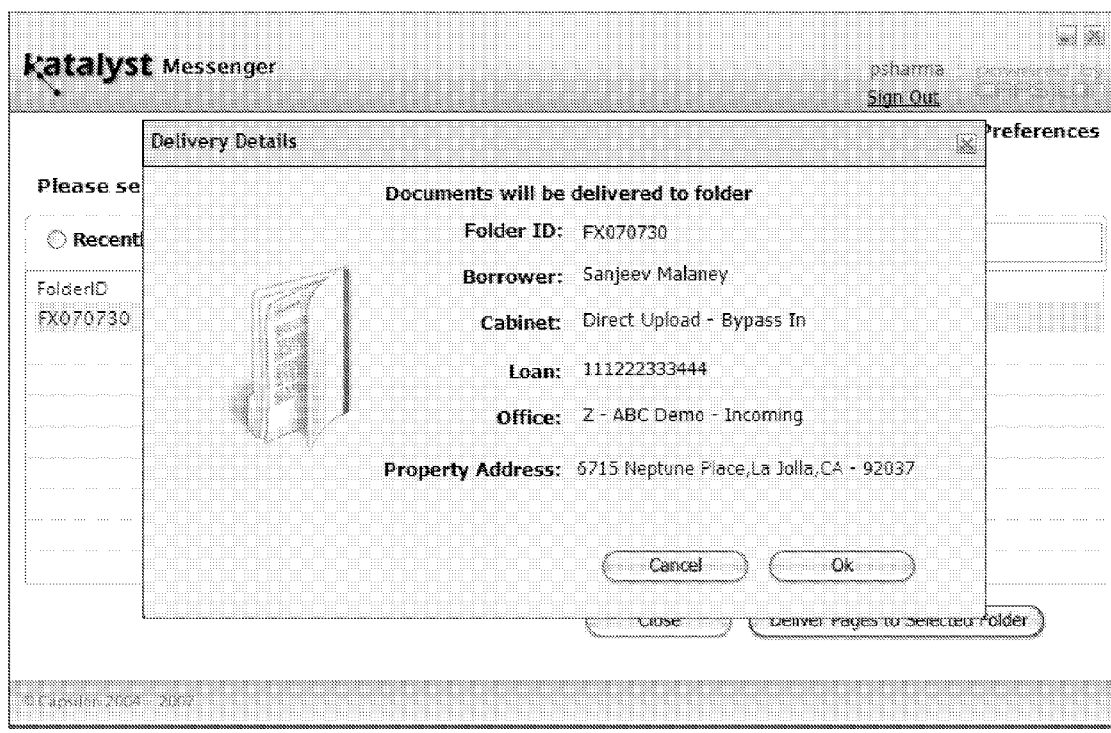
FIG. 25 shows that a demo document is being uploaded and bypassing auto-indexing.
Figure 26:
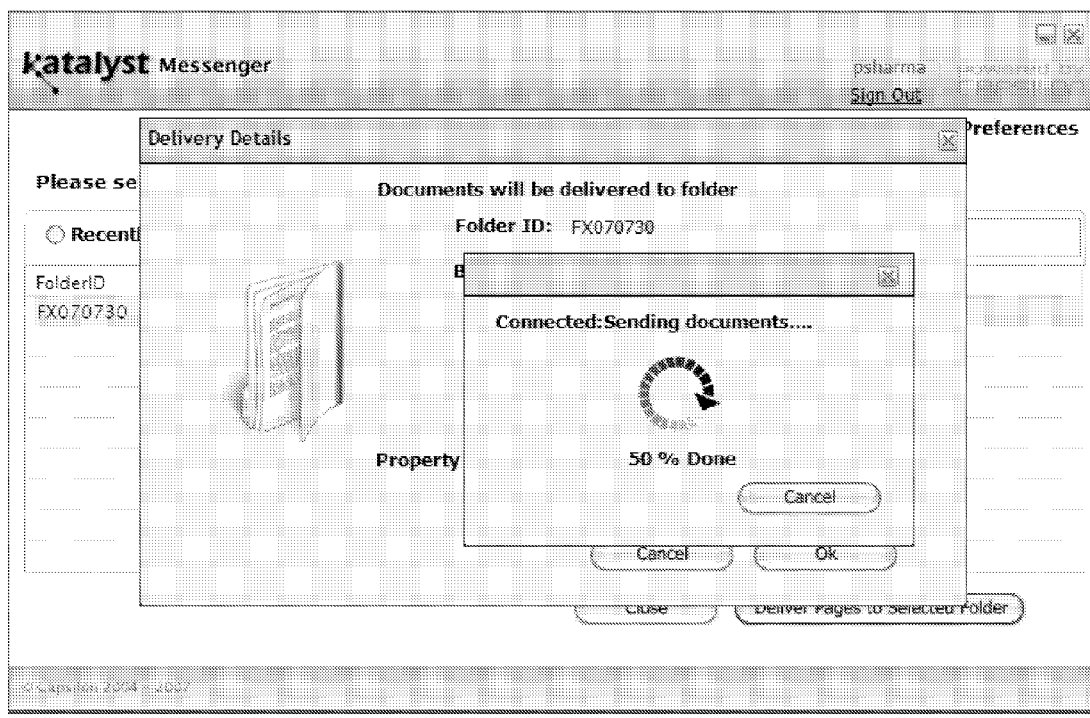
FIG. 26 shows that the user can monitor the progress of uploading the document.
Figure 27:
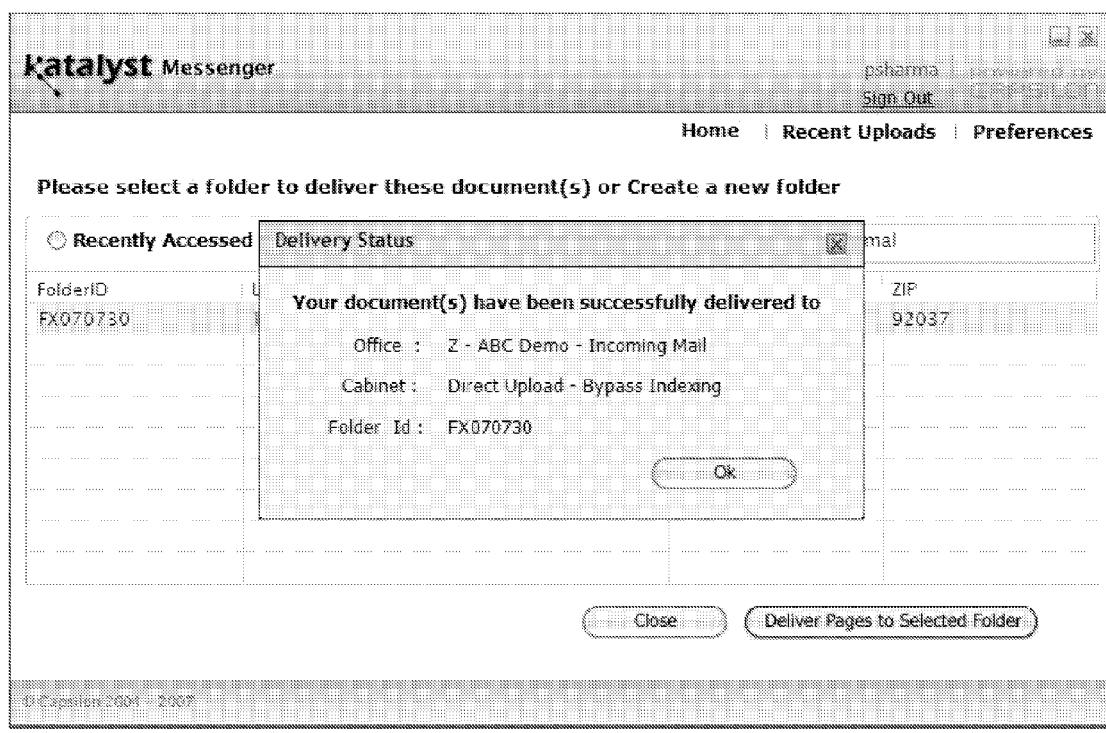
FIG. 27 shows that the demo document has been successfully uploaded.
Figure 28:
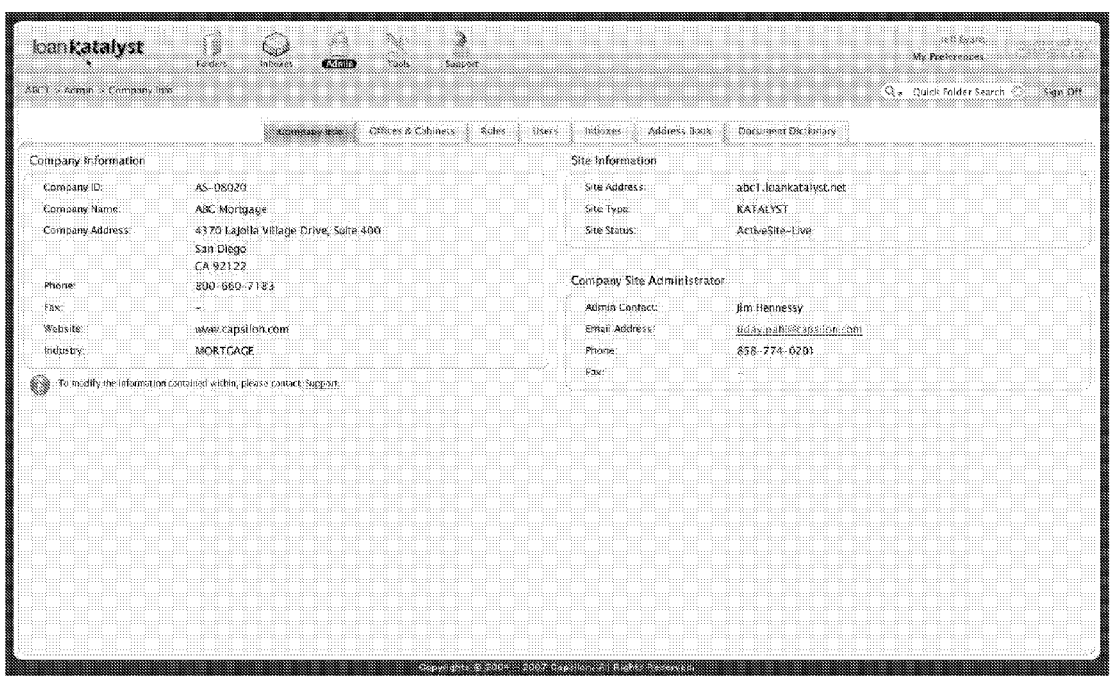
FIG. 28 shows that the company info can be viewed after logged into the loan katalyst.
Figure 29:
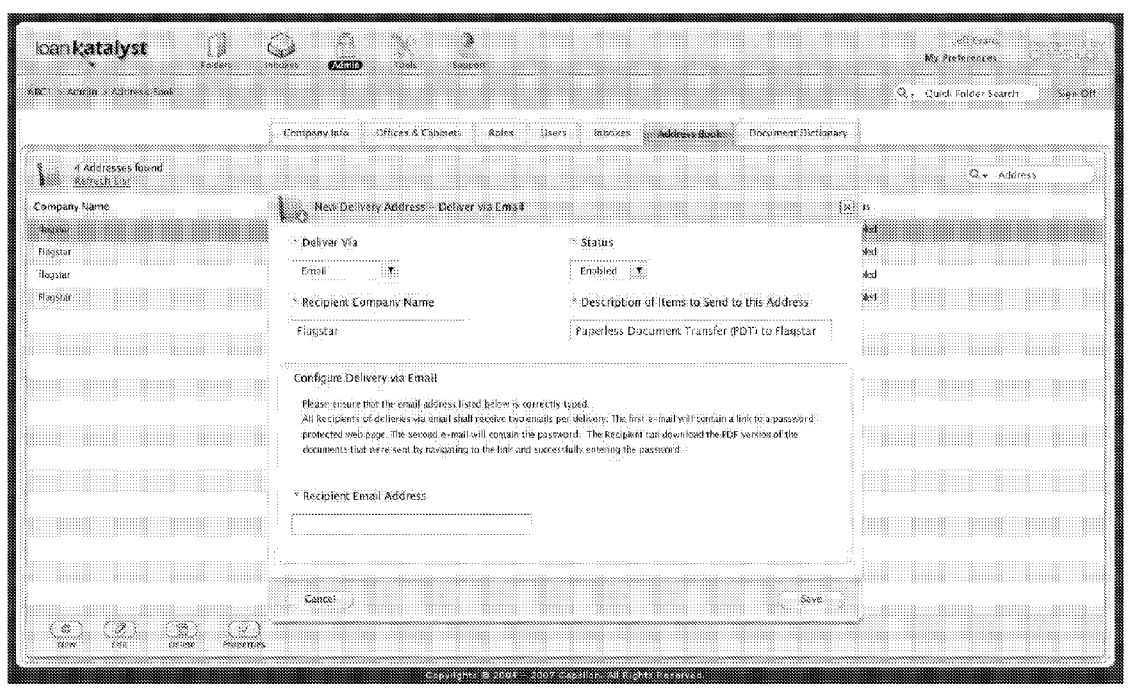
FIG. 29 shows the delivery center of loan katalyst.
Figure 30:
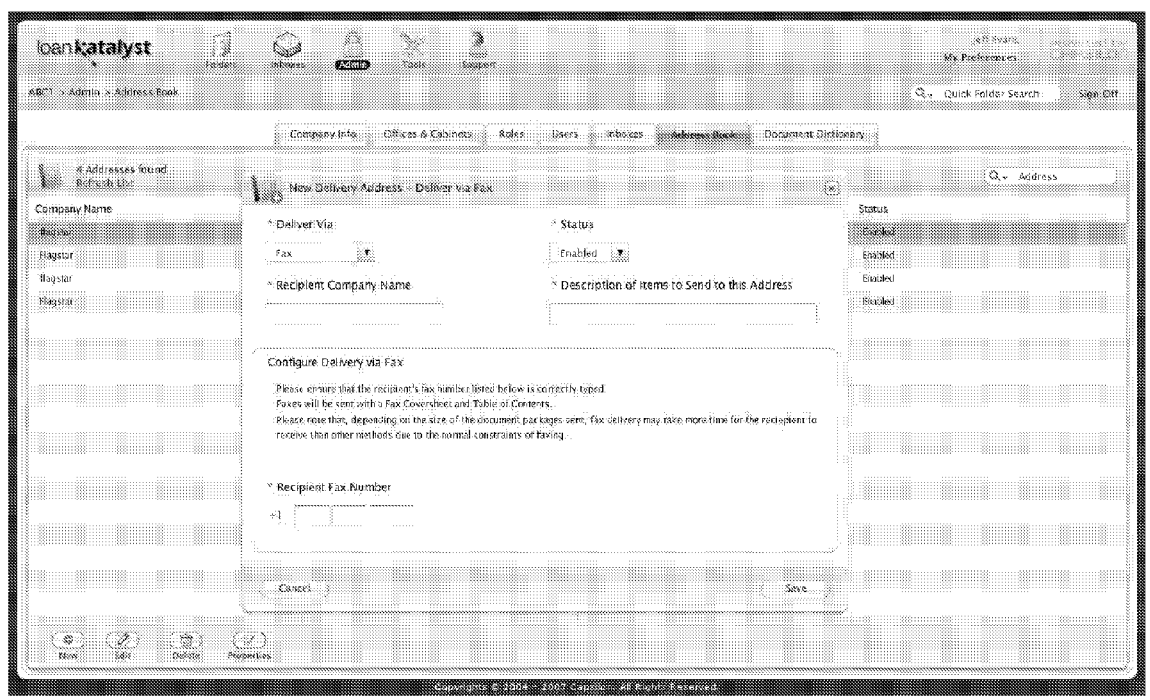
FIG. 30 shows that delivery can be carried out via fax or e-mail (see FIG. 29).
Figure 31:
FIG. 31 shows a user can configure a delivery using loan katalyst.
Figure 32:
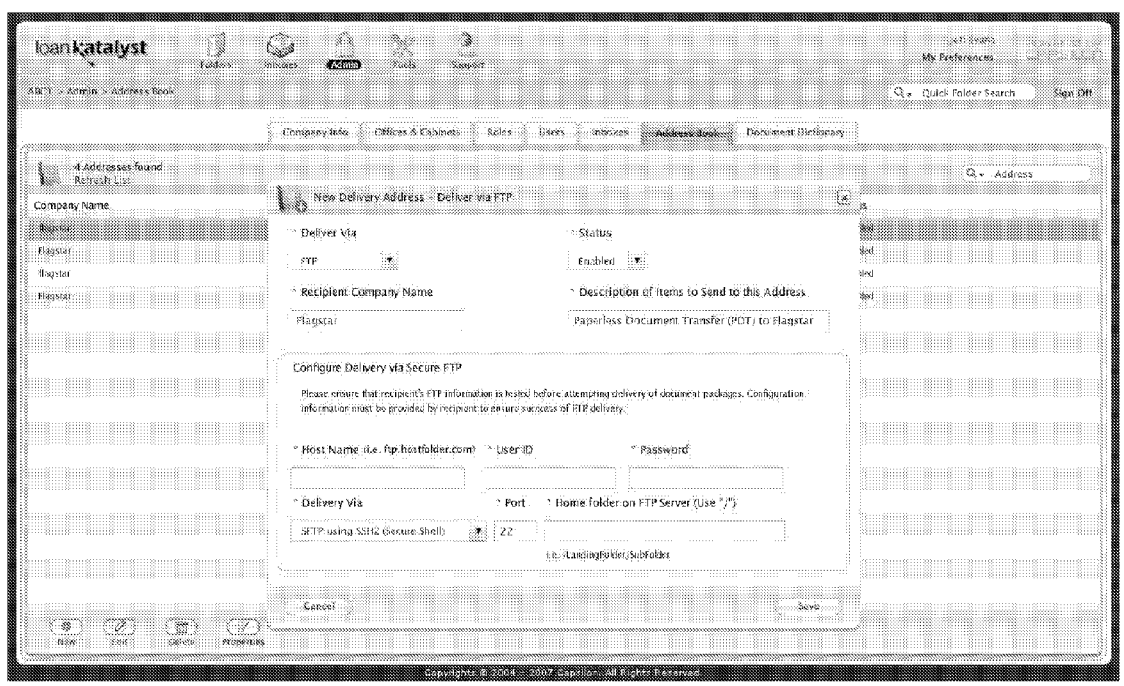
FIG. 32 shows that delivery can be carried out via ftp.
Figure 33:
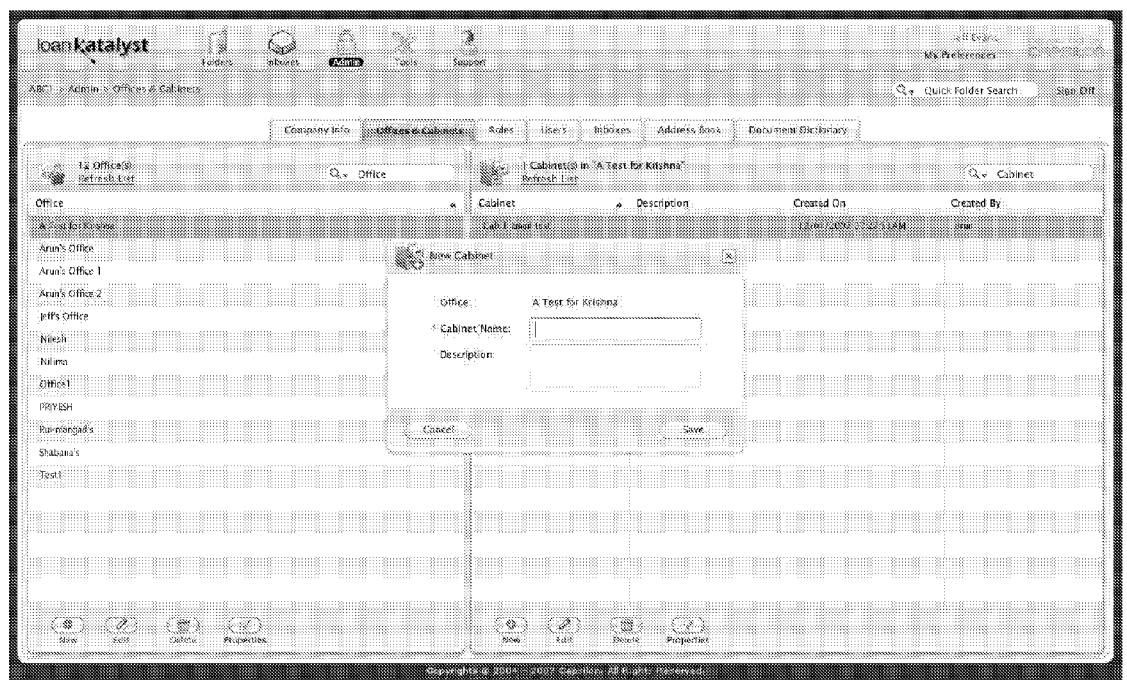
FIG. 33 shows that a user can create a new cabinet using loan katalyst.
Figure 34:
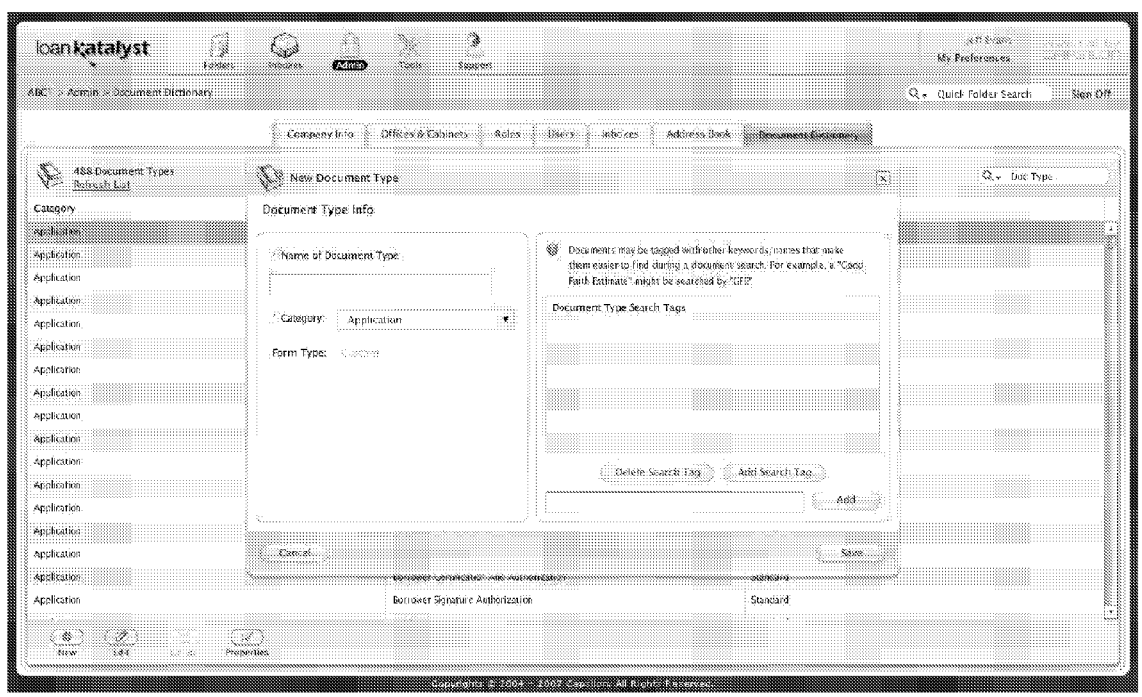
FIG. 34 shows that a user can create a new document type using loan katalyst.
Figure 35:
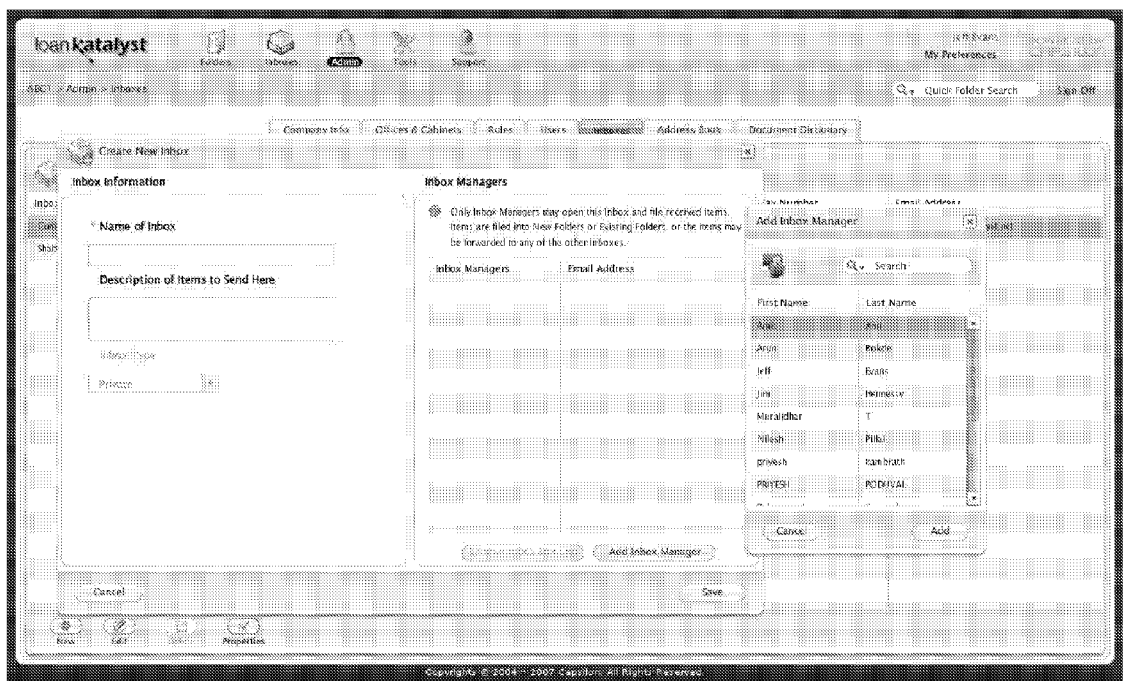
FIG. 35 shows the inbox information and inbox messenger of loan katalyst.
Figure 36:
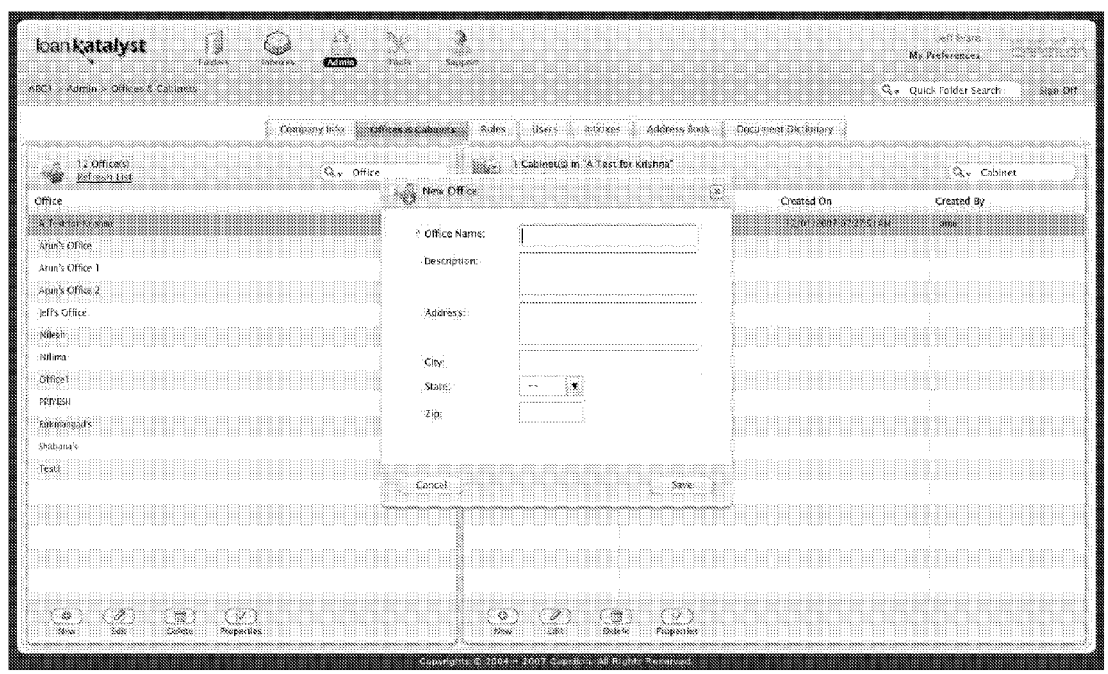
FIG. 36 shows that a user can create a new office using loan katalyst.
Figure 37:
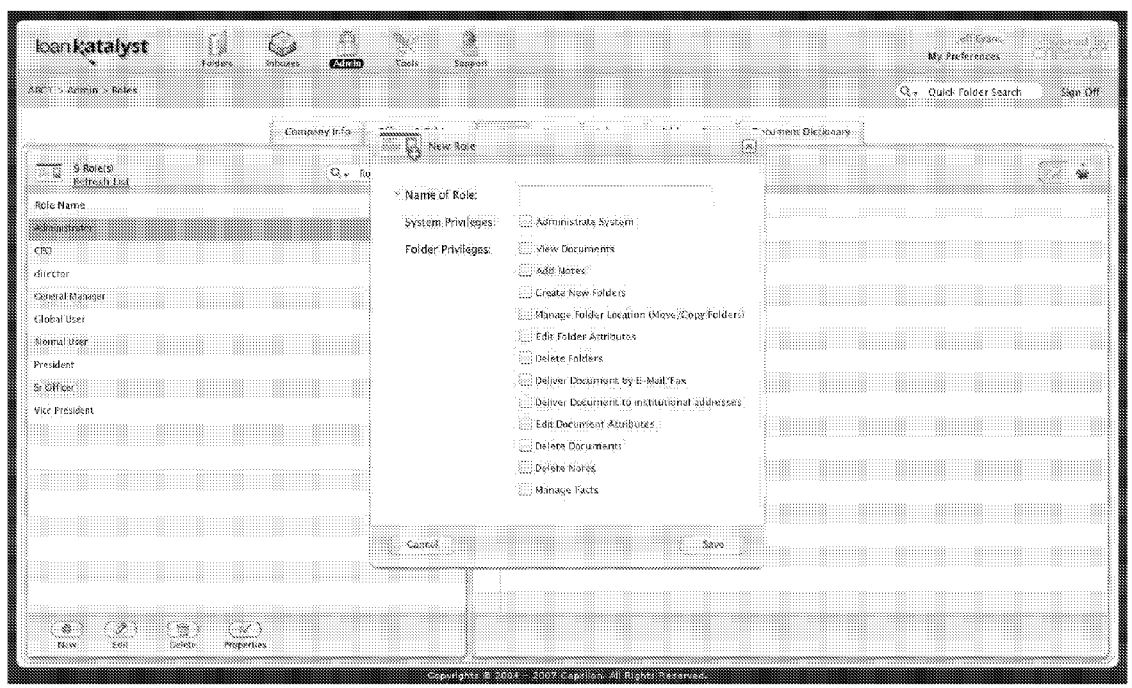
FIG. 37 shows that a user can create a new role using loan katalyst.
Figure 38:
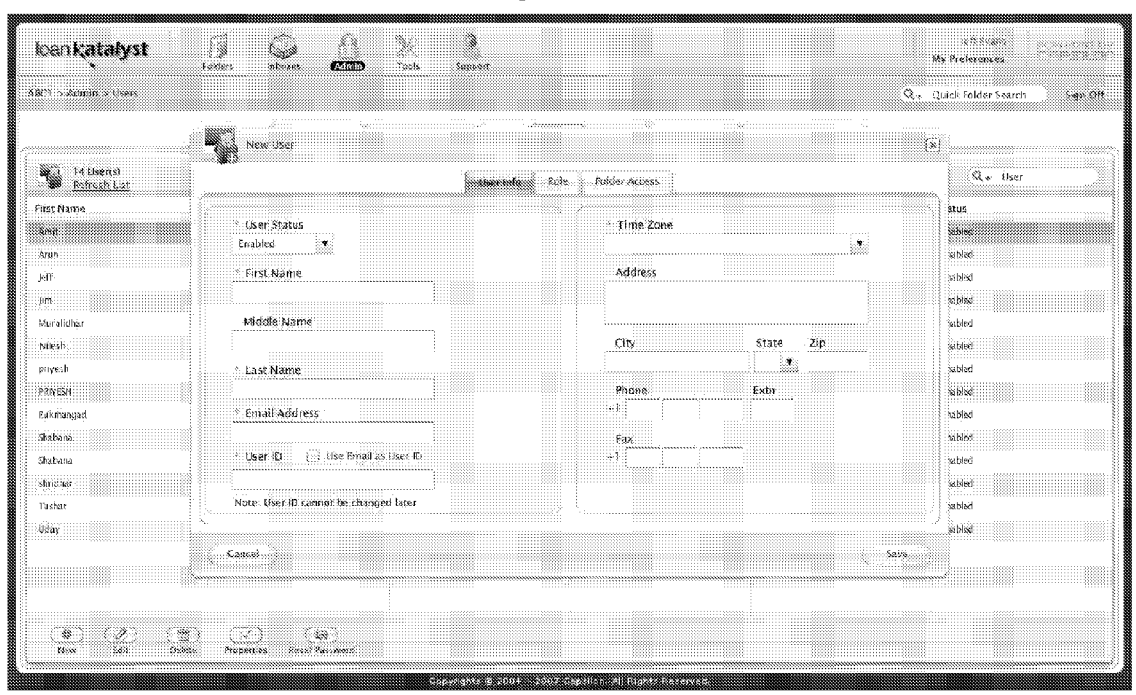
FIG. 38 shows that a new user can input details about himself or herself using loan katalyst.
Figure 39:
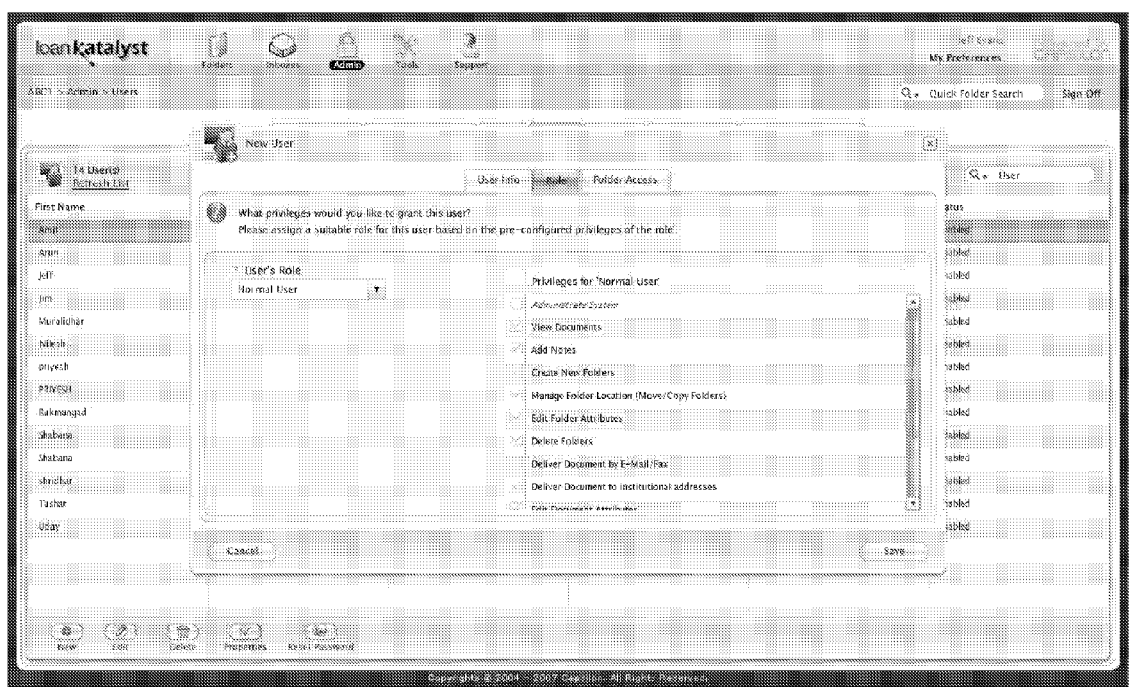
FIG. 39 shows that user's role can be viewed using loan katalyst.
Figure 40:
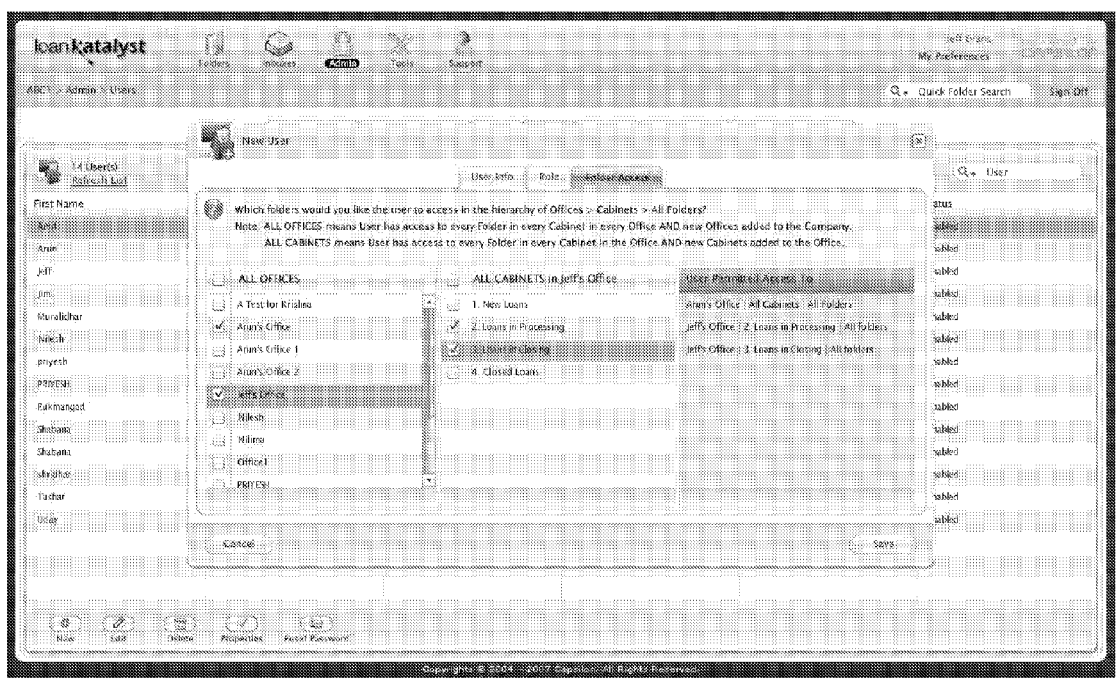
FIG. 40 shows that a user has access to various offices and cabinets using loan katalyst.
Figure 41:
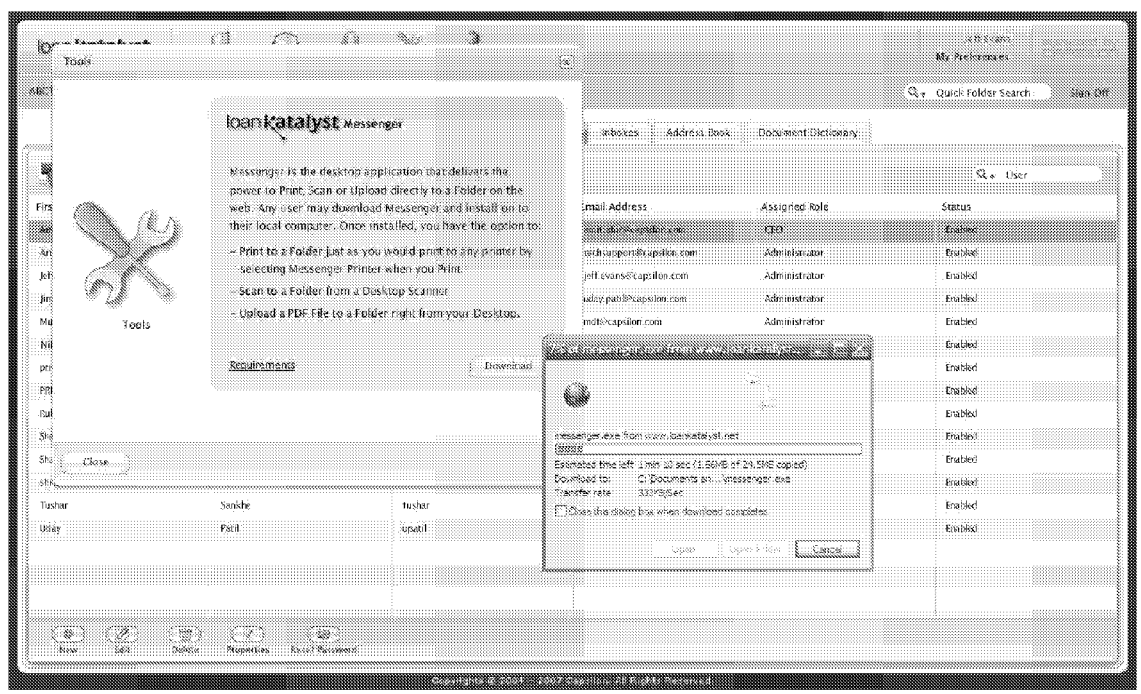
FIG. 41 shows that the program is uploading documents and the process can be monitored.
Figure 42:
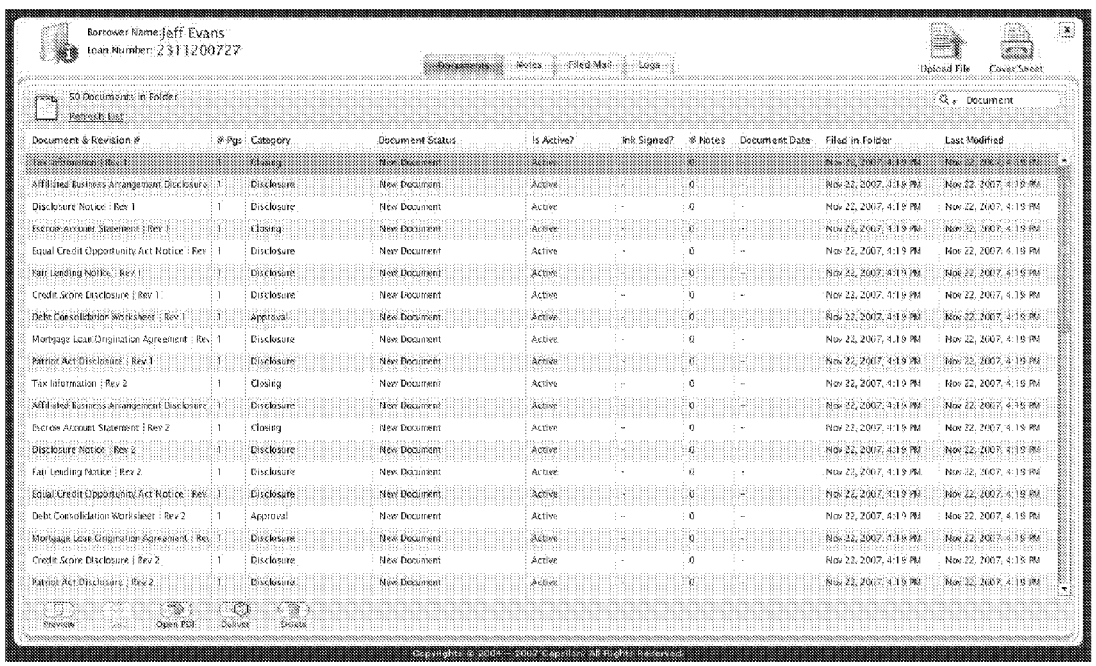
FIG. 42 shows that documents have been indexed and ready to be viewed using loan katalyst.
Figure 43:
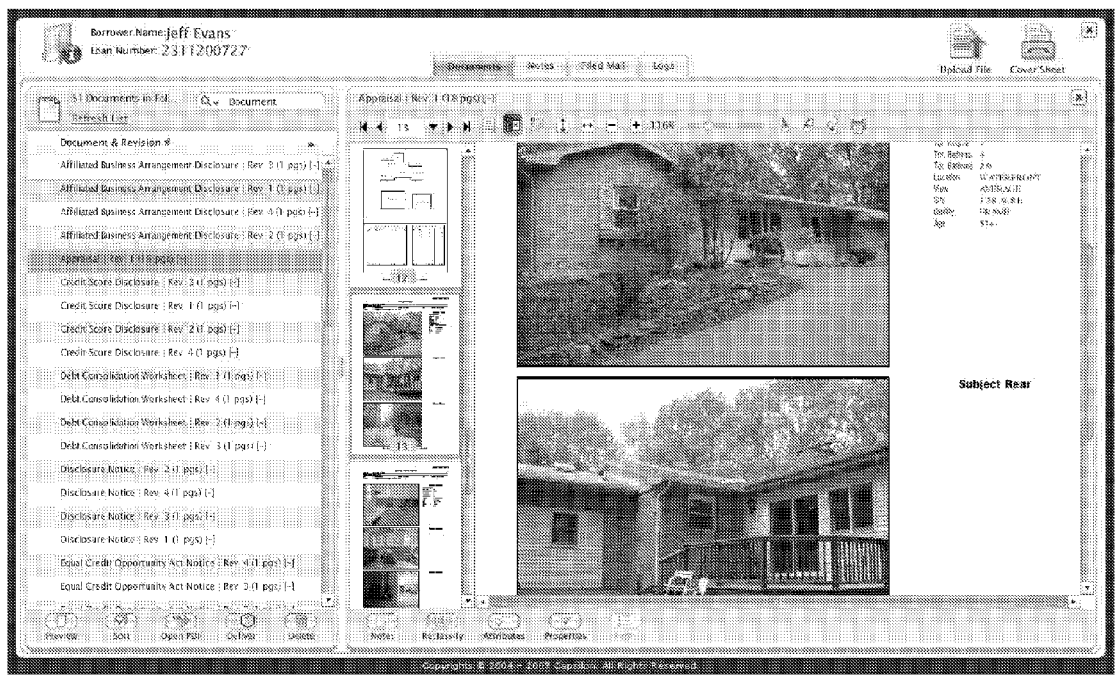
FIG. 43 shows that picture files can be easily uploaded and viewed using loan katalyst.
Figure 44:
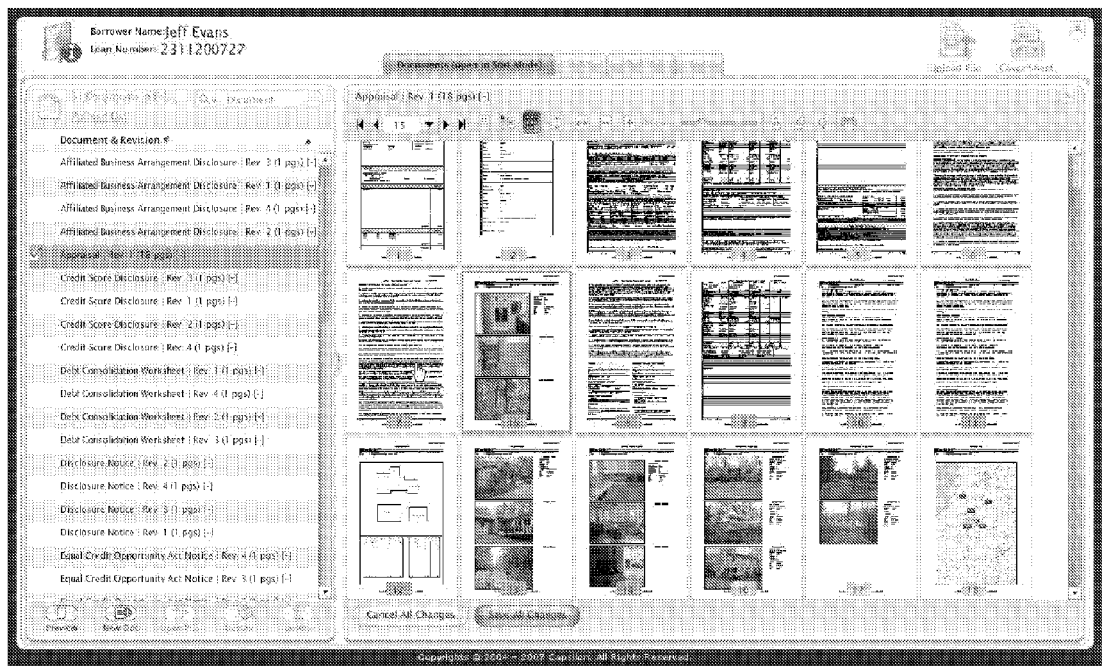
FIG. 44 shows that loan katalyst allows thumbnail view for documents.
Figure 45:
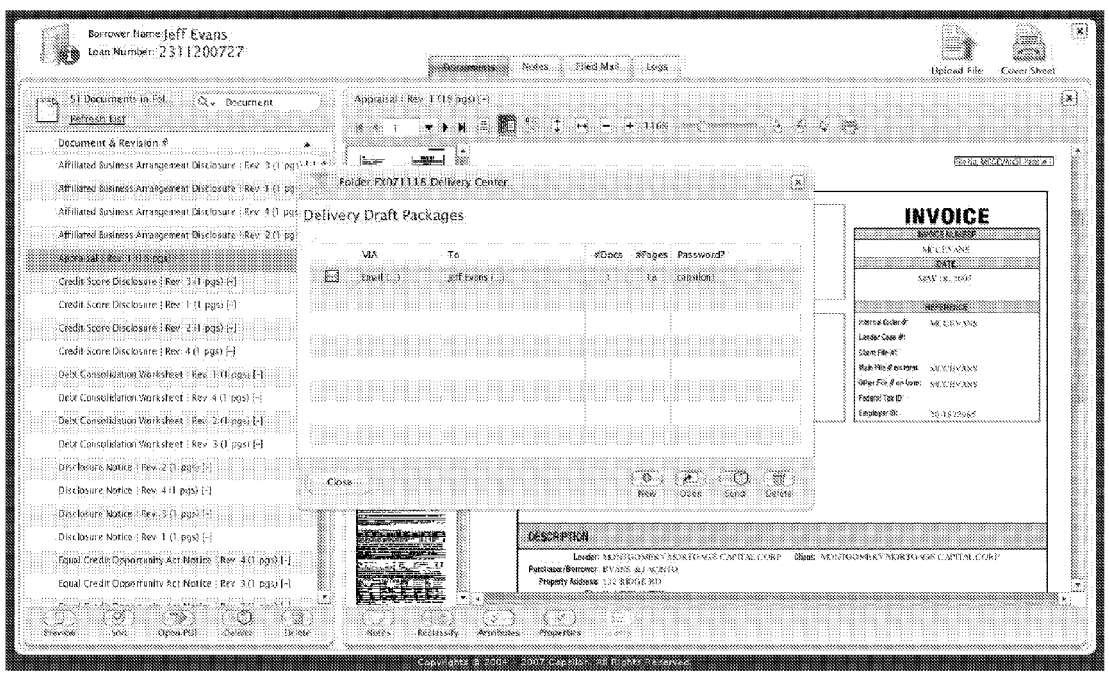
FIG. 45 shows that a user can create a custom delivery package using loan katalyst.
Figure 46:
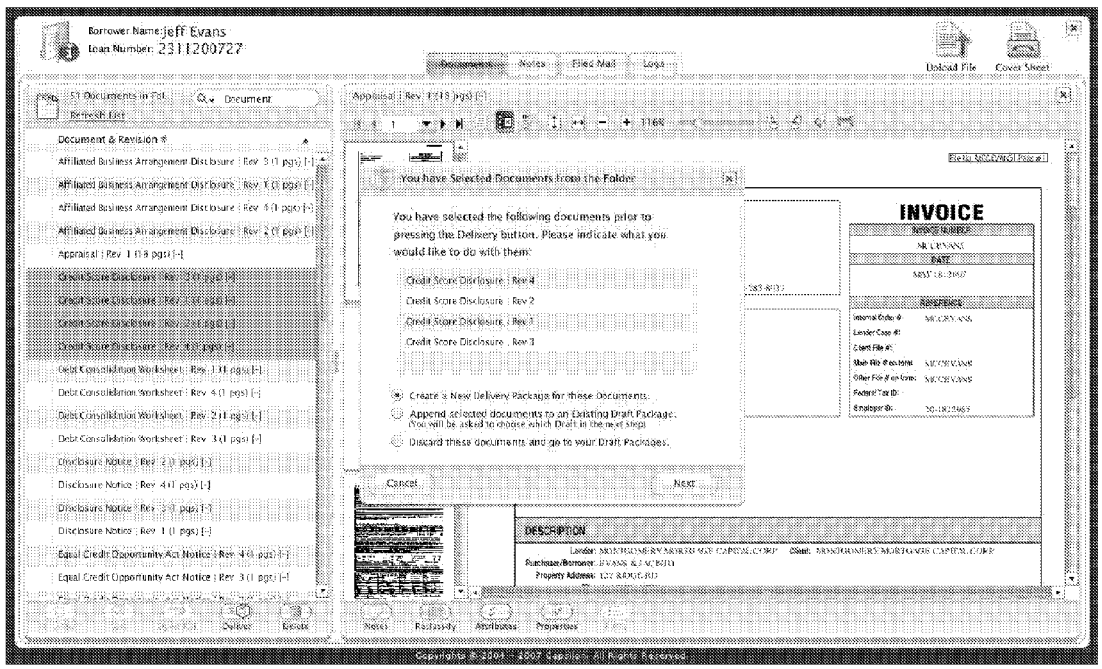
FIG. 46 shows that the user selects documents for the custom delivery package using loan katalyst.
Figure 47:
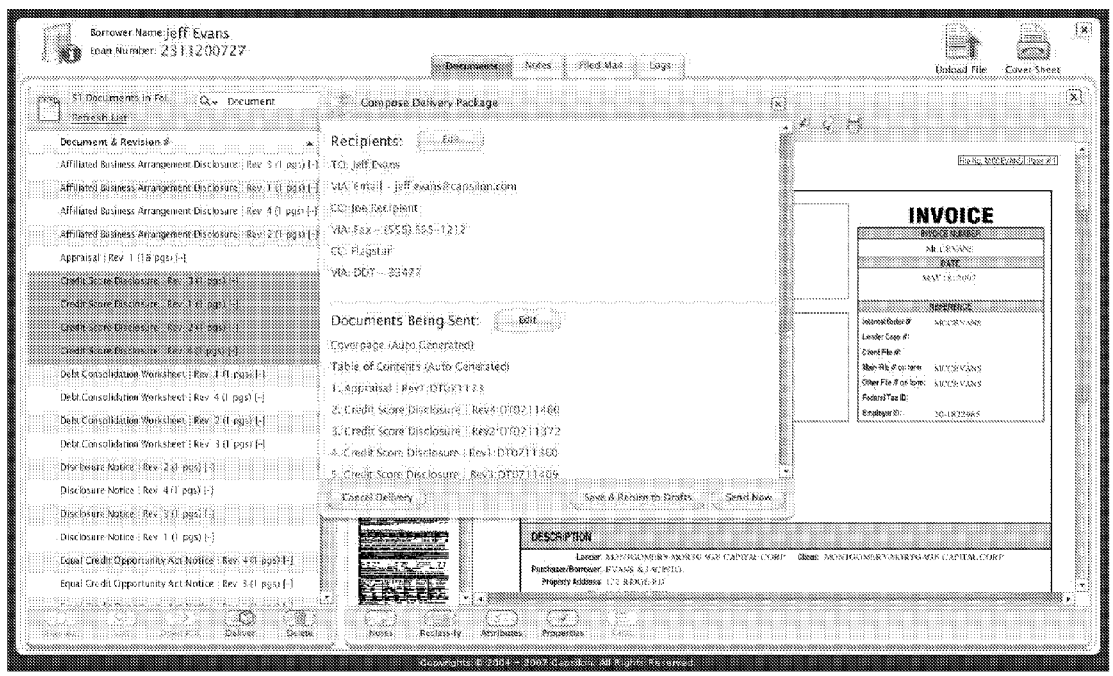
FIG. 47 shows the details of the custom delivery package before delivery using loan katalyst.
Figure 48:
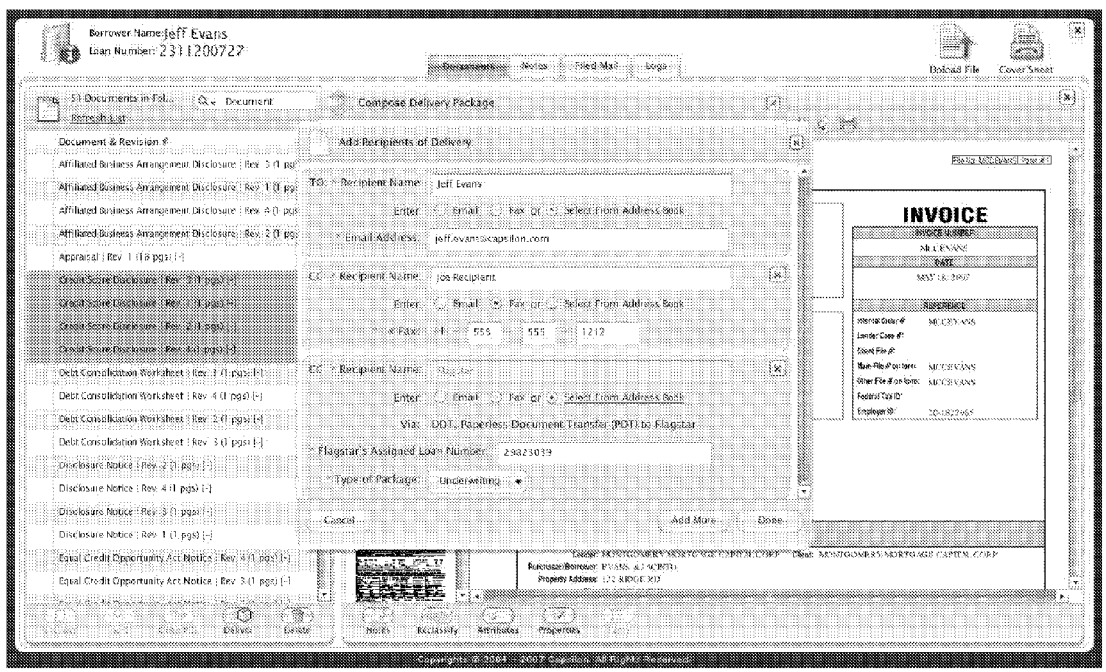
FIG. 48 shows that multiple recipients can be chosen using loan katalyst.
Figure 49:
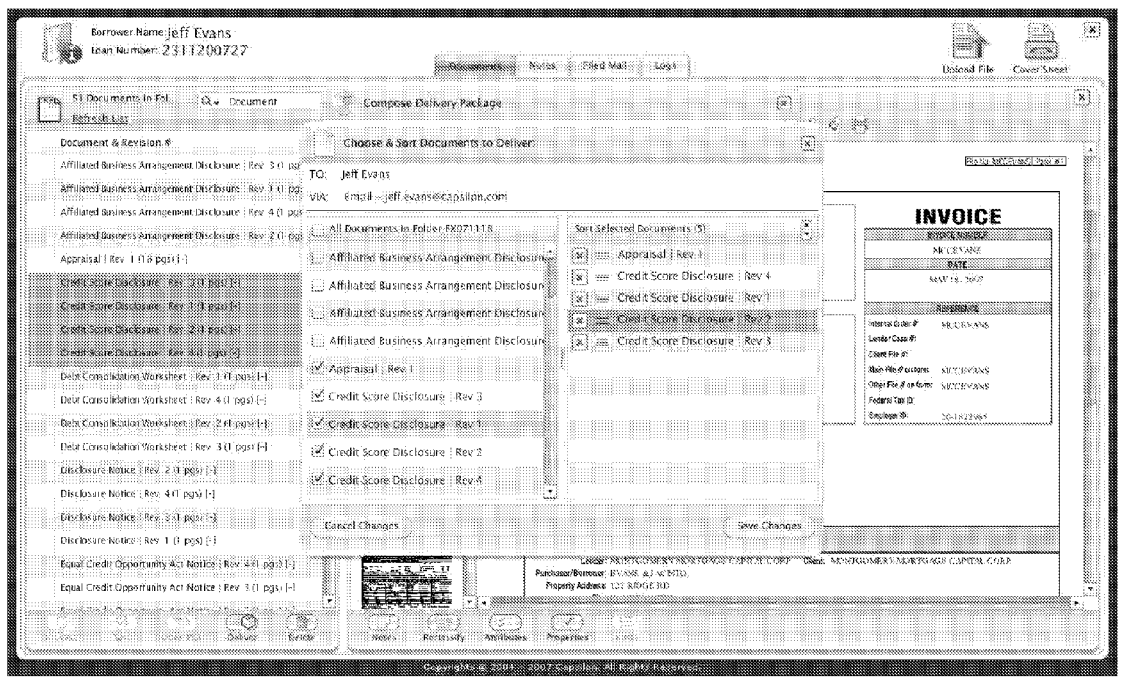
FIG. 49 shows that the order of each document can be adjusted before delivery using loan katalyst.
Figure 50:
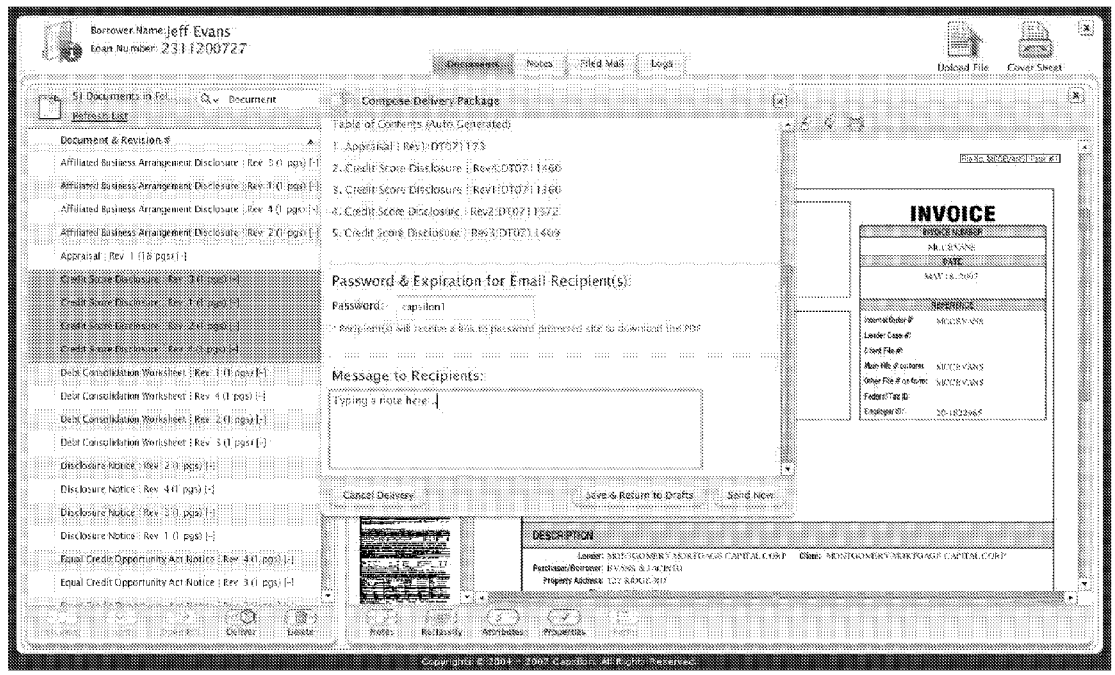
FIG. 50 shows loan katalyst allows the use of password for the custom delivery package for security reasons.
Figure 51:
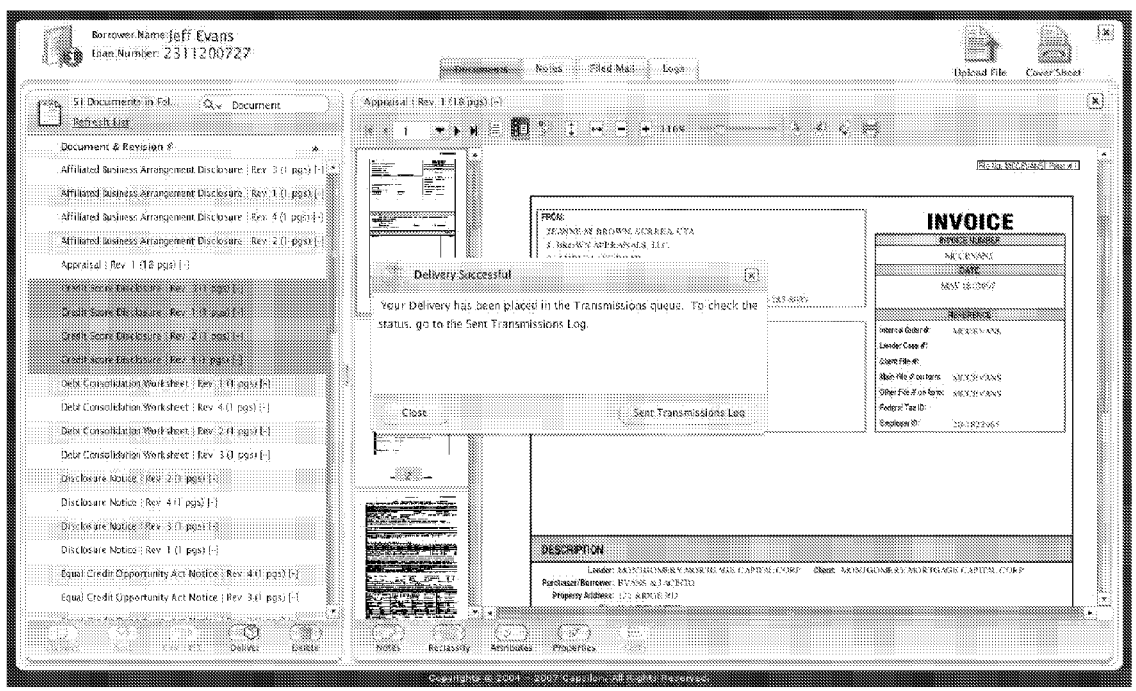
FIG. 51 shows the message stating the delivery was successful using loan katalyst.

The desktop tool Messenger has three major functions—scan, print, and pdf upload files for uploading documents into the Web-based system (FIG. 20). FIG. 21 shows the scan function of Messenger. FIG. 22 shows the print function of Messenger. FIG. 23 shows the pdf upload function of the Messenger. Messenger allows a folder to be created or designated for uploading documents via scan, print, or pdf upload (FIG. 24). FIG. 25 shows that a demo document is being uploaded and bypassing auto-indexing. The user can monitor the progress of uploading the document as shown in FIG. 26. FIG. 27 shows that the demo document has been successfully uploaded.

From the description of the invention herein, it is manifest that various equivalents can be used to implement the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are considered in all respects as illustrative and not restrictive. It should also be understood that the invention is not limited to the particular embodiments described herein, but is capable of many equivalents, rearrangements, modifications, and substitutions without departing from the scope of the invention. Thus, additional embodiments are within the scope of the invention and within the following claims.

What is claimed is:

1. A Web-based system for intelligent paperless document management, comprising,
   (a) at least one user account and at least one inbox, wherein said user account requires security sign-up and said at least one inbox accepts incoming documents;
   (b) at least one automatic indexing engine to automatically classify said incoming documents received by said inbox; wherein said at least one automatic indexing engine does not require barcodes or separators;
   (c) a repository to store documents classified by said at least one automatic indexing engine; and
   (d) a online collaborative portal; said online collaborative portal allows access of multiple users to documents in said repository;
   wherein said system automatically indexes and places documents in said repository, wherein said system does provide the capability of prearranging access levels according to functions of said multiple users; and wherein said system does prohibit a user from modifying or deleting a document in said repository.

2. The system of claim 1, further comprises at least one electronic cabinet.

3. The system of claim 1, further comprises at least one electronic folder.

4. The system of claim 1, further comprises a delivery center to allow custom delivery packages comprising different documents for multiple parties.

5. The system of claim 1, further comprises at least one business rule manager.

6. The system of claim 5, wherein said business rule manager uses at least one workflow rule.

7. The system of claim 1, further comprises at least one data extraction engine.

8. The system of claim 7, wherein the system has capability to output extracted data in a specified format.

9. The system of claim 8, wherein the specified format is MISMO SMART Doc XML.

10. The system of claim 7, wherein the system has capability to flag for human intervention when inconsistent data is identified; said human intervention include sorting, modifying, and/or deleting documents.

11. The system of claim 1, wherein the online collaborative portal allows simultaneous access from multiple users.

12. The system of claim 11, wherein the system comprises at least two user accounts corresponding to each of at least two inboxes.

13. The system of claim 1, wherein the inbox accepts incoming documents selected from the group consisting of e-mails, faxes, ftp uploads, scanners, digital copiers, and combinations thereof.

14. The system of claim 1, further comprises a desktop tool for a user with a user account and inbox providing for uploading of documents to said user's inbox.

15. The system of claim 1, wherein the system is integrated with at least one desk-based system selected from mortgage loan origination software (LOS), automatic underwriting systems (AUS), lender underwriting systems (LUS), and automate mortgage compliance software.

16. A Web-based computerized method for intelligent document management, comprising,
   (a) allowing at least one user to create at least one user account and at least one inbox, wherein at least one of said user account requires security sign-up and said at least one inbox accepts incoming documents;
   (b) receiving documents;
   (c) indexing documents received in step (b) with at least one automatic indexing engine; wherein said at least one automatic indexing engine does not require barcodes or separators;
   (d) automatically placing indexed documents into a repository to store documents classified by said at least one automatic indexing engine; and
   (e) providing said user to access documents in said repository using an online collaborative portal;

wherein said method does comprise the step of prearranging access levels according to functions of said multiple users; and wherein said method does prohibit a user from modifying or deleting a document in said repository.

17. The method of claim 16, further comprises the step of placing folders into at least one electronic cabinet.

18. The method of claim 16, further comprises the step of placing indexed documents into at least one electronic folder.

19. The method of claim 16, further comprises the step of delivering documents to at least one person using a delivery center to allow custom delivery packages comprising different documents for multiple parties.

20. The method of claim 16, further comprises the step of organizing documents using at least one business rule manager.

21. The method of claim 20, wherein said business rule manager uses at least one workflow rule.

22. The method of claim 16, further comprises the step of extracting data using at least one data extraction engine.

23. The method of claim 22, further comprises the step of outputting extracted data in a specified format.

24. The method of claim 23, wherein the specified format is MISMO SMART Doc XML.

25. The method of claim 22, further comprises the step of flagging for human intervention when inconsistent data is identified; said human intervention include sorting, modifying, and/or deleting documents.

26. The method of claim 16, wherein the online collaborative portal allows simultaneous access from multiple users.

27. The method of claim 16, wherein the inbox accepts incoming documents selected from the group consisting of e-mails, faxes, ftp uploads, scanners, digital copiers, and combinations thereof.

28. The method of claim 16, further comprises the step of providing for a desktop tool for uploading documents.

29. The method of claim 16, wherein the online collaborative portal is integrated with at least one desk-based system selected from mortgage loan origination software (LOS), automatic underwriting systems (AUS), lender underwriting systems (LUS), and automate mortgage compliance software.

* * * * *